(12) United States Patent
Endo et al.

(10) Patent No.: US 6,169,552 B1
(45) Date of Patent: Jan. 2, 2001

(54) MAP DISPLAY DEVICE, NAVIGATION DEVICE AND MAP DISPLAY METHOD

(75) Inventors: Yoshinori Endo; Mariko Okude, both of Ibaraki-ken (JP)

(73) Assignee: Xanavi Informatics Corporation (JP)

( * ) Notice: Under 35 U.S.C. 154(b), the term of this patent shall be extended for 0 days.

(21) Appl. No.: 08/839,611

(22) Filed: Apr. 15, 1997

(30) Foreign Application Priority Data

Apr. 16, 1996 (JP) .................................................. 8-094255
Apr. 18, 1996 (JP) .................................................. 8-096932

(51) Int. Cl.⁷ .................................................. G06T 15/20
(52) U.S. Cl. .................. 345/427; 345/421; 345/425; 345/133; 345/139
(58) Field of Search .................................. 345/133, 139, 345/419, 421, 425, 427; 701/200

(56) References Cited

U.S. PATENT DOCUMENTS

| | | | | |
|---|---|---|---|---|
| 4,812,980 | * | 3/1989 | Yamada et al. ...................... | 701/200 |
| 5,115,398 | * | 5/1992 | De Jong ............................... | 701/200 |
| 5,189,430 | | 2/1993 | Yano et al. . | |
| 5,602,564 | * | 2/1997 | Iwamura et al. ..................... | 345/112 |
| 5,694,530 | * | 12/1997 | Goto ..................................... | 345/419 |
| 5,748,109 | * | 5/1998 | Kosaka et al. ....................... | 345/133 |
| 5,764,217 | * | 6/1998 | Borrel et al. .......................... | 345/156 |

FOREIGN PATENT DOCUMENTS

| | | |
|---|---|---|
| 0 378 271 | 7/1990 | (EP) . |
| 0 660 290 | 6/1995 | (EP) . |
| 0 660 290 A1 | 6/1995 | (EP) . |
| 0 747 863 | 12/1996 | (EP) . |
| 0 747 863 A2 | 12/1996 | (EP) . |

OTHER PUBLICATIONS

Fleischman R. N. et al., "A Preliminary Account of Trav Tek Route Guidance Use by Rental and Local Drivers", Proceedings of the Vehicle Navigation and Informations Systems Conference, Ottawa, Oct. 12–15, 1993, No.–, Oct. 12, 1993, Reekie H. M., pp. 120–125, XP000448513

\* cited by examiner

*Primary Examiner*—Mark Zimmerman
*Assistant Examiner*—Kimbinh T. Nguyen
(74) *Attorney, Agent, or Firm*—Pennie & Edmonds LLP

(57) ABSTRACT

There is provided a map display device and a navigation device for displaying a three-dimensional map in which information which is originally hidden can be displayed on a display frame (screen). The map display device (navigation device) includes a map storing unit for storing three-dimensional data of each map constituent, and a map display unit for forming a three-dimensional bird's-eye view map which is obtained by projecting onto the plane from a desired view point each map constituent which is specified by the three-dimensional data stored in the map storing unit, and displaying the three-dimensional bird's-eye view map thus formed on a display frame (screen). When information which is requested to be displayed by a user is hidden by another map constituent located in front of the information and thus is not originally displayed on the three-dimensional bird's-eye view map, the map display unit changes a projection mode for projecting the information or the other map constituent on the plane so that the information is displayed on the display frame.

38 Claims, 55 Drawing Sheets

THREE-DIMENSIONAL MAP DISPLAY
ACCORDING TO CONVENTIONAL SYSTEM

THREE-DIMENSIONAL MAP DISPLAY
ACCORDING TO THE PRESENT INVENTION

THREE-DIMENSIONAL MAP DISPLAY
ACCORDING TO CONVENTIONAL SYSTEM

THREE-DIMENSIONAL MAP DISPLAY
ACCORDING TO THE PRESENT INVENTION

GUIDE MARK DISPLAY

GUIDE MARK DISPLAY BY REMOVING CONSTITUENT

DISPLAY GROUND PLANE OF CONSTITUENT

DISPLAY NAME OF CONSTITUENT

DISPLAY WHEN ROADS ARE OVERLAPPED WITH EACH OTHER

DISPLAY WHEN ROAD IS REMOVED

THREE-DIMENSIONAL MAP DISPLAY WHEN
RUNNING THROUGH TUNNEL

THREE-DIMENSIONAL BIRD'S-EYE VIEW MAP DISPLAY
WHEN RUNNING THROUGH TUNNEL

OBJECT DISPLAYED ON DISPLAY FRAME

CALCULATION OF DISPLAY AREA OF OBJECT

DETERMINATION OF LAYOUT OF CHARACTER INFORMATION

OVERWRITE DISPLAY OF CHARACTER INFORMATION

DISPLAY OBJECT

OBJECT DISPLAY AREA

CALCULATION OF CHARACTER DISPLAY AREA

CHARACTER DISPLAY AREA

CHARACTER INFORMATION TO BE DEVELOPED

DEVELOP CHARACTER INFORMATION IN CHARACTER DISPLAY AREA

EXAMPLE OF DISPLAY FRAME (VIEWPOINT 3122)

EXAMPLE OF DISPLAY FRAME (VIEWPOINT 3123)

MOVEMENT OF VIEWPOINT
AROUND OBJECT

VARIATION OF DISPLAY AREA OF OBJECT
WITH MOVEMENT OF VIEWPOINT

CHARACTER INFORMATION IS HIDDEN BY OBJECT

MOVE CHARACTER INFORMATION IN OBJECT AREA

MOVE CHARACTER INFORMATION TO THE POSITION IN THE NEIGHBORHOOD OF OBJECT AREA

NO NOTIFICATION ON HIDDEN CHARACTER IS GIVEN

NOTIFICATION OF HIDDEN CHARACTER IS GIVEN

MAP DISPLAY DEVICE, NAVIGATION DEVICE AND MAP DISPLAY METHOD

BACKGROUND OF THE INVENTION

1. Field of the Invention

The present invention relates to a map display device for displaying a three-dimensional map on a screen of a display device.

2. Description of Related Art

A navigation device has been hitherto known as means of improving the convenience of running of a car. According to this type of navigation device, two-dimensional map vector data which are stored in a storage medium such as a CD-ROM or the like are read out to form a two-dimensional map in which map constituents such as buildings, roads, geographical features, etc. are shown, and the two-dimensional map thus formed is displayed on a display screen of a monitor or the like. Further, a current position (the position of a car), a destination, a route connecting the current position and the destination, etc. are displayed on the display screen while superposed on the two-dimensional map.

According to the above-described prior art, the navigation device is improved so that a user can readily grasp surrounding conditions around the current position by changing the display scale of the two-dimensional map on the display screen or displaying the two-dimensional map in a bird's-eye view mode on the display screen.

SUMMARY OF THE INVENTION

However, the improvement of the processing on the screen display in the conventional navigation device as described above is performed on the basis of the two-dimensional map. Accordingly, when the current position or the destination is located on a multilevel crossing or a sloping road, or on a road along which many buildings stand, it is difficult to grasp the surrounding conditions of the current position or the destination because the surrounding conditions of these multilevel crossing, the sloping road, etc. are displayed two-dimensionally. Therefore, in order to make it easier to grasp the conditions of the circumferences of the current position and the destination, it is desirable to implement a navigation device for performing a three-dimensional map display in which a projection map to be obtained by viewing a three-dimensional map from any view point is displayed on the display screen.

If the navigation device for displaying the three-dimensional map is implemented, there might occur a case where a map constituent to be noted is hidden by another map constituent and thus it is not displayed on the display screen. In this case, there might also occur a problem that information such as a current position, a destination, a route connecting the current position and the destination or the like which a user wishes to know is not displayed on the screen.

Further, there might also occur a problem that visibility of attendant (related) information which is connected with each of map constituents such as buildings, roads, geographical features, etc. is much lower compared with a case where a two-dimensional map is displayed on the screen.

The present invention has been implemented on the basis of the foregoing situation, and a first object of the present invention is to provide a map display device for performing a three-dimensional map display, which can display on a display screen even information which is located at a position where the information would be hidden.

A second object of the present invention is to provide a map display device for performing a three-dimensional map display, which can prevent degradation in visibility of attendant information connected to map constituents.

In order to attain the first object, according to a first aspect of the present invention, a map display device for displaying a map on a display screen comprises: a map storage unit for storing three-dimensional data of plural map constituents which constitute a three-dimensional map; a map constituent specifying unit for specifying a desired map constituent; and a map display unit for projecting each map constituent specified by the three-dimensional data stored in the map storage unit from a desired view point onto a plane to form a three-dimensional bird's-eye view map, and displaying the three-dimensional bird's-eye view map on the display screen, wherein the map display unit includes projection mode changing means for changing a projection mode in which a desired map constituent specified by the map constituent specifying unit or another map constituent which is nearer to the desired view point than the desired map constituent concerned is projected on the plane, when the desired map constituent concerned is hidden by the other map constituent and thus the desired map constituent is not displayed on the three-dimensional bird's-eye view map, whereby the desired map constituent which would be originally hidden by the other map constituent can be displayed on the display screen.

Here, the map display unit may include view-point position changing means for changing the position of the desired view point to another position at which the desired map constituent can be displayed on the three-dimensional bird's-eye view map, when the desired map constituent specified by the map constituent specifying unit is hidden by the other map constituent which is located nearer to the desired view point than the desired map constituent and thus the desired map constituent is not displayed on the three-dimensional bird's-eye view map.

Further, the map display unit may include two-dimensional map display means for forming a two-dimensional map on the basis of two-dimensional data of each map constituent and displaying the two*dimensional map on the display screen in place of the three-dimensional bird's-eye view map when the desired map constituent specified by the map constituent specifying unit is hidden by the other map constituent which is located nearer to the desired view point than the desired map constituent and thus the desired map constituent is not displayed on the three-dimensional bird's-eye view map.

Still further, the map display unit may include two-dimensional map bird's-eye view display means for forming, on the basis of two-dimensional data of each map constituent, a two-dimensional bird's-eye view map which is obtained when a two-dimensional map is viewed from a desired view point, and displaying the two-dimensional bird's-eye view map on the display screen in place of the three-dimensional bird's-eye view map when the desired map constituent specified by the map constituent specifying unit is hidden by the other map constituent which is located nearer to the desired view point than the desired map constituent and thus the desired map constituent is not displayed on the three-dimensional bird's-eye view map.

Still further, the map display unit may include duplicative display means for forming a two-dimensional map on the basis of two-dimensional data of each map constituent and displaying the two-dimensional map on the display screen together with the three-dimensional bird's-eye view map when the desired map constituent specified by the map constituent specifying unit is hidden by the other map constituent which is located nearer to the desired view point than the desired map constituent and thus the desired map constituent is not displayed on the three-dimensional bird's-eye view map.

In addition, the map display unit may include duplicative display means for forming, on the basis of two-dimensional data of each map constituent, a two-dimensional bird's-eye view map which is obtained when a two-dimensional map is viewed from a desired view point, and displaying the two-dimensional bird's-eye view map on the display screen together with the three-dimensional bird's-eye view map when the desired map constituent specified by the map constituent specifying unit is hidden by the other map constituent which is located nearer to the desired view point than the desired map constituent and thus the desired map constituent is not displayed on the three-dimensional bird's-eye view map.

In the first aspect of the present invention, in order to form a three-dimensional bird's-eye view map which is obtained by projecting each constituent specified by the three-dimensional data stored in the map storage unit onto a plane from a desired view point, the three-dimensional data of each map constituent is first subjected to a perspective transformation to obtain two-dimensional coordinate data when these map constituents are projected onto a two-dimensional plane (projection plane) from a desired view point.

Further, the coordinate data in the depth direction (line of sight) of these map constituents when the map constituents are viewed from the desired view point are obtained.

Subsequently, a hidden-surface removal processing is performed to remove data of a portion corresponding to a hidden surface of each map constituent which has been subjected to the perspective transformation.

Here, the hidden surface is defined as the surface of a portion located at the rear side of a map constituent or the surface of a portion which is hidden by a map constituent located at the front side and is thus unseen by a viewer when a three-dimensional map is viewed from a view point. The hidden-surface removal processing may be realized by various methods used in the computer graphics field such as a Z sort method, a Z buffer method, a scan line method, a ray casting method or the like.

In the first aspect, various methods may be used to judge whether a desired map constituent specified by the map constituent specifying unit is hidden by another map constituent which is located nearer to a desired view point than the desired map constituent. For example, the following method may be used. A map constituent having perspectively-transformed two-dimensional coordinate data on a projection plane which is overlapped with the desired map constituent is detected, and the coordinate data in the depth (line of sight) direction of the detected map constituent is compared with that of the desired map constituent to check which map constituent is closer (i.e., is nearer to the view point).

According to the first aspect of the present invention, map constituents or marks which are hidden by map constituents located at the closer side (nearer to the view point) can be displayed. Therefore, even when information which is required to be displayed by the user is located at such a position where it is hidden by a map constituent, a three-dimensional map can be displayed on the display screen.

In order to attain the second object of the present invention, according to a second aspect of the present invention, a map display device for displaying a map and attendant information associated with map constituents constituting the map on a screen of the display device, comprises: map information storing means for storing three-dimensional information of the map constituents; attendant information storing means for storing the attendant information of the map constituents stored in the map information storing means; three-dimensional map forming means for forming, on the basis of the information stored in the map information storing means, a three-dimensional map in which the map constituents are arranged on the three-dimensional coordinate, view-point setting means for setting a view-point position from which the three-dimensional map formed by the three-dimensional map forming means is viewed to form a projection map; projection map forming means for forming the projection map which is to be obtained by viewing the three-dimensional map formed by the three-dimensional map forming means from the view-point position which is set by the view-point setting means; means for reading out from the attendant information storing means the attendant information corresponding to a map constituent displayed on the projection map formed by the projection map forming means; display area detection means for detecting the display area on the projection map of a map constituent which is displayed on the projection map formed by the projection map forming means; display area setting means for setting the display area on the projection map of the attendant information associated with the map constituent on the basis of the display area of the map constituent detected by the display area detection means; adding means for adding the attendant information to the display area of the attendant information which is set by the display area setting means; and display means for displaying on the screen of the display device the projection map which is added to the attendant information by the adding means.

According to the second aspect of the present invention, a three-dimensional map in which map constituents are arranged is first formed on the basis of data in the map storage means. Subsequently, the three-dimensional map is subjected to predetermined processing such as affine transformation, perspective transformation or the like, and then subjected to a hidden-surface removal processing such as the Z buffer method or the like to form a projection map which is obtained by viewing the three-dimensional map from a view-point.

Thereafter, the attendant information of a map constituent displayed on the projection map is read out from the attendant information storage means, and then a display area on the projection map of the map constituent which is displayed on the projection map is detected. On the basis of the detected display area, the display area of the attendant information on the projection map is set according to any one of the following rules.

(1) The display area of attendant information is set within the display area of a map constituent to which the attendant information is added.

(2) The display area of attendant information is set in the neighborhood of the display area of a map constituent to which the attendant information is added.

When the display area of the attendant information is set according to the method (1), the attendant information is displayed by being superposed on the corresponding map constituent. Here, the layout of the attendant information is set on the basis of the size of the display area of the attendant information. For example, when the attendant information is composed of plural characters (character array), the attributes of the character array such as character size, character interval, number of lines, etc. are set so that the character array is located within the display area of the attendant information.

On the other hand, when the display area of the attendant information is set according to the method (2), the attendant information is displayed in the neighborhood of the corresponding map constituent. At this time, a leading line is added to the attendant information or the attendant information is displayed with the same color or pattern as the corresponding map constituent to maintain the relative positions between the map constituent and the attendant information.

According to the method (2), since the size of the display area of the attendant information can be freely set, the attendant information can be displayed in sufficient size.

The display area of the attendant information on the projection map is set in the manner as described above, and then the attendant information is added onto the display area of the attendant information concerned. Thereafter, the projection map added with the attendant information is displayed on the screen of the display device.

According to the second aspect of the present invention, on the basis of the display area of the map constituent on the projection map, the display area of the corresponding attendant information on the projection map is set to add the attendant information to the projection map, and then the projection map added with the attendant information is displayed on the screen of the display device.

Accordingly, the attendant information can be displayed at any conspicuous position at all times in accordance with variation of the map constituent, so that the visibility can be prevented from being lowered. Accordingly, there can be provided high-quality map information in the three-dimensional map display.

BRIEF DESCRIPTION OF THE DRAWINGS

FIGS. 32A, 32B, 33C and 33D are diagrams supplementing the flow of FIG. 31;

DETAILED DESCRIPTION OF THE PREFERRED EMBODIMENTS

Preferred embodiments according to the present invention will be described hereunder with reference to the accompanying drawings.

A first embodiment according to the present invention will be described.

Figure 1:
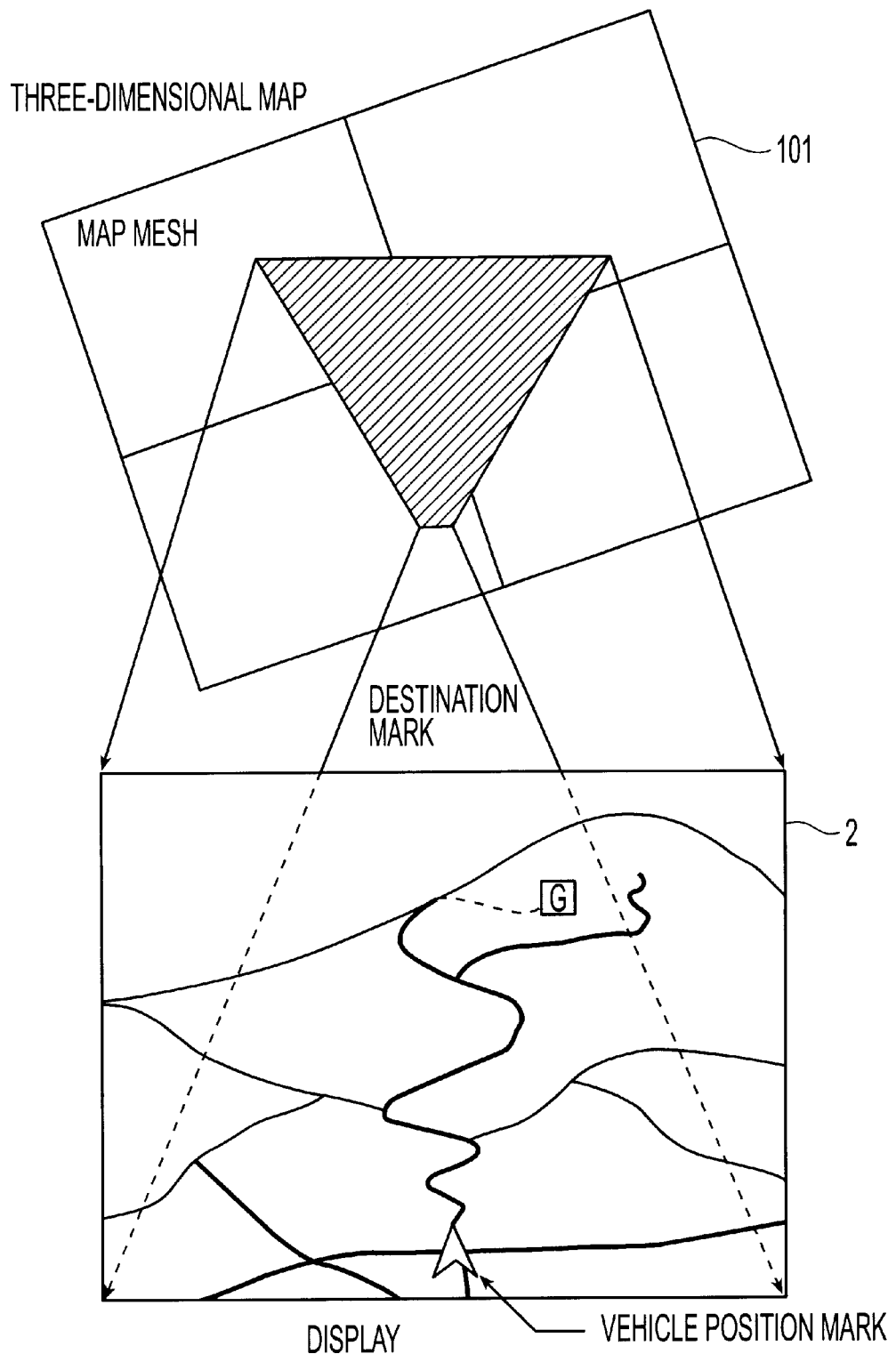
FIG. 1 is a diagram showing a display screen of a navigation device which is subjected to the processing of a first embodiment of the present invention.

First, a display frame of a car-mounted type navigation device to which this embodiment is applied will be described. FIG. 1 shows an example of a display frame of the navigation device in which the processing according to the first embodiment of the present invention is performed.

According to this embodiment, the points of map constituents such as a building, a road, a geographical feature, etc. on the land are projected onto a plane which is divided in a mesh form according to universal lateral Mercator projection, and three-dimensional data comprising vector data in latitude (X) and longitude (Y) directions of each object on the meshed-plane (corresponding to each map constituent) and vector data in the height (Z) direction of each map constituent are stored in a map data base. Thereafter, a projection map (so-called threedimensional bird's-eye view map) which is obtained by bird's-eye-viewing from a desired view point a three-dimensional map 101 in which respective constituents are arranged on the three-dimensional coordinate is formed on the basis of the map data base, and the three-dimensional bird's-eye view map is displayed on a display 2. Further, a vehicle position (current position) detected by a sensor such as a GPS (Global Positioning System) or the like, a destination and a route connecting the current position and the destination are displayed by being overlapped with one another.

In the case shown in FIG. 1, the destination and a part of the route which are not drawn in the three-dimensional bird's-eye view map because it is located at the hidden surface side (which cannot be viewed from the view point) of a mount corresponding to a map constituent, can be displayed on the display 2 by executing the processing of this embodiment. Accordingly, information which a user wishes to know is displayed on the display 2.

Next, a car-mounted type navigation device to which the first embodiment of the present invention is applied will be described.

Figure 2:
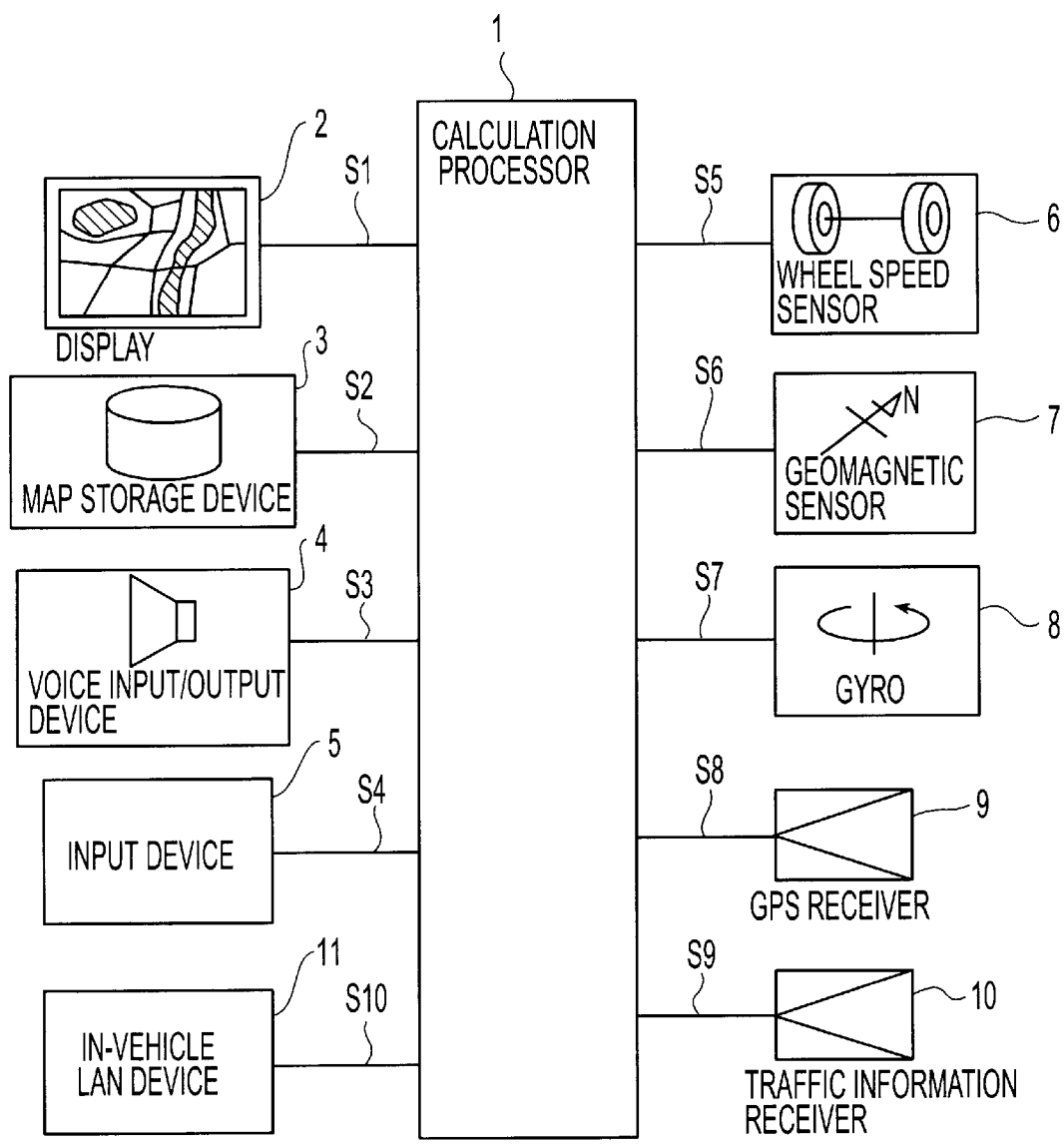
FIG. 2 is a diagram showing each constituent unit of a carmounted type navigation device according to the first embodiment of the present invention.

FIG. 2 shows each constituent unit of the car-mounted type navigation device according to this embodiment.

In FIG. 2, a calculation processor 1 is a central unit for performing various processing. For example, it detects the current position on the basis of information output from various sensors 6 to 9, and reads out three-dimensional data of map constituents required for display from a map storage device 3 on the basis of the current position information thus obtained. Further, it develops the three-dimensional data of the map constituents thus read out into graphics, overlaps the developed graphics with a current position mark and displays the result on a display 2, or selects an optimum road connecting the current position and a destination indicated by a user and guides the user to the destination by using a voice input/output device 4 or the display 2.

The display 2 is a unit for displaying the graphics information generated by the calculation processor 1, and it comprises a CRT or liquid crystal display. Further, it is common practice for that RGB signals or NTSC (National Television System Committee) signals to be used as a signal S1 between the calculation processor 1 and the display 2.

The map storage device 3 comprises a large-capacity storage medium such as a CD-ROM or an IC card. In the large-capacity storage medium there are stored three-dimensional data comprising vector data in latitude (X) and longitude (Y) directions of each object on the meshed-plane (corresponding to each map constituent) and vector data in the height (Z) direction of each map constituent, each object being obtained by projecting the area of each map constituent on the land onto a plane which is divided in a mesh form according to universal lateral Mercator projection. Further, data for specifying the type of each map constituent are stored in the storage medium. The calculation processor 1 reads out the three-dimensional data and the data for specifying the type of desired map constituents from the large-capacity storage medium in the map storage device 3.

The voice input/output device 4 converts to a voice signal a message which is generated for a user by the calculation processor 1, and recognizes a user's voice and transmits the content to the calculation processor 1.

The input device 5 receives an instruction from the user, and it comprises a hard switch set such as a scroll key, a scale alteration key, etc., a joy stick key, a touch panel on a display or the like.

Various sensors 6 to 9 are used to detect the vehicle position using the car-mounted type navigation device. A wheel speed sensor 6 calculates the travel distance from the product of the circumference of the wheel and the number of rotations of the wheel, and calculates a turn angle at a corner on the basis of the difference in number of rotations between the paired wheels. A geomagnetic sensor 7 detects the magnetic field inherent to the earth to detect the direction in which a vehicle faces. A gyro 8 is used to detect an angle at which a mobile such as an optical fiber gyro, a vibration gyro or the like turns. A GPS receiver 9 receives a signal from a GPS satellite to measure the distance between the vehicle and the GPS satellite and a rate of change of the distance for three or more satellites, thereby detecting the current position, the travel direction and the travel azimuth of the mobile.

A traffic information receiver 10 receives signals from a beacon transmitter or an FM multiplexing broadcasting station which transmit road traffic information, traffic information such as restriction information such as road construction and no-pass zone information, parking information, weather information, etc.

An in-vehicle LAN device 11 receives various information on the vehicle, such as door opened/closed information, the type and status of a turn-on lamp, the status of an engine, a trouble diagnosis result, etc.

Figure 3:
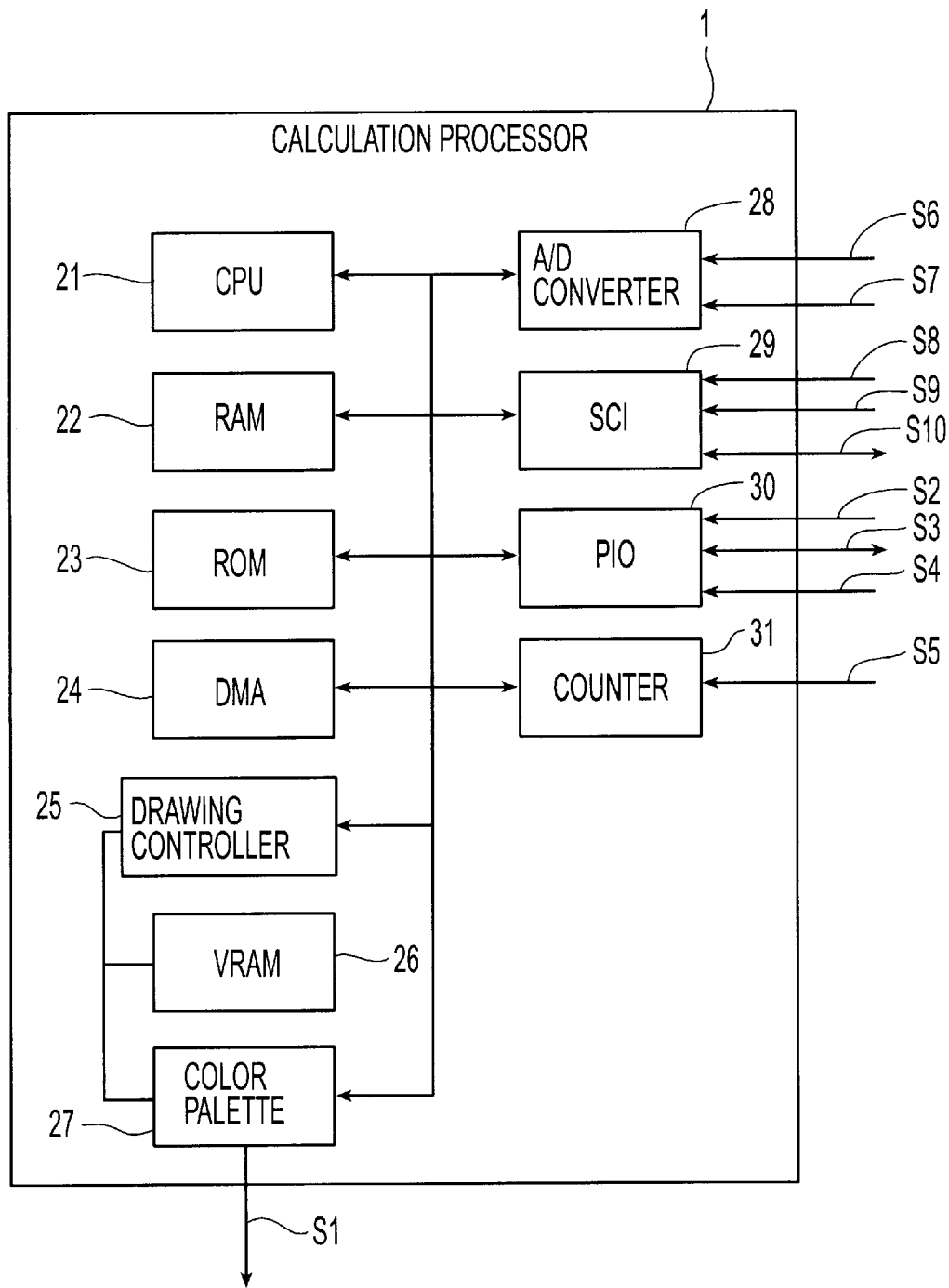
FIG. 3 is a diagram showing the hardware construction of a calculation processor of FIG. 2.

FIG. 3 is a diagram showing the hardware construction of the calculation processor 1.

As shown in FIG. 3, the calculation processor 1 has such a structure that various devices are connected to one another through a bus. The calculation processor 1 comprises a CPU (Central Processing Unit) 21 for performing various processing such as controlling the numerical calculation and each device, a RAM (Random Access Memory) 22 for storing calculation data and three-dimensional data of map constituents which are read out from the map storage device 3, a ROM (Read Only Memory) 23 for storing programs and data, a DMA (Direct Memory Access) 24 for performing data transmission between memories and between each memory and each device at high speed, a drawing controller 25 for performing graphics drawing (for example, development of vector data into pixel information) at high speed and also performing display control, a VRAM (Video Random Access Memory) 26 for storing graphics image data, a color pallet 27 for converting image data to RGB signals, an A/D converter 28 for converting analog signals to digital signals, an SCI (Serial Communication Interface) 29 for converting serial signals to parallel signals which are synchronized with the bus, a PIO (Parallel Input/Output) 30 for inputting the parallel signals on the bus in synchronism with the bus, and a counter 31 for integrating pulse signals.

Figure 4:
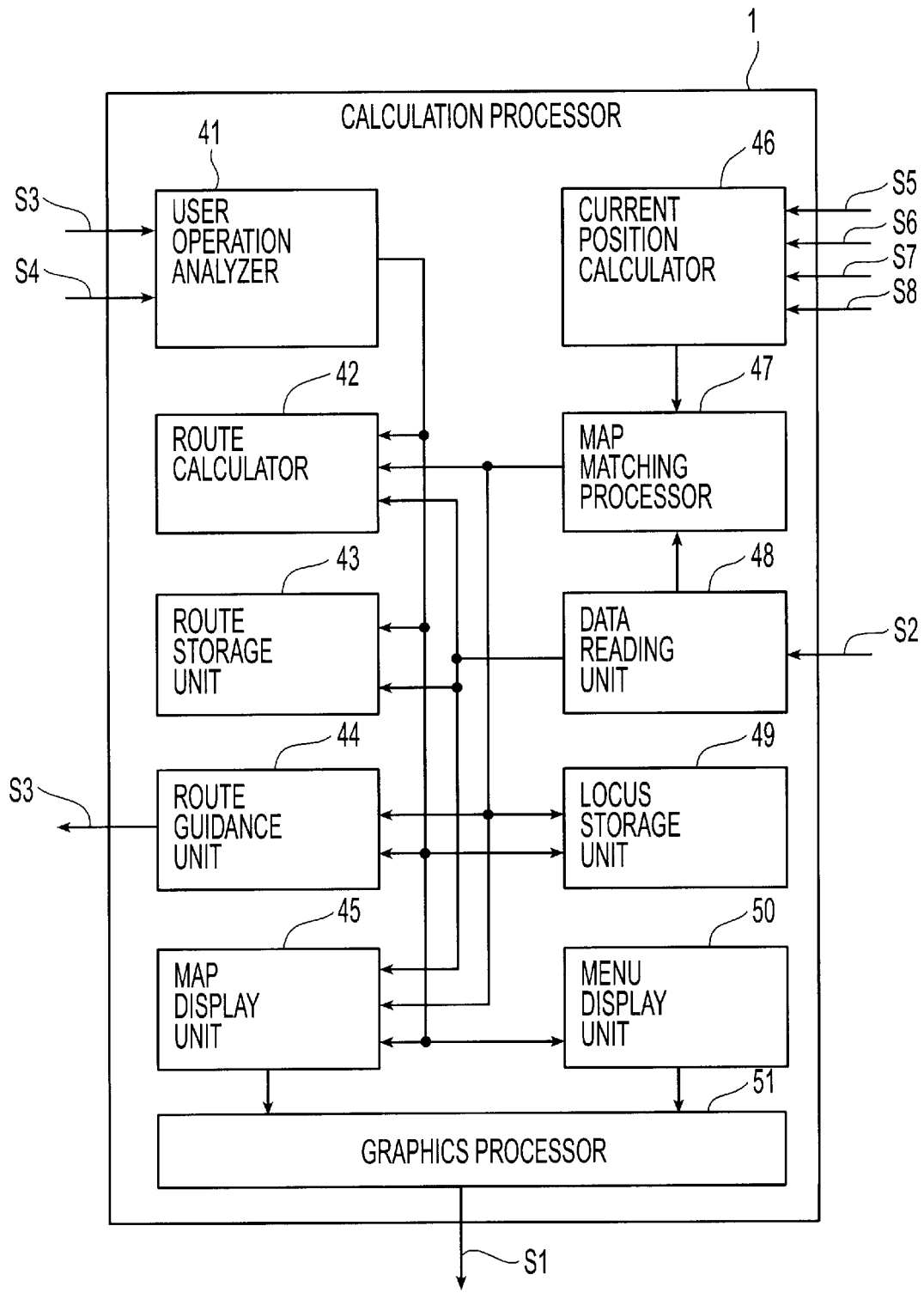
FIG. 4 is a diagram showing the functional construction of the calculation processor of FIG. 2.

FIG. 4 is a diagram showing the functional construction of the calculation processor 1.

In FIG. 4, by using distance data and angle data which are obtained by integrating distance pulse data S5 measured by the vehicle speed sensor 6 and angular acceleration data S7 measured by the gyro 8 respectively, a current position calculator 46 integrates the distance data and the angle data on the time axis to calculate the position (X',Y') after the vehicle runs from an initial position (X,Y). Here, in order to achieve coincidence between the angle at which the vehicle turns and the travel azimuth of the vehicle, the absolute to azimuth in the travel direction of the vehicle is estimated by referring azimuth data S6 obtained from the geomagnetic sensor 7 and angle data obtained by integrating the angular acceleration data S7 obtained from the gyro 8. Since errors are gradually accumulated as the data of the vehicle speed sensor 6 and the data of the gyro 8 are respectively integrated, the processing of canceling the accumulated error on the basis of position data S8 obtained from the GPS receiver 9 is performed periodically, and the current position information is output.

A map matching processor 47 performs map matching processing for collating a travel locus obtained by the current position calculator 46 with the road data contained in a map surrounding the current position which is read in by a data reading unit 48 to set the current position onto the road having the highest correlation in shape. Accordingly, through the above-described map matching processing, the current position is set to be coincident with the running road in many cases, and the current position information can be output with high precision.

A locus storage unit 49 stores as locus data the current position information which has been subjected to the map matching processing in the map matching processor 47 every time the vehicle runs for a predetermined distance. The locus data is used to draw a locus mark on a road which is located on the corresponding map and on which the vehicle has run.

A user operation analyzer 41 receives a user's request input to an input device 5 to analyze the request content and the set display parameter. It controls various constituent parts of the calculation processor 1 so that the processing corresponding to the display parameter is performed. For example, when the user needs a route guide to a destination, in order to set the destination, it requests the map display unit 45 to perform the processing of displaying a map on the display 2, and further requests a route calculator 42 to perform the processing of calculating a route to the destination.

The route calculator 42 searches a route connecting two specified points by using a Dijkstra method or the like from map data, and stores the searched route in the route storage unit 43. By changing a method of cost-calculation used in the Dijkstra method, routes can be searched which provide the shortest distance between the two points, through which the vehicle can reach the destination in the shortest time, or which need the lowest fee for passage, etc.

A route guidance unit 44 compares link information of a guide route stored in the route storage unit 43 with the current position information obtained by the current position calculator 46 and the map matching processor 47, and informs a user of a route along which the user's vehicle should travel, by notifying it to the user with voice using a voice input/output device 4 whether the vehicle should go straight on or turn to the right or left before passing over a crossing, or by indicating a travel direction on a map displayed on the display 2.

A data reading unit 48 operates to prepare to read from the map storage device 3 three-dimensional data of map constituents in an area which is requested to be displayed on the display 2, and the data specifying the types of map constituents. The map display unit 45 receives from the data reading unit 48 the three-dimensional data of the map constituents in the area which is requested to be displayed on the display 2, and generates map drawing commands so that a graphic processor 51 can draw various marks such as map constituents, a current position, a destination, an arrow for a guide route, etc.

A menu display unit 50 receives a command output from the user operation analyzer 41, and generates menu drawing commands so as to draw various kinds of menus and marks other than marks for generating drawing commands in the map display unit 45.

The graphics processor 51 receives commands generated in the map display unit 45 and the menu display unit 50 so that image data to be displayed on the display 2 are developed into an image in VRAM 26.

Figure 5:
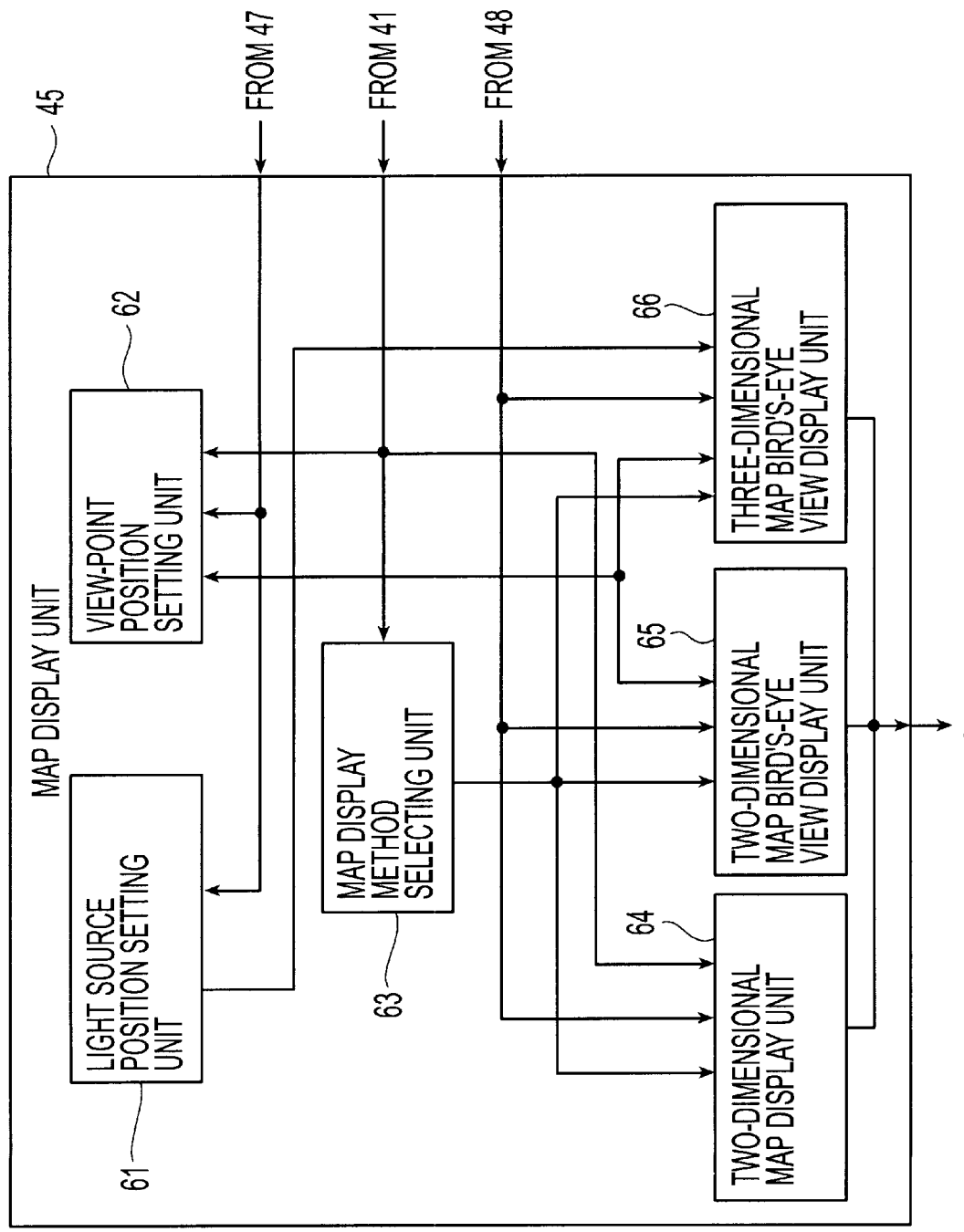
FIG. 5 is a diagram showing the functional construction of a map display unit shown in FIG. 4.

FIG. 5 is a diagram showing the functional construction of the map display unit 45 shown in FIG. 4.

In FIG. 5, a light source position setting unit 61 operates to store in its internal table a position parameter and an intensity parameter of a light source which are used to display a three-dimensional bird's-eye view map on the display 2. The position parameter and the intensity parameter of the light source are used to calculate the color of the surface of a map constituent which is drawn on the three-dimensional bird's-eye view map.

The position of the light source may be set to the position of the sun or moon which is calculated on the basis of time information, date information and position information obtained from the GPS receiver 9.

Further, when the intensity of the light source is weak at night or the like, a predetermined position may be set as the light source position. The intensity of the light source may be varied in accordance with the weather or amount of sunshine which is estimated by a luminosity sensor mounted in the vehicle, or on the basis of weather information or the like which is obtained by the traffic information receiver 10. For example, if the weather is fine, the intensity of the light source is set to a high value, and if the weather is cloudy, the intensity of the light source is set to a low value. Through the above processing, the three-dimensional bird's-eye view map can be displayed realistically.

A view-point position setting unit 62 sets a view-point position for map viewing when a three-dimensional bird's-eye view map and a two-dimensional bird's-eye view map are displayed on the display 2.

Here, the two-dimensional bird's-eye view map is defined as follows. That is, a two-dimensional map is formed on the basis of vector data in the latitude (X) and longitude (Y) directions of map constituents on the land plane (Z=0) out of the three-dimensional data of the map constituents which are stored in the map storage device 3, and then the two-dimensional map thus formed is bird's-eye viewed from a predetermined view point. A projection map obtained at this time is defined as the two-dimensional bird's-eye view map.

A map display method selecting unit 63 selects processing so that a map of a predetermined area which is requested to be displayed on the display 2 is displayed in a predetermined scale according to a display system of a map which is set into the input device 4 by the user or according to a display system of a map which is set as default. That is, if the two-dimensional map display is instructed, a two-dimensional map display unit 64 is activated. If the two-dimensional map bird's-eye view display is instructed, a two-dimensional map bird's-eye view display unit 65 is activated. If the three-dimensional bird's-eye view display is instructed, a three-dimensional map bird's-eye view display unit 66 is activated.

At the time when the power of the navigation device turns on again, the map may be displayed in the map display system or the default map display system, which had been used immediately before the power was turned off. Each of map display units 64 to 66 generates a map drawing command, and transfers these commands to the graphics processor 51. The graphics processor 51 executes these commands to display a map on the display 2.

Here, on the basis of the two-dimensional vector data comprising the vector data in the latitude (X) and longitude (y) directions of the map constituents out of the three-dimensional data of the constituents stored in the map storage device 3, the two-dimensional map display unit 64 forms, in a predetermined scale, a two-dimensional map in which the map constituents are arranged on the two-dimensional coordinate system with a predetermined point at the center thereof, and displays this map on the display 2. In this two-dimensional map, all the points on the map are represented in the same scale.

Further, on the basis of the two-dimensional data comprising the vector data in the latitude (X) and longitude (Y) directions of the map constituents on the land plane (Z=0) out of the three-dimensional data of the map constitutes stored in the map storage device 3, the twodimensional map bird's-eye view display unit 65 displays on the display 2 a projection map (two-dimensional bird's-eye view map) which is obtained by bird's-eye-viewing a two-dimensional map formed in a predetermined scale with a predetermined point at the center thereof from a view point set in the view-point position setting unit 62.

Here, the view-point position setting unit 62 preferably sets the view-point position to a position on the three-dimensional coordinate system, which is in the sky and far away from the current position obtained in the map matching unit 47 by a predetermined distance. Accordingly, map constituents adjacent to the view-point position are represented in more detail (in large scale) while map constituents far away from the view-point position are represented schematically (in small scale).

The two-dimensional bird's-eye view map is formed by subjecting the two-dimensional data of the map constituents to the perspective transformation and then projecting the perspectively-transformed data onto the two-dimensional plane (projection plane) from a view point which is set by the view-point position setting unit 62. The perspective transformation will be described together with the description of the three-dimensional map bird's-eye view display unit 66.

On the basis of the three-dimensional data of map constituents stored in the map storage device 3, the three-dimensional map bird's-eye view display unit 66 displays on the display 2 a projection map (three-dimensional bird's-eye view map) which is obtained by bird's-eye-viewing a threedimensional map formed with a predetermined point around the center thereof in a predetermined scale from a view point which is set in the view-point position setting unit 62.

Here, the view-point position setting unit 62 preferably sets the view-point position to a position on the three-dimensional coordinate system, which is in the sky and far away from the current position obtained in the map matching unit 47 by a predetermined distance. Accordingly, map constituents adjacent to the view-point position are represented in more detail (in large scale) while map constituents far away from the view-point position are represented schematically (in small scale). Further, a scene which is viewed from the set view point is displayed three-dimensionally.

Next, the three-dimensional map bird's-eye view display unit 66 will be described in detail with reference to FIGS. 6 and 7.

Figure 6:
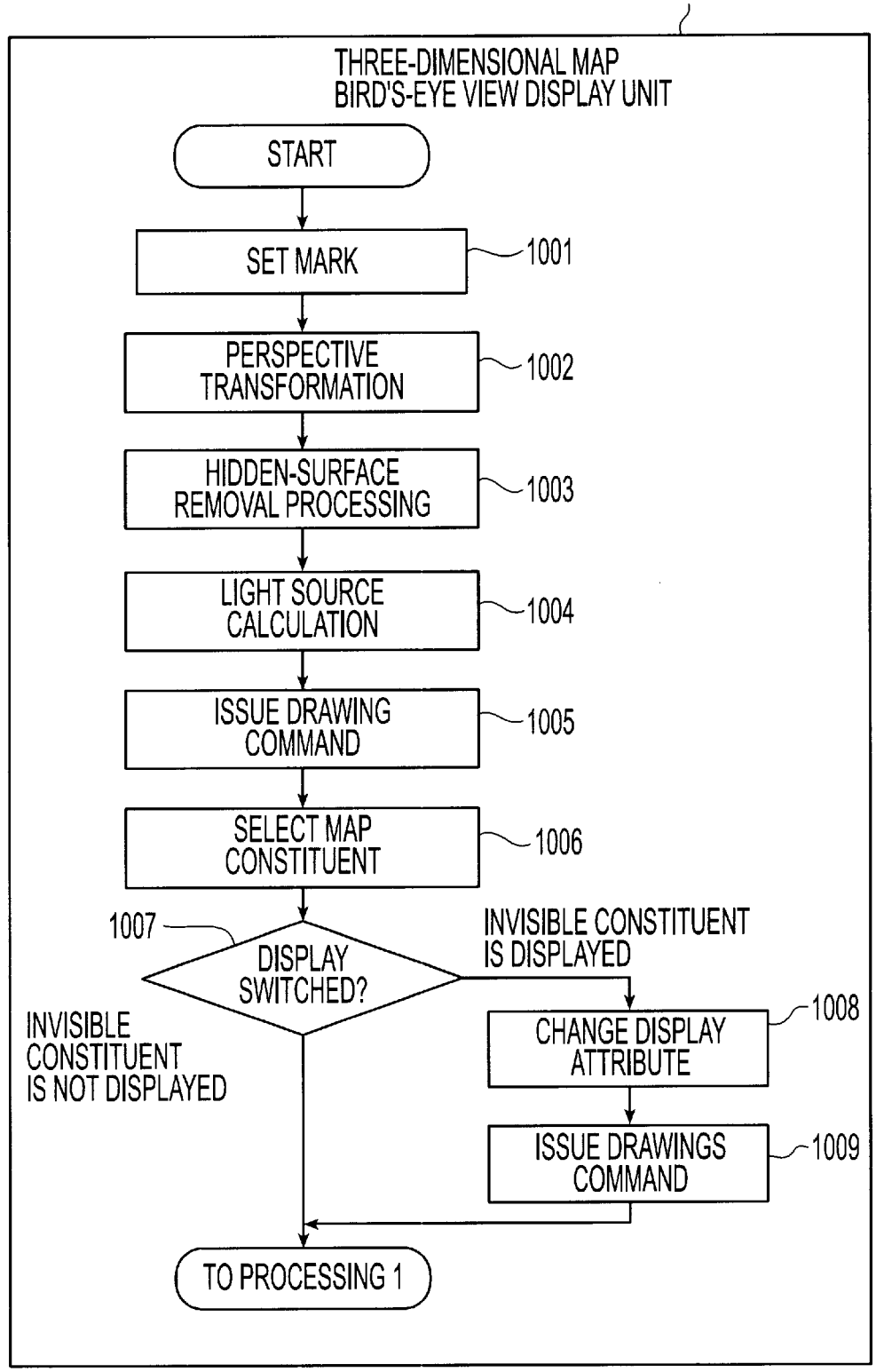
FIG. 6 is a flowchart showing the operation of a three-dimensional map bird's-eye view display unit shown in FIG. 5.
Figure 7:
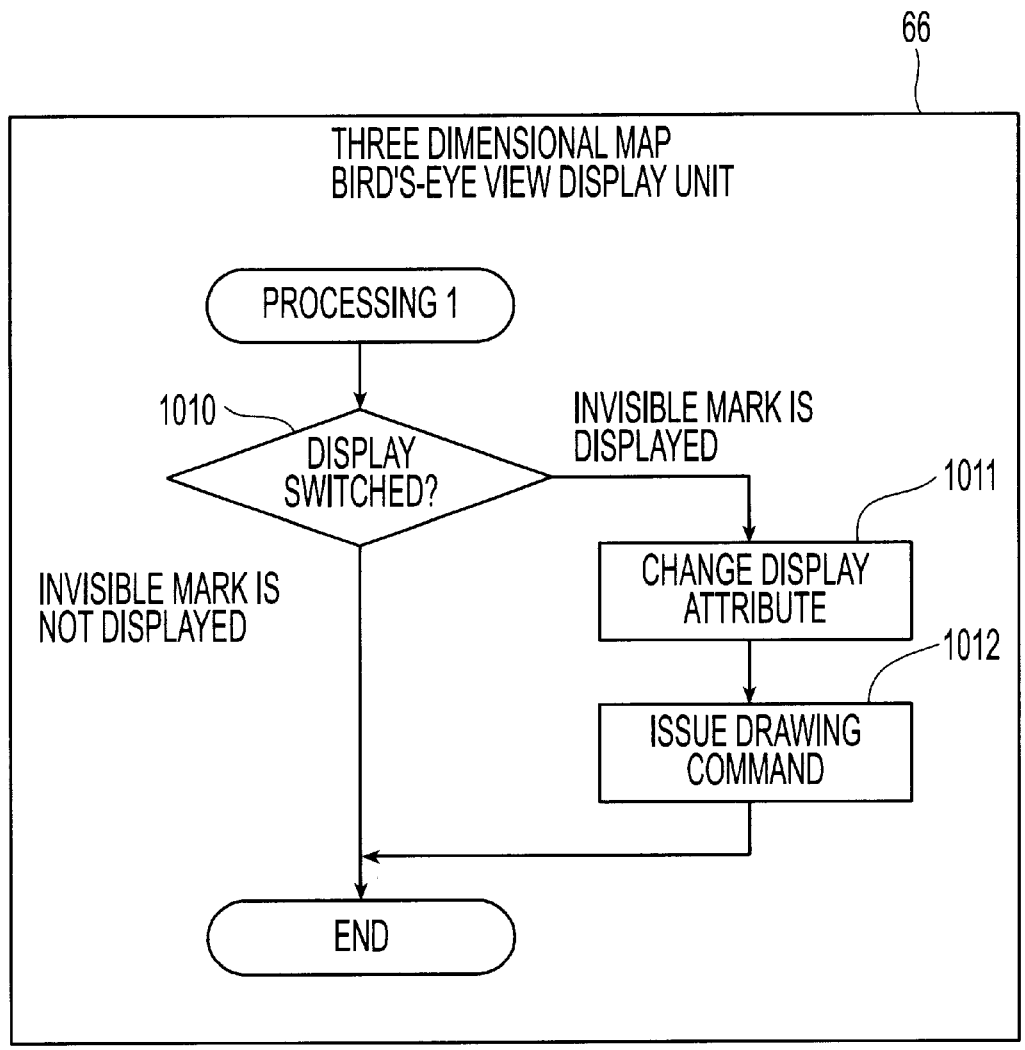
FIG. 7 is a flowchart showing the operation of the three-dimensional map bird's-eye view display unit shown in FIG. 5.

FIGS. 6 and 7 are flowcharts showing the operation of the three-dimensional map bird's-eye view display unit 66.

In the three-dimensional map bird's-eye view display unit 66, first, vector data for specifying the shape of each of marks such as a current position, a destination, an intermediate place, an arrow for route guidance, etc., position information at which the mark concerned is displayed, and color information of the mark are stored in the internal buffer (1001).

Here, a two-dimensional shape and a three-dimensional shape may be set as the mark shape, and any one of them may be selected in accordance with the display system of the map.

Subsequently, the data of marks stored in the internal buffer in step 1001 and the three-dimensional data of map constituents which are read in from the map storage unit 3 by the data reading unit 48 are subjected to the perspective transformation to obtain two-dimensional coordinate data when these marks and the map constituents are projected onto the two-dimensional plane (projection plane) from the view point set in the view-point position setting unit 62.

Further, the coordinate data in the depth (line of sight) direction when these marks and the map constituents are viewed from the view point set by the view-point position setting unit 62 are obtained (step 1002).

The perspective transformation equation is given from the following equations 1 and 2:

$$x'=(x+T_X)/(y \cdot \sin\theta + z \cdot \cos\theta + T_Z) \quad (1)$$

$$y'=(y \cdot \cos\theta - z \cdot \sin\theta + T_y)/(y \cdot \sin\theta + z \cdot \cos\theta + T_Z) \quad (2)$$

Here, (x', y') represents a coordinate value on the projection plane after the perspective transformation, (x, y, z) represents a coordinate value obtained by representing the coordinate value of each apex of the map constituents and the marks to be perspectively transformed in an object coordinate system, (Tx, Ty, Tz) represents an offset value between a view-point coordinate system with the view point at the origin and the object coordinate system, and θ represents an intersecting angle when the object coordinate system is rotated around the X-axis of the view-point coordinate system.

In step 1003 hidden-surface removal processing is performed to delete the data of portions located on the hidden surfaces of the map constituents and the marks which have been subjected to the perspective transformation in step 1002.

Here, the hidden surface is defined as the surface of a portion which is unseen when a three-dimensional map is viewed from a view point because it is located at the rear side of a map constituent or mark, or as the surface of a portion which is unseen when a three-dimensional map is viewed from a view point because it is hidden by a map constituent or mark located in front of the portion.

The hidden-surface removal processing may be realized by various methods used in a computer graphics field such as a Z sort method, a Z buffer method, a scan line method, a ray casting method or the like.

For example, when the Z sort method is applied to step 1003, the surfaces constructed by the respective apex of the map constituents and the marks which are subjected to the perspective transformation in step 1002, are rearranged in the depth (line of sight) direction. Thereafter, in step 1005 as described later, a map drawing command is generated so as to draw a map from the surface located at the deepest position (the surface which is farthest away from the view point).

Further, when the Z buffer method is applied to step 1003, the map constituents and the marks which are subjected to the perspective transformation in step 1002 are first shared to the pixels constituting the surfaces constructed by the respective apexes of the map constituents and the marks.

Subsequently, the coordinate data in the depth (line of sight) direction of each of these pixels is determined, and another pixel which is located in front of the pixel concerned (i.e., is nearer to the view point than the pixel concerned) and has the same two-dimensional coordinate value as the pixel concerned is detected.

When there is detected another pixel which is located in front of the pixel concerned (i.e., nearer to the view point) and has the same two-dimensional coordinate value as the pixel concerned, by replacing pixel values with the data of the pixel concerned, only the pixel data in a visible area which are contained in the pixel data constituting all the map constituents and marks and can be viewed from the view point, are held. Thereafter, in step 1005 as described later, a map drawing command is generated so as to draw a map only from pixel data contained in a visible area from the view point.

Further, for example, when the scan line method is applied to step 1003, the map constituents and the marks which are perspectively transformed in step 1002 are arranged on a three-dimensional coordinate system which comprises two-dimensional coordinate axes for specifying the position on a projection plane and a coordinate axis for specifying the position in the depth (line of sight) direction.

Subsequently, plural scan lines which are swept on the projection plane are assumed, and plural planes each containing each scan line and the view point are considered. On each plane, line segments of the map constituents and the marks which are intersected to the plane at the most front side (nearest to the view point) are detected. Thereafter, in step 1005 as described later, a map drawing command is generated so as to draw the detected line segments.

In step 1004, the inner products of straight lines are calculated. The straight lines are the normal line of the surfaces constructed by the respective apexes of the map constituents and the marks which are perspectively transformed in step 1002, and the line connecting the surfaces constructed by the respective apexes and the light source position coordinate set in the light source position setting unit 61. Further, color information which is used when each surface is displayed in the three-dimensional map bird's-eye view display mode is determined on the basis of preset color information.

The position and the intensity of the light source being used are preferably identical (fixed) among the map constituents and marks.

In step 1005, a map drawing command is generated to draw planes and lines so that the map constituents and the marks which are subjected to the hidden-surface removal processing in step 1003 are displayed according to the color information determined in step 1004.

Figure 21A:
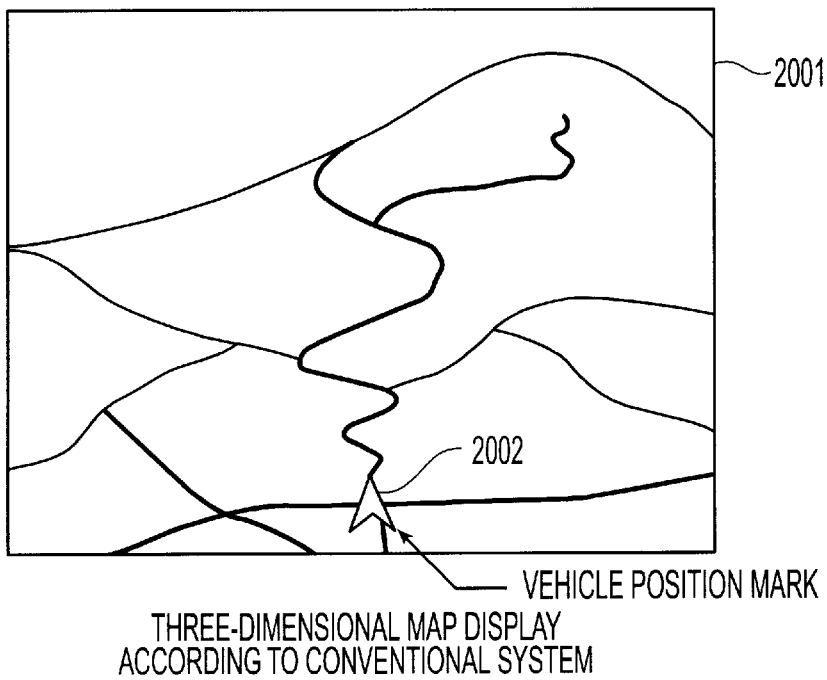
FIG. 21A is a diagram showing an example of a display frame of a three-dimensional map according to the conventional method.

Through the processing in steps 1001 to 1005, the graphics processor 51 can display a three-dimensional bird's-eye view map as shown in FIG. 21A on the display 2. According to the processing of steps 1001 to 1005, however, a scene which is viewed from the view point is displayed as it is. Therefore, even map constituents and marks which are located on the hidden surface and whose information is requested by the user are not displayed on the display, and this is inconvenient for practical use. In order to solve this problem, the present invention uses the processing of steps 1006 to 1012.

In step 1006, map constituents and marks which are requested by the user and are located in an invisible area (on the hidden surface) are selected from map constituents which are read out from the map storage unit 3 by the data reading unit 48 and marks which are set in step 1001.

Here, the map constituents and the marks which are requested to be displayed by the user are those map constituents and marks which are directly instructed to be displayed through the input device 4 by the user, or which are preset to be displayed as default information. A judgment as to whether map constituents and marks are located in an invisible area will be described later.

In step 1007, on the basis of a display parameter set through the input device 4 by the user or a display parameter set as default, it is judged whether map constituents located in an invisible area selected in step 1006 are displayed. If the display parameter is set to a mode in which the map constituents in the invisible area are displayed, the processing goes to step 1008. On the other hand, the display parameter is set to a mode in which the map constituents in the invisible area are not displayed, the processing goes to step 1010.

In step 1008, the map constituents selected in step 1006 are subjected to display attribute alteration processing such as alteration of attributes, the perspective processing, etc. for the display on the display 2. The display attribute alteration processing will be described later.

In step 1009, a map drawing command is generated to draw the surfaces and lines constituting the map constituents concerned on the basis of the display attributes, etc. which are set in step 1008.

Figure 21B:
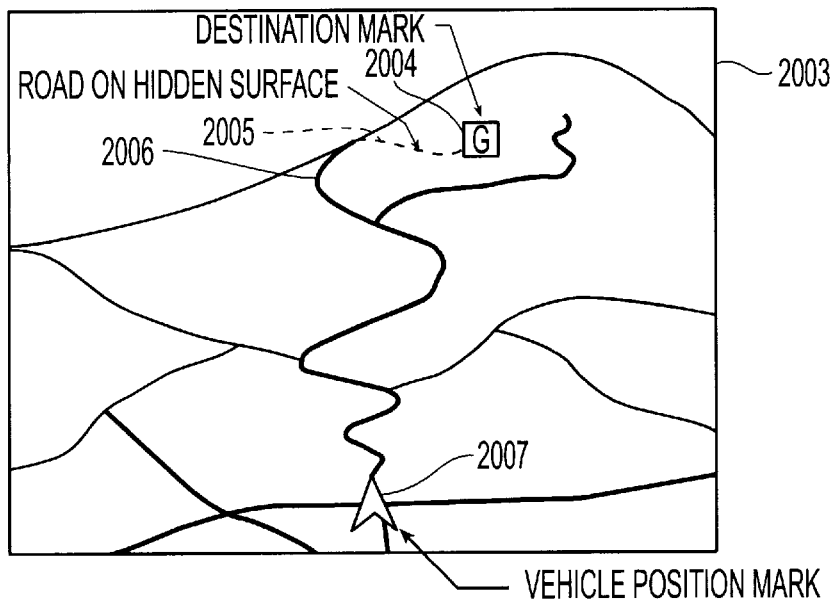
FIG. 21B is a diagram showing an example of a display frame when the flow shown in FIGS. 6 and 7 is performed.

Accordingly, in the three-dimensional bird's-eye view map, for example shown in FIG. 21B, a road 2005 leading to a destination, which is hidden by a mountain, is displayed by a dotted line or the like, whereby information requested by the user can be provided.

In step 1010 in FIG. 7, on the basis of the display parameter set through the input device 4 by the user or the display parameter set as default, it is judged whether marks in an invisible area selected in step 1006 are displayed.

If the display parameter is set to a mode in which the marks in the invisible area are displayed, the processing goes to step 1011. On the other hand, if the display parameter is set to a mode in which the marks in the invisible area are not displayed, the flow shown in FIGS. 6 and 7 is ended.

In step 1011, the display attribute alteration processing as described later is performed on the marks set in step 1001. In step 1012, the map drawing command is generated to draw the surfaces and lines constituting the marks set in step 1001 in accordance with the display attribute, etc. set in step 1011. Accordingly, for example, in the three-dimensional bird's-eye view map shown in FIG. 21B, a destination mark 2004 which is hidden by a mountain and set in step 1001 is displayed, and thus information which is needed by the user can be provided to the user.

Next, the mark setting processing in step 1001 of FIG. 6 will be described in detail with reference to FIG. 8.

Figure 8:
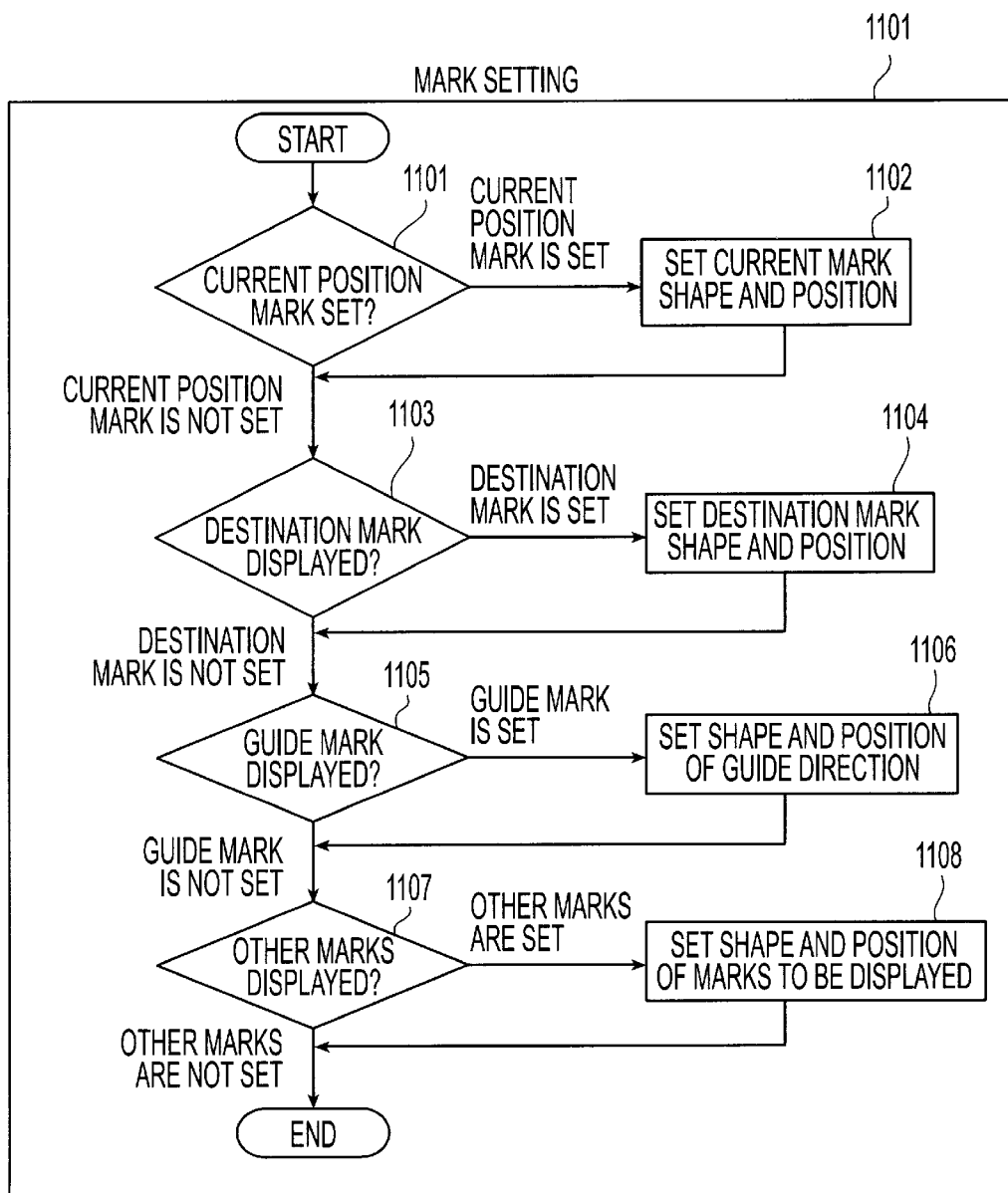
FIG. 8 is a flowchart showing mark setting processing of FIG. 6.

FIG. 8 is a flowchart showing the mark setting processing.

First, the display parameter which is set through the input device 4 by a user or the display parameter which is set as default is read out to judge whether the current position mark is set (step 1101).

If the current position mark is judged to be set, the processing goes to step 1102 to set the position at which the current position mark is displayed, the predetermined two-dimensional or three-dimensional shape of the current position mark and the color information of the current position mark. The position information of the current position is determined by the current position calculator 46 and the map matching processor 47.

Figure 27A:
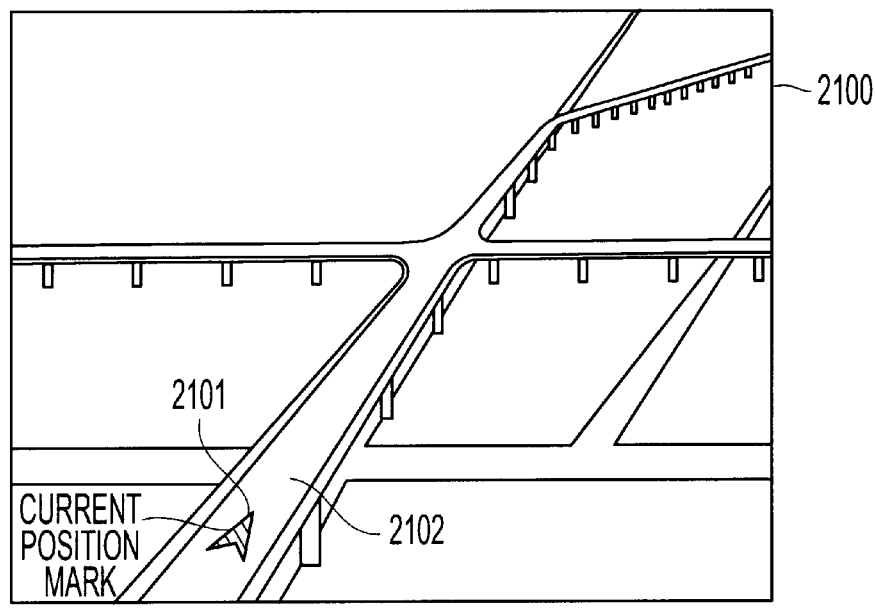
FIGS. 27A and 27B are diagrams each showing an example of a display frame when a target road is displayed.

With this processing, even when the vehicle is hidden by a road 2102 above a road on which the vehicle runs, as shown in FIG. 27A, the display attribute is altered in step 1011 of FIG. 7 so that the current position mark 2101 is displayed on the display 2, whereby the user can readily know where he (she) is.

In step 1103, the display parameter which is set through the input device 4 by the user or is set as default is read out to judge whether a destination mark is set.

If a destination is set by the user and it is judged that the destination mark is to be displayed, the processing goes to step 1104 to set the position at which the destination mark is displayed, the predetermined two-dimensional or three-dimensional shape of the destination mark, and the color information of the destination mark.

In step 1105, the display parameter which is set through the input device 4 by the user or is set as default is read out to judge whether a guide direction mark is set.

If a guide route is set in the route storage unit 43 and it is judged that the guide direction mark is to be displayed, the processing goes to step 1106 to set the position at which the guide direction mark is displayed, the predetermined two-dimensional or three-dimensional shape of the guide direction mark, and the color information of the guide direction mark.

Figure 25A:
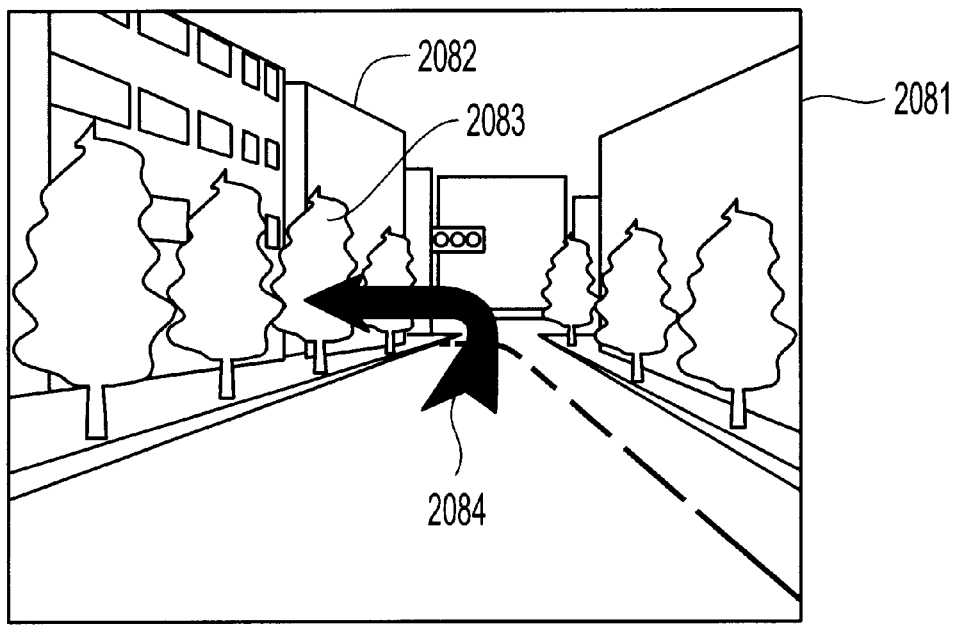
FIGS. 25A and 25B are diagrams each showing an example of a display frame when a guide mark is displayed.

With this processing, even when the guide direction mark is hidden by a building 2082 or a tree 2083 as shown in FIG. 25A, the display attribute is altered in step 1011 of FIG. 7, and the guide direction mark 2084 is displayed on the display 2. Accordingly, the user can readily know the direction of the guided route.

In step 1107, the display parameter which is set through the input device 4 by the user or is set as default is read out to see whether other display marks are displayed. Here, a display mark representing accident information which is obtained by analyzing a signal received by the traffic information receiver 10 is used as one of the other display marks.

If the other display marks are judged to be displayed, the processing goes to step 1108 to set the positions at which the other display marks are displayed, the predetermined two-dimensional or three-dimensional shape of each of the other display marks, and the color information of the other display marks.

Next, the map constituent selection processing in step 1006 in FIG. 6 will be described in detail with reference to FIG. 9.

Figure 9:
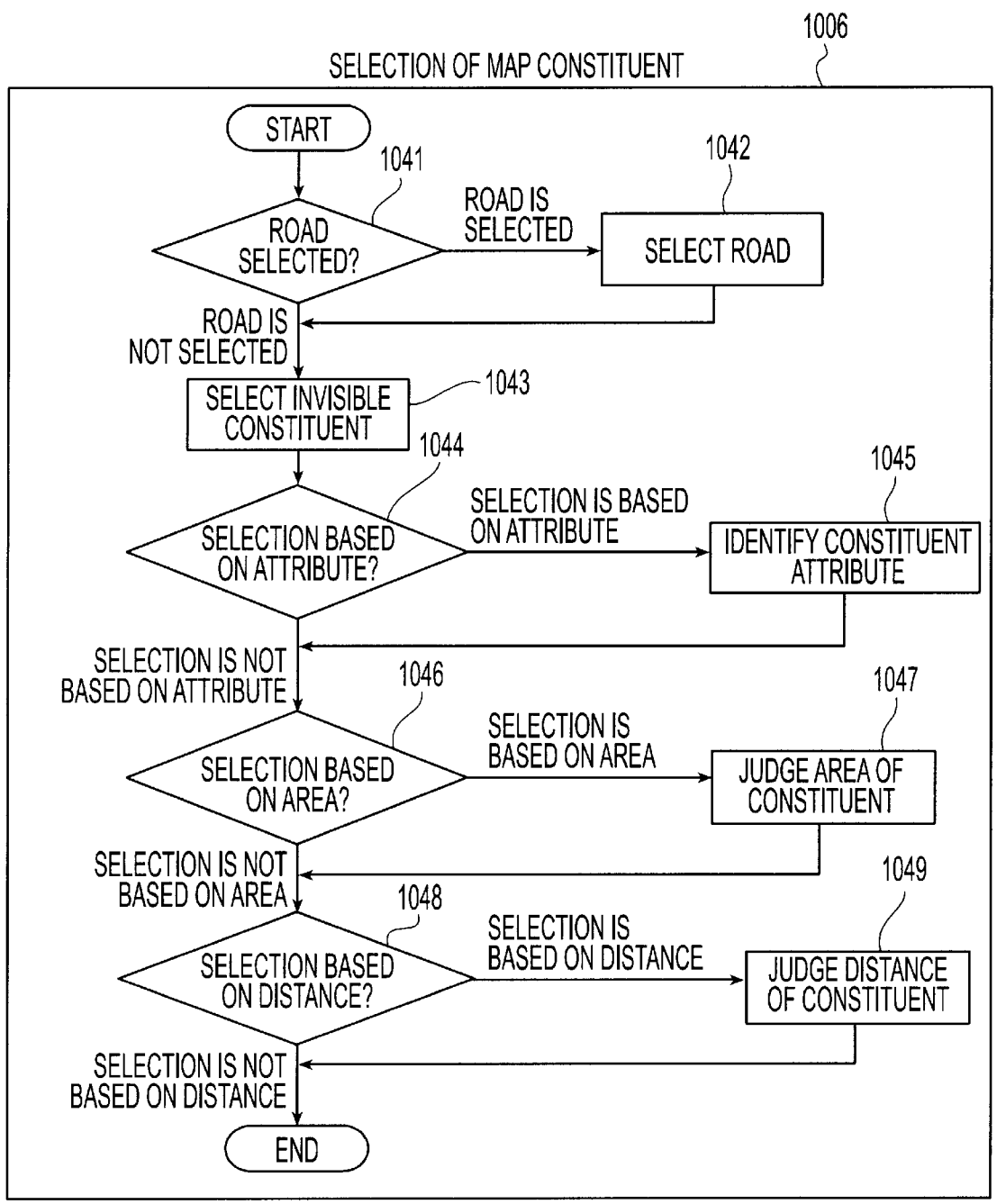
FIG. 9 is a flowchart showing constituent selection processing of FIG. 6.

FIG. 9 is a flowchart showing the map constituent selection processing.

First, the display parameter which is set through the input device 4 by the user or is set as default is read out to judge whether a map constituent in connection with a road is selected from map constituents which are read out from the map storage unit 3 by the data reading unit 48.

If the map constituent in connection with the road is judged to be selected, the processing goes to step 1042. On the other hand, if no map constituent associated with the road is selected, the processing goes to step 1043.

The judgment as to whether the map constituent is connected with the road is performed by referring to data which is read from the map storage unit 3 by the data reading unit 48 and used to specify the type of map constituent.

In step 1043, a map constituent which is partially or wholly located in an invisible area is selected from map constituents which are read from the map storage unit 3 by the data reading unit 48, and a mark which is partially or wholly located in the invisible area is selected from marks set in step 1001 of FIG. 6.

The judgment as to whether the map constituent and the mark are located in the invisible area is performed as follows. For example, when the hidden-surface removal processing in step 1003 of FIG. 6 is performed by the Z buffer method, the coordinate data in the depth direction of pixels constituting the surface of the map constituent or mark concerned which is subjected to the hidden-surface removal processing are compared with the coordinate data in the depth direction of pixels constituting the surface of the map constituent or mark concerned before the hidden-surface removal processing.

That is, if both are coincident with each other, the map constituent (mark) concerned is judged to be located in the invisible area. If both are not coincident with each other, the pixel data of the map constituent (mark) concerned is partially or wholly substituted by the pixel data of a map constituent or the like which is located in front of (nearer to the view point than) the map constituent (mark) concerned, so that the map constituent (mark) is judged to be located in the invisible area.

Subsequently, in step 1044 the display parameter which is set through the input device 4 by the user or is set as default is read out to judge whether the selection of map constituents (or marks) on the basis of the attribute from the map constituents or marks selected in step 1043 is performed.

When it is judged that the selection of the map constituents (or marks) on the basis of a predetermined attribute is performed, the processing goes to step 1045. If this is not the case, the processing goes to step 1046.

In step 1045, map constituents (marks) based on the attribute, which is set through the input device 4 by the user or is set as default, is selected from the map constituents (marks) selected in step 1043.

For example, when the map constituent of the destination is specified, the data of the map constituent of the destination is selected from the map constituents which are read from the map storage device 3 by the data reading unit 48.

Figure 23A:
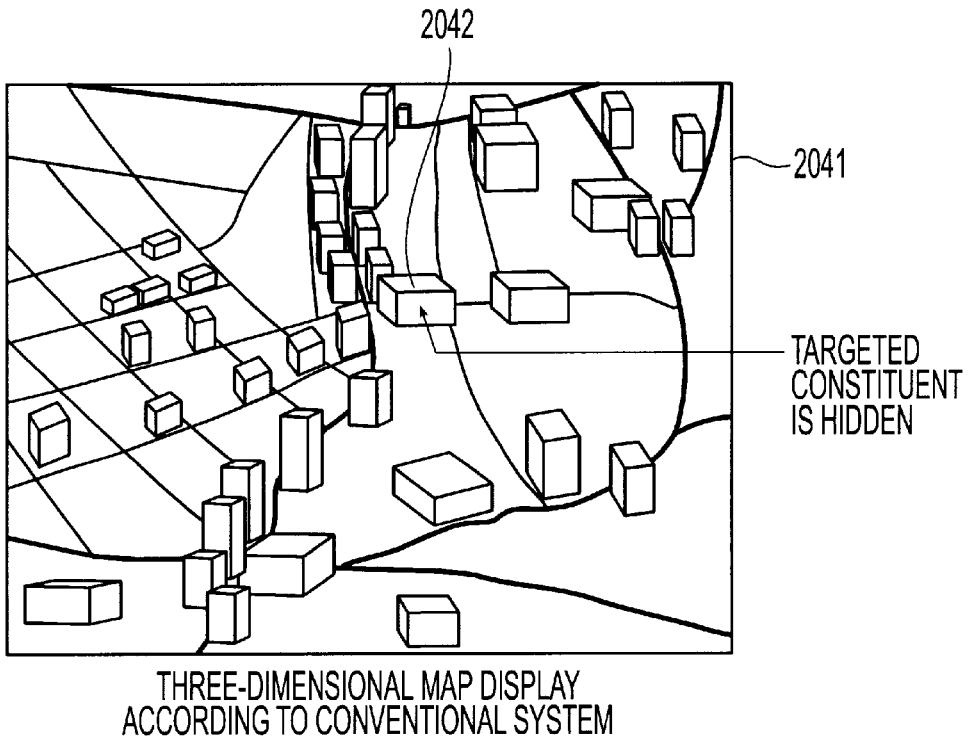
FIGS. 23A and 23B are diagrams each showing an example of a display frame including a target constituent.
Figure 23B:
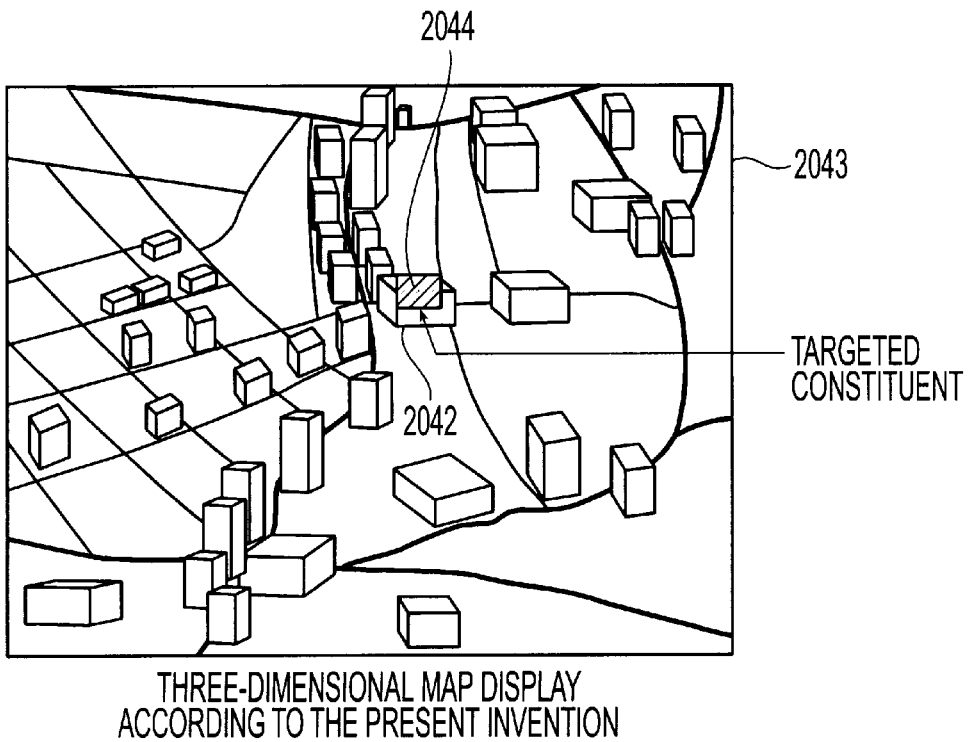

Through the above processing, even when the map constituent 2044 of the destination is hidden by a map constituent 2042 located in front of the map constituent 2044 as shown in FIG. 23A, the map constituent 2044 is displayed while the display attribute of the map constituent 2042 is altered as shown in FIG. 23B. Therefore, the map constituent of the attribute to be noted can be displayed.

The judgment as to whether the map constituent has a predetermined attribute is performed by referring to data specifying the type of map constituent which is read from the map storage unit 3 by the data reading unit 48.

Subsequently, in step 1046, the display parameter which is set through the input device 4 by the user or is set as default is read out to judge whether the selection of map constituents (marks) is performed on the basis of the area of a three-dimensional bird's-eye view map from the map constituents or marks selected in step 1043.

When it is judged that the map constituents (marks) located in a predetermined area of a three-dimensional bird's-eye view map are selected, the processing goes to step 1047. If this is not the case, the processing goes to step 1048.

In step 1047, map constituents or marks located in an area on a three-dimensional bird's-eye view map which is set through the input device 4 by the user or is set as default are selected from the map constituents or marks which are selected in step 1043.

With this processing of the map constituents and the marks located in the invisible area, only the information on map constituents and marks the user wants can be displayed on the display 2. Further, those map constituents and marks which do not need to be displayed are omitted, so that a display map becomes clear.

The judgment as to whether the map constituent (mark) is located in a predetermined area of the three-dimensional bird's-eye view map is performed on the basis of the two-dimensional coordinate data of the map constituents and marks which are obtained by the perspective transformation processing in step 1002 of FIG. 6.

Subsequently, in step 1048, the display parameter which is set through the input device 4 by the user or is set as default is read out to judge whether the selection of map constituents and marks is performed on the basis of the distance from the boundary line between a visible area and an invisible area from the map constituents or marks selected in step 1043.

When it is judged that the selection of the map constituents or marks within a predetermined distance from the boundary line is performed, the processing goes to step 1049. If this is not the case, the flow of FIG. 9 is ended.

In step 1049, those map constituents or marks which are located within a predetermined distance from the boundary line between the visible area and the invisible area, the distance being set through the input device 4 by the user, or is set as default, are selected from the map constituents or marks which are selected in step 1043.

Figure 22A:
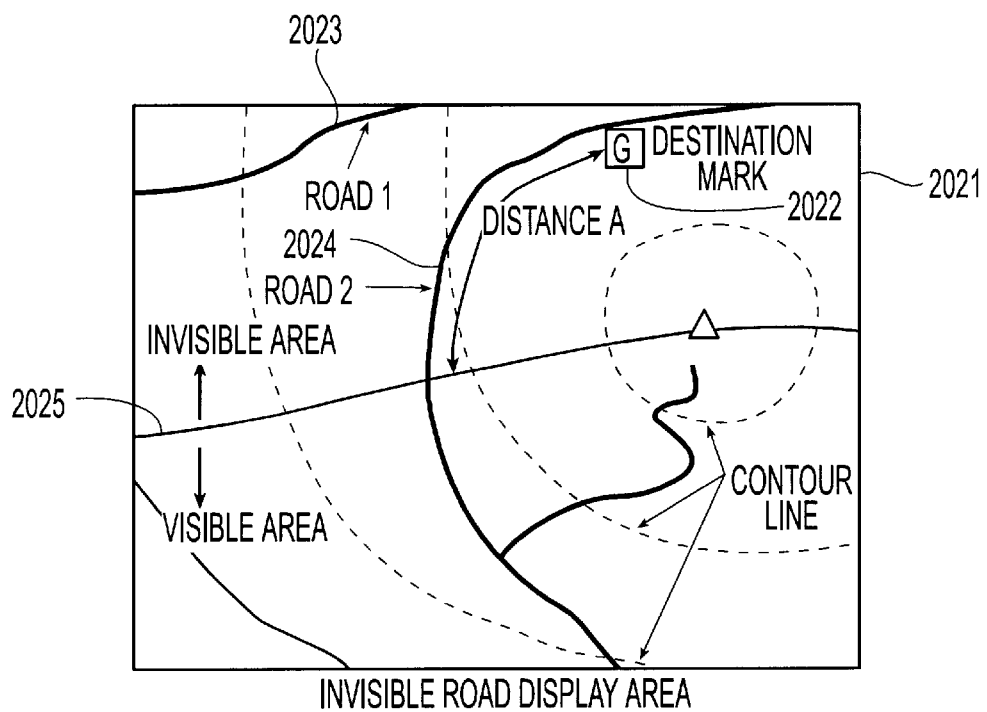
FIGS. 22A and 22B are diagrams each showing an example of a boundary line between a visible region and an invisible region.
Figure 22B:
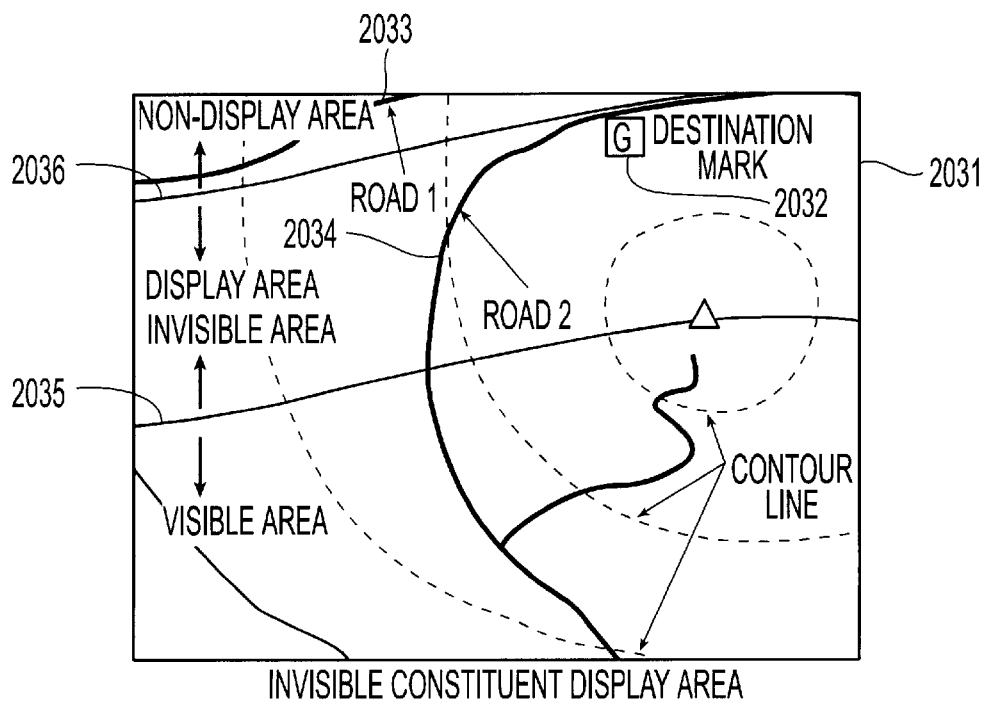

By performing the above processing as shown in FIG. 22B, for example, those map constituents or marks are selected which are located in an invisible area within a predetermined distance 2036 from the boundary line 2035 between the visible area and the invisible area.

Accordingly, a destination mark 2004 located within a predetermined distance 2036 from the boundary line 2035 is displayed as shown in FIG. 21B. Accordingly, of the map constituents and marks in an invisible area, only information (map constituents and marks) which the user wants to see can be displayed. In addition, map constituents and marks which do not need to be displayed are omitted from a display map, so that the display map is made clear to see.

The scan line method or the like may be used as a method for determining the boundary line between a visible area and an invisible area.

As described above, according to the scan line method, line segments of map constituents and marks which intersect each plane containing a scan line and a view point at the front most side of (nearest to the view point) are detected on the plane. Accordingly, an area located at a deep position (in a direction far away from the view point) of the line segments detected on the plane concerned is an invisible area, and thus the lines connecting the end portions of the respective segment lines detected on each plane are set as boundary lines.

The judgment as to whether the map constituent or mark is within a predetermined distance from the boundary line is performed by calculating the distance between the coordinate data in the depth (line of sight) direction of the map constituent or the mark and the coordinate data in the depth (line of sight) direction of the map constituent or the mark.

Next, the road selection processing in step 1042 of FIG. 9 will be described in detail with reference to FIG. 10.

Figure 10:
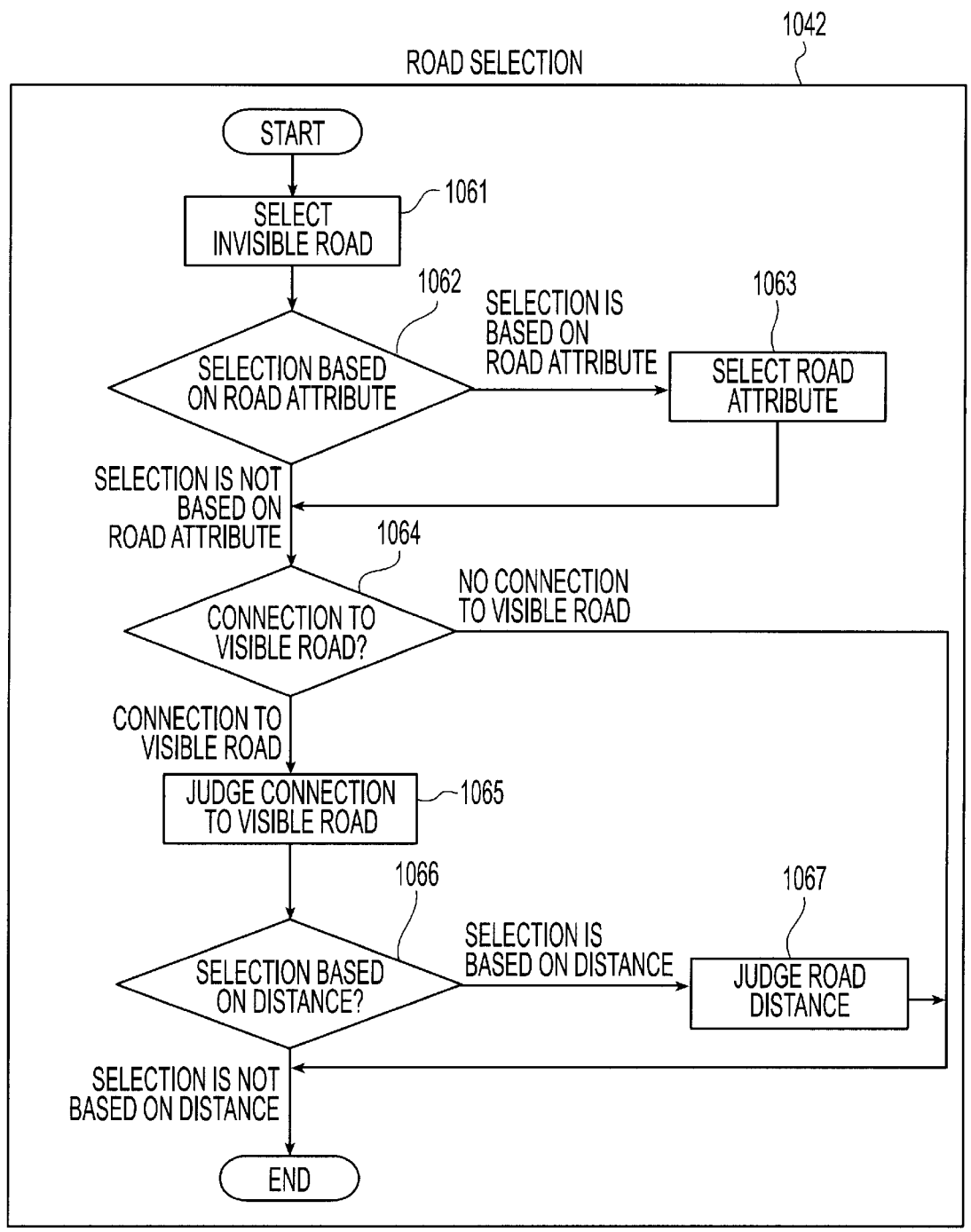
FIG. 10 is a flowchart showing road selection processing of FIG. 9.

FIG. 10 is a flowchart showing the road selection processing.

First, in the same manner as the above processing in step 1043, map constituents which are partially or wholly located in an invisible area are selected from map constituents which are read from the map storage unit 3 by the data reading unit 48, and then map constituents in connection with a road are selected from the selected map constituents by referring to data which specify the types of the map constituents (step 1061).

Next, the display parameter which is set through the input device 4 by the user or is set as default is read out to judge whether the road selection from the roads selected in step 1061 is performed on the basis of the attribute (step 1062).

When it is judged that the road selection is performed on the basis of a predetermined attribute, the processing goes to step 1063. If this is not the case, the processing goes to step 1064.

In step 1063, a road having an attribute which is set through the input device 4 by the user or is set as default is selected from the roads selected in step 1061.

Figure 24A:
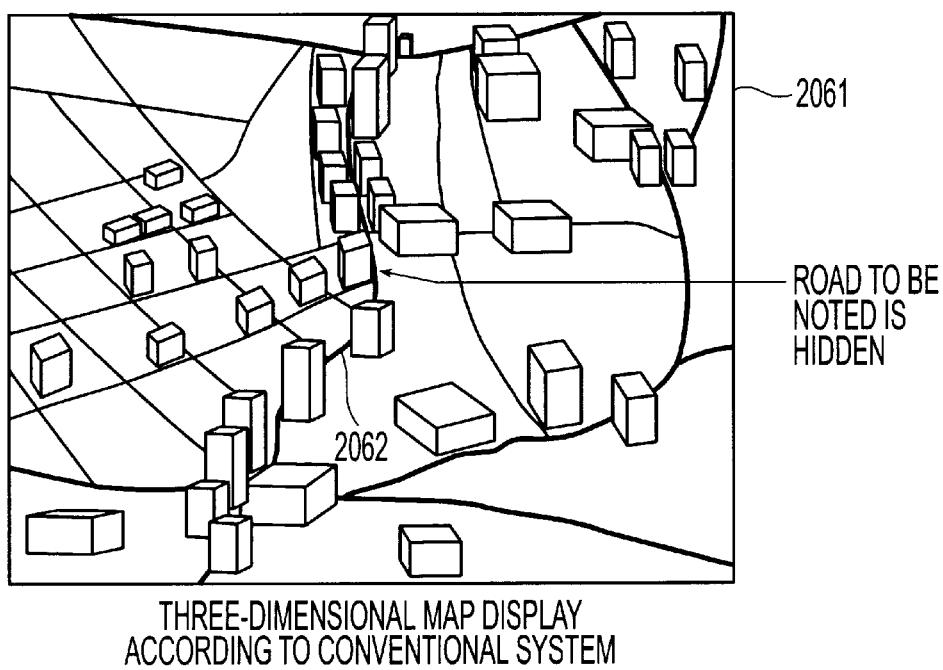
FIGS. 24A and 24B are diagrams each showing an example of a display frame displaying a target road.
Figure 24B:
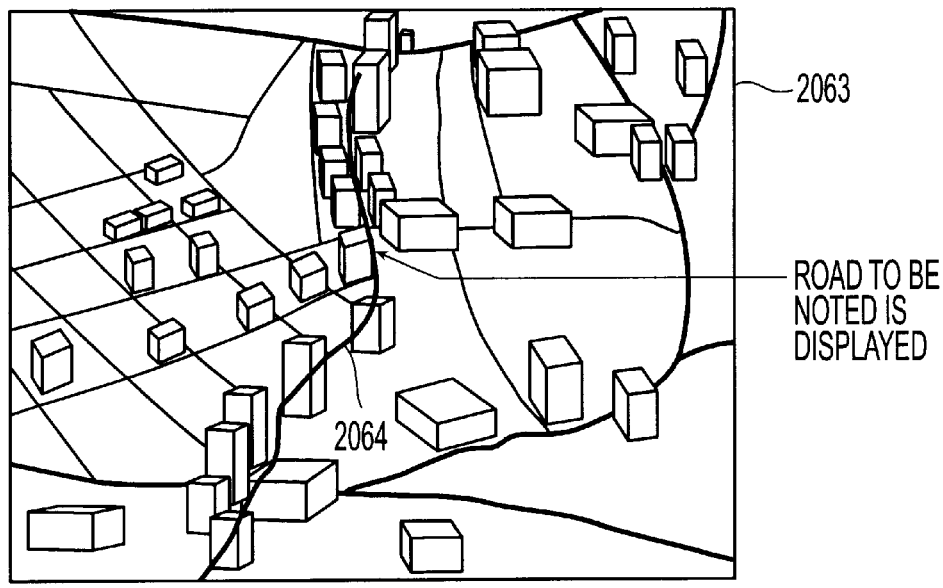

Through the above processing, as shown in FIG. 24A, even when a road 2062 having an attribute to be noted is hidden by a map constituent located in front of (nearer to the view point than) the road 2062 the display attribute of the road 2046 is altered in step 1008 of FIG. 6 to display the road 2064 as shown in FIG. 24B. Therefore, the road having the attribute which the user requests can be displayed at all times. The processing in step 1063 will be described later.

Subsequently, in step 1064, the display parameter which is set through the input device 4 by the user or is set as default is read out to judge whether the selection of a road to be connected to a road in a visible area is performed from the roads selected in step 1063.

If it is judged that a road to be connected to a road in a visible area is selected, the processing goes to step 1065. If not, the flow of FIG. 10 is ended.

In step 1065, a road to be connected to a road located in a visible area is selected from the roads selected in step 1061 or step 1063.

The judgment as to whether the road is connected to a road located in a visible area can be performed, for example by determining the boundary line between the visible area and the invisible area in the same manner as the processing in step 1048 of FIG. 9, and then selecting a road traversing the boundary line from the roads selected in step 1061 or step 1063.

Subsequently, in step 1066, the display parameter which is set through the input device 4 by the user or is set as default is read out to judge whether the selection of a road located within a predetermined distance from the connection boundary between the road concerned and a road in a visible area from the roads selected in step 1065 is performed.

If it is judged that the road selection as described above is performed, the processing goes to step 1067. If not, the flow shown in FIG. 10 is ended.

In step 1067, in the same manner as the processing of step 1049 of FIG. 9, a road within the predetermined distance from the connection boundary with a road located in a visible area is selected from the roads selected in step 1065.

With the processing shown in FIG. 10, for example as shown in FIG. 22A, a road which is located in an invisible area and connected to a road in a visible area, that is a road 2, is selected in step 1065. That is, a road 1 which is not connected to a road in a visible area is not selected.

Further, a road within a predetermined distance from the connection boundary with the road in the visible area, that is, a road 2024 which is spaced from the road 2 by a distance A, is selected in step 1067.

Accordingly, as show in FIG. 21A, the display attribute of the road 2005 located on the hidden surface in step 1008 of FIG. 6 is altered, and the road 2005 is displayed by a predetermined distance.

Next, the road attribute selection processing in step 1063 of FIG. 10 will be described in detail with reference to FIGS. 11 and 12.

Figure 11:
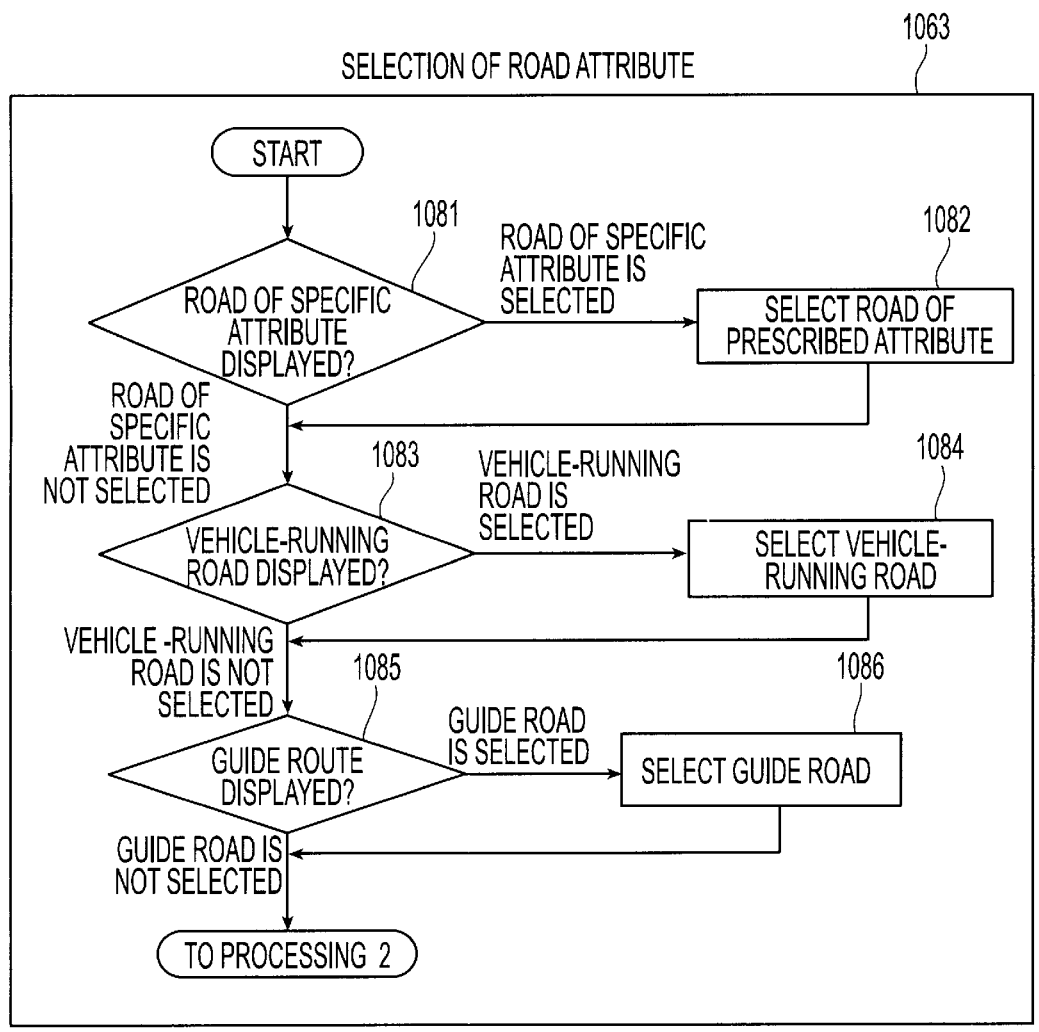
FIG. 11 is a flowchart showing road attribute selection processing of FIG. 10.
Figure 12:
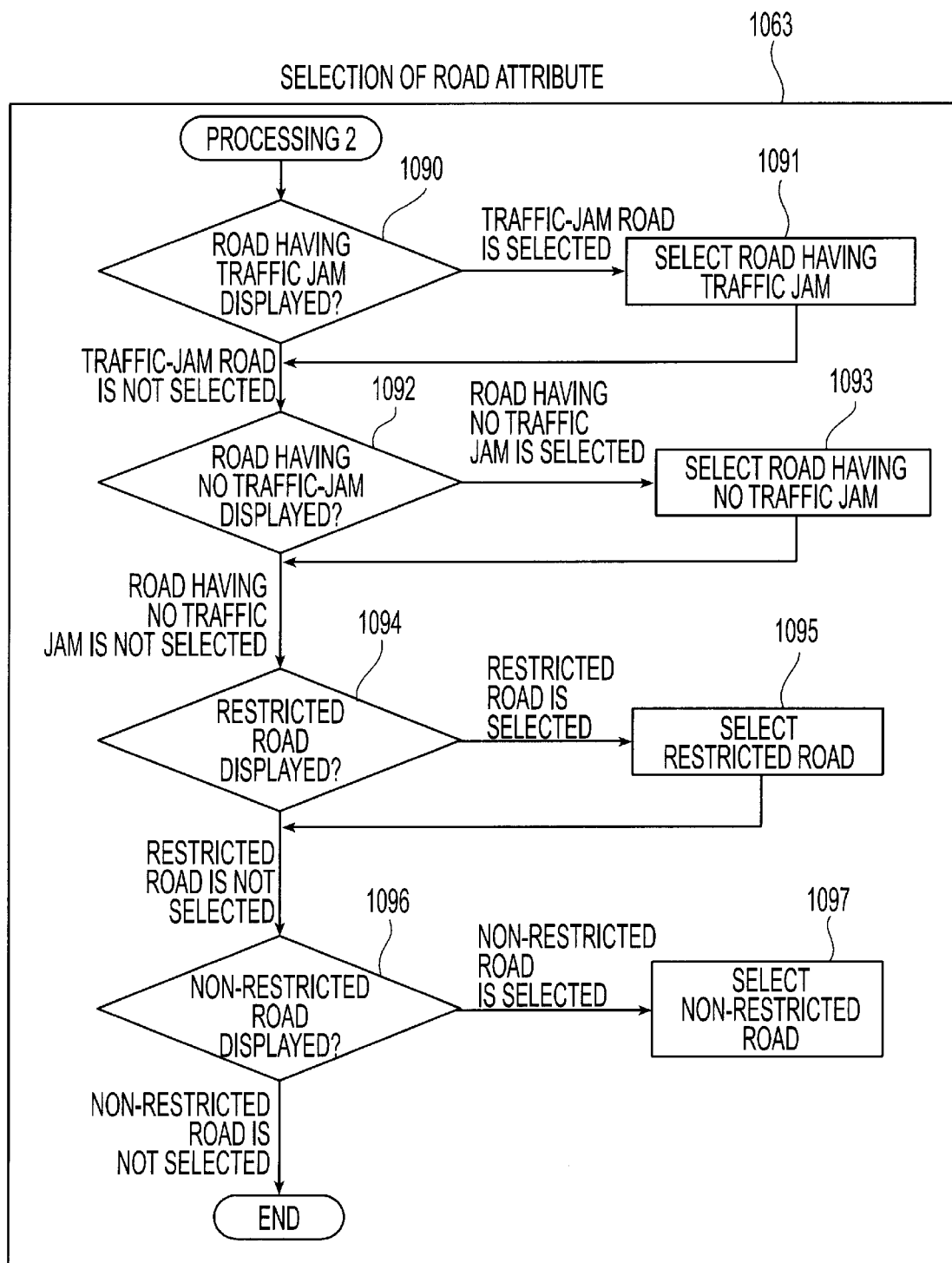
FIG. 12 is a flowchart showing road attribute selection processing continued from FIG. 10.

FIGS. 11 and 12 are flowcharts showing the road attribute selection processing.

First, the display parameter which is set through the input device 4 by the user or is set as default is read out to judge whether the selection of a road having a predetermined attribute from the roads selected in step 1061 is performed (step 1081). Here, the predetermined attribute represents the type of road, such as a highway, a national road or the like.

If it is judged that the selection of a road having a predetermined attribute is performed, the processing goes to step 1082. If not, the processing goes to step 1083. In step 1082, a road having the predetermined attribute is selected.

The judgment as to whether the road has the predetermined attributed is performed by referring to data for specifying the type of map constituent which is read from the map storage unit 3 by the data reading unit 48. With this processing, the display attribute of the road having the predetermined attribute in the invisible area in step 1008 of FIG. 6 is altered, so that this road is displayed on the display 2.

Therefore, the user can identify the road having a predetermined attribute in an invisible area.

Subsequently, the display parameter which is set through the input device 4 by the user or is set as default is read out to judge whether the selection of a road on which the vehicle runs from the roads selected in step 1061 is performed.

Here, the position information which is obtained by the current position calculator 46 and the map matching processor 47 is compared with the map information stored in the map storage unit 3 to determined a road on which the vehicle is running.

If it is judged that the selection of the road (current road) on which the vehicle is running is performed, the processing goes to step 1084. If not, the processing goes to step 1085.

In step 1084, the road on which the vehicle is running is selected from the roads selected in step 1061.

When the selection of the current road (on which the vehicle is running) is performed, a road on which the position obtained by the current position calculator 46 and the map matching processor 47 exists, and also which is located within a predetermined distance from the current position may be selected as the current road.

Through the above processing, the display attribute of the road on which the vehicle is running and which is located in an invisible area in step 1008 of FIG. 6 is altered, whereby the road is displayed on the display 2. Accordingly, the user can identify the road in the invisible area on which the vehicle is running.

Subsequently, the display parameter which is set through the input device 4 by the user or is set as default is read out to judge whether the selection of a road for a guide route from the roads selected in step 1061 is performed.

Here, the road for a guide route is obtained by accessing the route storage unit 43 for storing a calculation result of an optimum route from the current position at the time the route calculation of the route calculator 42 is started to the destination.

When it is judged that the selection of the road for guide route is performed, the processing goes to step 1086. If not, the processing goes to step 1090 of FIG. 12.

In step 1086, the road for a guide route is selected from the roads selected in step 1061. Through the above operation, the display attribute of the road for a guide route, which is located in an invisible area in step 1008 of FIG. 6 is altered, so that the road is displayed on the display 2. Accordingly, the user can identify the road for a guide route in the invisible area.

In step 1090 of FIG. 12, the display parameter which is set through the input device 4 by the user or is set as default is read out to judge whether the a road having a traffic jam is selected from the roads selected in step 1061.

Here, the road having a traffic jam is determined by analyzing a signal which is received by the traffic information receiver 10. As media for transmitting the traffic information an FM multiplexing broadcast which is modulated to a sub-carrier of FM broadcasting and transmitted, a radio wave beacon signal which is mounted on a road and adapted to modulate sub-microwave, or an optical beacon signal for modulating light waves may be used.

If it is judged that the road having traffic jam is selected, the processing goes to step 1091. If not, the processing goes to step 1092.

In step 1091, a road having traffic jam is selected from the roads selected in step 1061. Through this processing, the display attribute of the road having traffic jam in an invisible area in step 1008 of FIG. 6 is altered, so that the road is displayed on the display 2. Accordingly, the user can identify the road which has a traffic jam and is located in an invisible area.

Subsequently, in step 1092, the display parameter which is set through the input device 4 by the user or set as default is read out to judge whether a road which does not have a traffic jam is selected from the roads selected in step 1061.

The road which does not have a traffic jam can be known by analyzing the signal received from the traffic information receiver 10. If it is judged that the road having no traffic jam is selected, the processing goes to step 1093. If not, the processing goes to step 1094.

In step 1093, a road having no traffic jam is selected from the roads selected in step 1061. Through this processing, the display attribute of a road which is in an invisible area and which has no traffic jam is altered, so that this road is displayed on the display 2. Accordingly, the user can judge whether the road in the invisible area does not have a traffic jam.

Subsequently, in step 1094 the display parameter which is set through the input device 4 by the user or is set as default is read out to judge whether a restricted road is selected from the roads selected in step 1061.

The restricted road is known by analyzing a signal which is received by the traffic information receiver 10. As media for transmitting the traffic information an FM multiplexing broadcast which is modulated to a sub-carrier of FM broadcasting and transmitted, a radio wave beacon signal which is mounted on a road and adapted to modulate sub-microwaves, or an optical beacon signal for modulating light waves may be used.

If it is judged that the restricted road is selected, the processing goes to step 1095. If not, the processing goes to step 1095.

In step 1095, the restricted road is selected from the roads selected in step 1061. Through the above processing, the display attribution of the restricted road which is located in the invisible area in step 1008 in FIG. 6 is altered, so that the restricted road is displayed on the display 2. Accordingly, the user can identify the restricted road in the invisible area.

Subsequently, in step 1096, the display parameter which is set through the input device 4 by the user or is set as default is read out to judge whether a road which is not restricted is selected from the roads selected in step 1061.

The road having no restriction is known by analyzing the signal received by the traffic information receiver 10. If it is judged that the restricted road is selected, the processing goes to step 1097. If not, the flow shown in FIGS. 11 and 12 is ended.

In step 1097, the non-restricted road is selected from the roads selected in step 1061. Through this processing, the display attribute of the non-restricted road which is located in an invisible area in step 1008 of FIG. 6 is altered, so that this road is displayed on the display 2. Accordingly, the user can identify the non-restricted road in the invisible area.

Next, the display attribute alteration processing in steps 1008 and 1011 will be described in detail with reference to FIG. 13.

Figure 13:
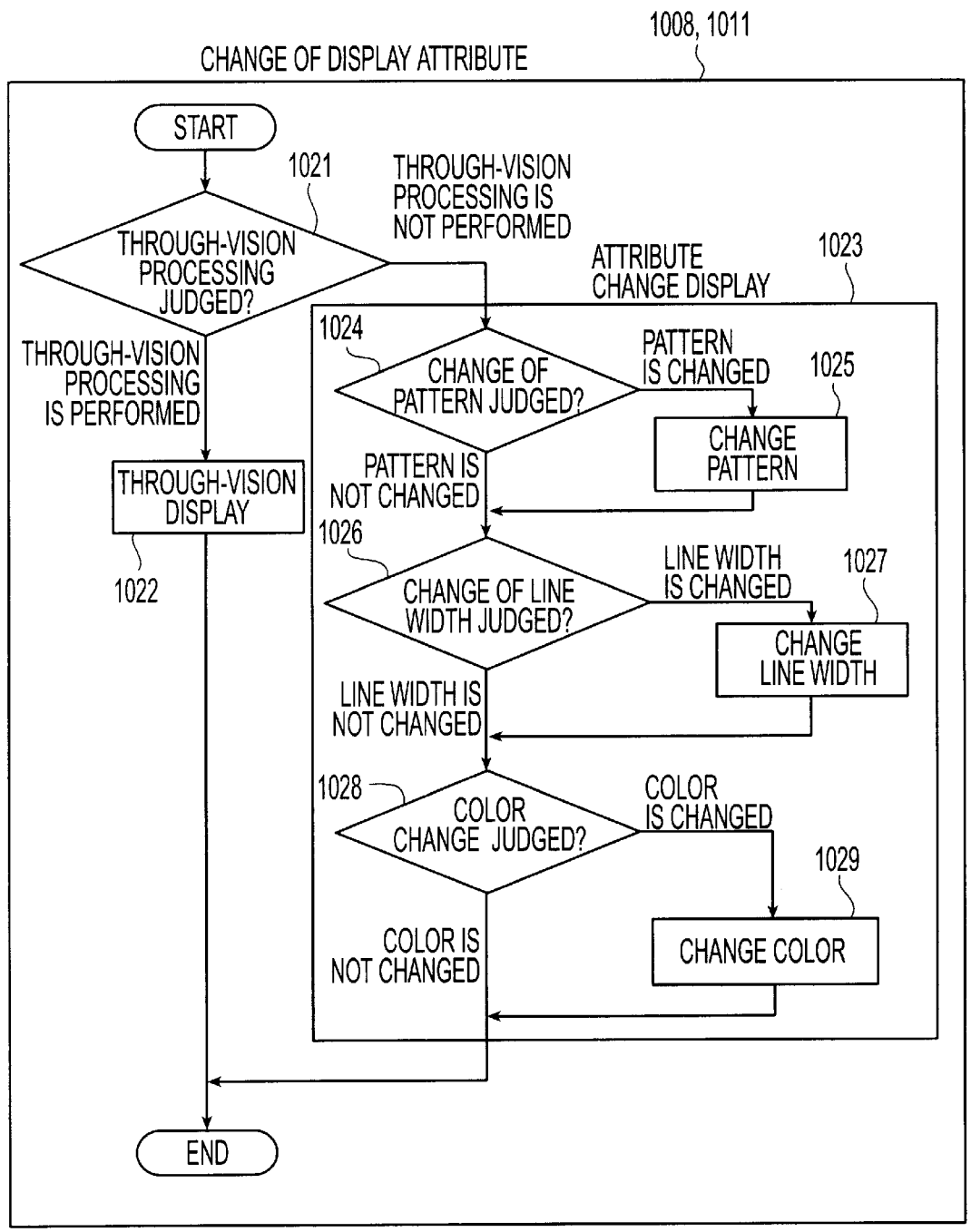
FIG. 13 is a flowchart showing display attribute altering processing of FIGS. 6 and 7.

FIG. 13 is a flowchart showing the display attribute alteration processing.

First, in step 1021, a method for presenting map constituents or marks located in an invisible area are read out from the display parameter which is set through the input device 4 by the user or set as default.

When a through-vision display mode is specified, the processing goes to step 1022. If an attribute alteration display mode is specified, the processing goes to step 1023.

In step 1022, the map constituent in the invisible area which is selected in step 1006 of FIG. 6 is displayed in the through-vision display mode. The color of the map constituent in the invisible area which is to be displayed in the through-vision display mode so that it can be seen at predetermined transmittance is calculated and set on the basis of the color information of the map constituent which is determined in step 1004 and is to be displayed in the through-vision display mode, and the color information of a map constituent by which the map constituent in the invisible area is hidden.

This processing is called "α-blending". The processing for a blending is given by the following equation (3):

$$(R_s S_r + R_d D_r,\ G_s S_g + G_d D_g,\ B_s S_b + B_d D_b,\ A_s S_a + A_d D_a)$$

Here, Rs, Gs, Bs, As represent the brightness values of R(Red), G(Green), B(Blue) and an A(α) value of a source (i.e., an image to be drawn), and Rd, Gd, Bd, Ad represent the brightness values of R(Red), G(Green), B(Blue), and an A(α) value of a destination, that is, an area to be drawn. Dr, Dg, Db, Da represent the mixing ratio of the source and the destination. The color information of a map constituent which is requested to be displayed in the through-vision display mode is set to the source side while the color information of another map constituent by which the former map constituent is hidden is set to the destination side, and these map constituents are subjected to the α-blending processing at a predetermined transmittance (for example, 50% at the source side and 50% at the destination side) by using the equation (3), whereby the through-vision display can be performed.

The same calculation is also usable when a target to be displayed in the through-vision display mode is a mark.

By using the color information thus obtained, the map drawing command is generated to draw the map constituent or mark in the invisible area which is selected in step 1006 of FIG. 6. Accordingly, the map constituent or mark located in the invisible area can be displayed in the through-vision display mode.

In step 1023, the display attribute of the map constituent or mark selected in step 1006 of FIG. 6 for the display 2 is altered.

In step 1024, according to the display parameter which is set through the input device 4 by the user or is set as default, it is judged whether a map constituent or mark in an invisible area is subjected to pattern alteration processing and then displayed.

When the pattern alteration processing is instructed in the display parameter, the processing goes to step 1025 to set an attribute so that the surfaces and lines constituting the map constituents or marks selected in step 1006 of FIG. 6 are displayed in a predetermined pattern. An example of a display in this case is shown in FIG. 21B.

This is the case where the selected road 2005 in the invisible area is replaced by a dotted line. The road 2005 in the invisible area is displayed with an attribute different from that of the road 2006 in the visible area.

In step 1026, on the basis of the display parameter which is set through the input device 4 by the user or is set as default, it is judged whether the map constituent or mark in the invisible area which is selected in step 1006 of FIG. 6 is displayed while the line width thereof is changed (step 1026).

When the change of the line width is instructed in the display parameter, the processing goes to step 1027 to set the attribute so that the line constituting the map constitute or mark selected in step 1006 of FIG. 6 is displayed so as to have a predetermined width.

In step 1028, on the basis of the display parameter which is set through the input device 4 by the user or is set as default, it is judged whether the color of the surface or line constituting the map constituent or mark in the invisible area which is selected in step 1006 of FIG. 6 is changed for display.

If the color change is instructed in the display parameter, the processing goes to step 1029 to set the attribute so that the surface or line constituting the map constituent or mark in the invisible area which is selected in step 1006 of FIG. 6 is displayed with a predetermined color.

A specific display example is shown in FIG. 21B. This is the case where the destination mark 2004 in the invisible area is displayed while its color is changed from the surrounding area.

Through the above display attribute alteration processing, by displaying a map constituent or mark in an invisible area in the through-vision display mode or by changing the display attribute of the map constituent or mark for display, it can be readily known at a glance whether any map constituent or mark is located in an invisible area or a visible area. Therefore, the operability of the device is further enhanced.

Next, a first modification of the three-dimensional map bird's-eye view display unit 66 will be described in detail with reference to FIG. 14. 14 is a flowchart showing the operation of the first modification of the three-dimensional bird's-eye view display unit 66.

Figure 14:
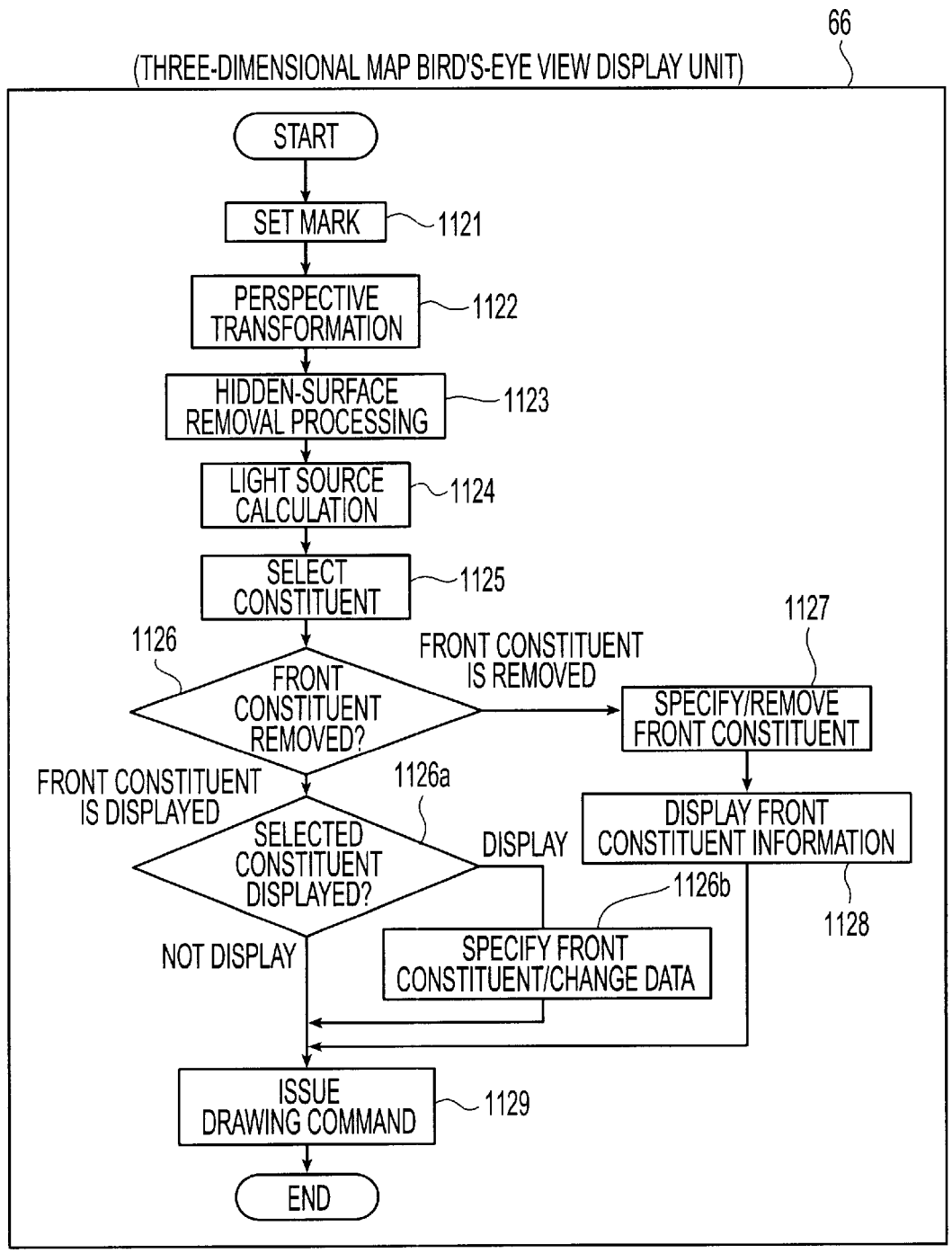
FIG. 14 is a flowchart showing the operation of a first modification of the three-dimensional map bird's-eye view display unit of FIG. 5.

In the flowchart of FIG. 14, the processing of steps 1121 to 1124 is similar to the processing of steps 1001 to 1004 of FIG. 6, the processing of step 1125 is similar to the processing of step 1006 of FIG. 6, and the processing of step 1129 is similar to the processing of step 1005 of FIG. 6. Accordingly, the detailed description on the processing of steps 1121 to 1125 and the processing of step 1129 is omitted.

In step 1126, the display parameter which is set through the input device 4 by the user or is set as default is read out to judge removal or non-removal of a map constituent which is located in front of (nearer to the view point than) a map constituent or mark selected in step 1125 so as to cover the map constituent or mark selected in step 1125.

If the front map constituent is removed, the processing goes to step 1127, and If not, the processing goes to step 1126a.

In step 1126a, the display parameter which is set through the input device 4 by the user or is set as default is read out to judge whether the map constituent or mark selected in step 1125 is displayed on the display 2. If the map constituent or mark is judged to be displayed, the processing goes to step 1126b. If not, the processing goes to step 1129.

In step 1126b, the map constituent located in front of the map constituent or mark selected in step 1125 is specified (the map constituent thus specified is hereinafter referred to as "front map constituent").

Here, the specification of the front map constituent is performed as follows.

First, the two-dimensional coordinate data on the two-dimensional plane (projection plane) of each of the map constituents and marks obtained through the perspective transformation processing in step 1122 are checked to extract a map constituent which is overlapped with the map constituent or mark selected in step 1125 on the projection plane.

Subsequently, the coordinate data in the depth (line of sight) direction of the map constituent or mark selected in step 1125 are compared with the coordinate data in the depth (line of sight) direction of the extracted map constituent, and if the extracted map constituent is located in front of (nearer to the view point than) the map constituent or mark selected in step 1125, the extracted map constituent is specified as the front map constituent.

Further, in step 1126b, out of the coordinate data of the map constituents and the marks which are subjected to the perspective transformation in step 1122, the coordinate data in the depth (line of sight) direction of the map constituent or mark selected in step 1125 are rewritten so that the map constituent or mark concerned is located in front of the front map constituent. Thereafter, the processing of steps 1123 and 1124 is performed again.

Accordingly, on the basis of the map drawing command generated in step 1129, the graphics processor 51 can display on the display 2 such a three-dimensional bird's-eye view map that the map constituent or mark which is requested to be displayed by the user is drawn in front of the front map constituent. For example, as shown in FIG. 25A, a route guidance mark 2084 is displayed in front of a building 2082 and a tree 2083 which originally stand in front of the route guidance mark 2086.

On the other hand, in step 1127, in the same manner as the above step 1126b, a front map constituent which is originally located in front of the map constituent or mark selected in step 1125 is specified, and then the three-dimensional data of the front map constituent is removed from the three-dimensional data of the map constituents which are read in from the map storage unit 3 by the data reading unit 48. The front map constituent specify/remove processing will be described later.

In step 1127, the processing of steps 1122 to 1124 is performed again on the basis of the three-dimensional data of the map constituents which are read in from the map storage unit 3 and from which the three-dimensional data of the front map constituents are removed, and the data of the mark set in step 1121.

Figure 25B:
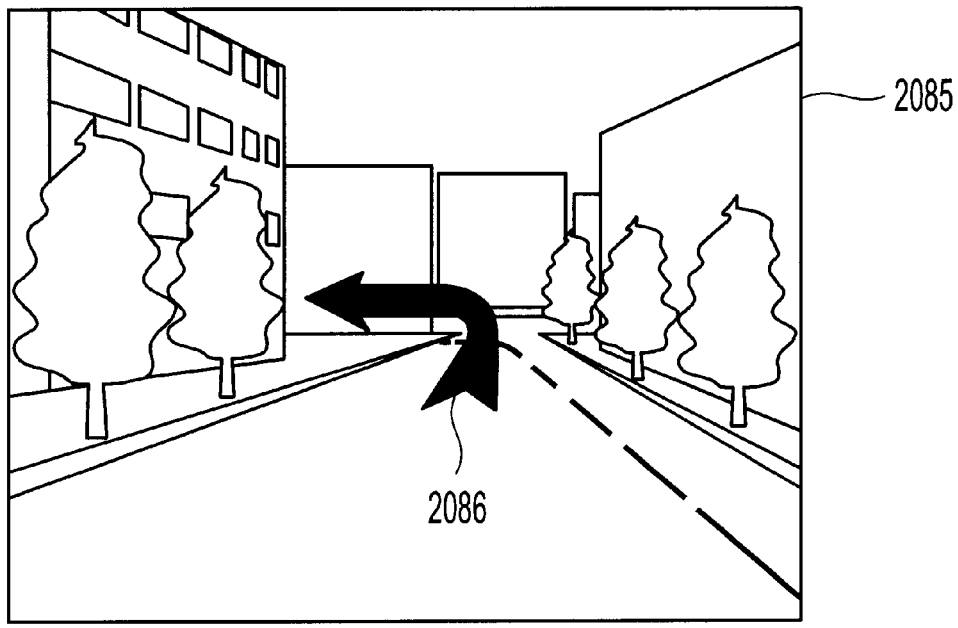

Accordingly, on the basis of the map drawing command generated in step 1129, the graphics processor 51 can display on the display 2 such a three-dimensional bird's-eye view map that the map constituent or mark which is requested to be displayed by the user is displayed while the front map constituents thereof are removed. For example, as shown in FIG. 25B, front map constituents such as a building and a tree by which the route guidance mark 2086 is hidden are removed, and the route guidance mark 2086 which is needed by the user is displayed on the display 2 is displayed on the display 2.

In step 1128, the information on the frontmost front map constituents is displayed in place of the front map constituents which are removed in step 1127.

Figure 15:
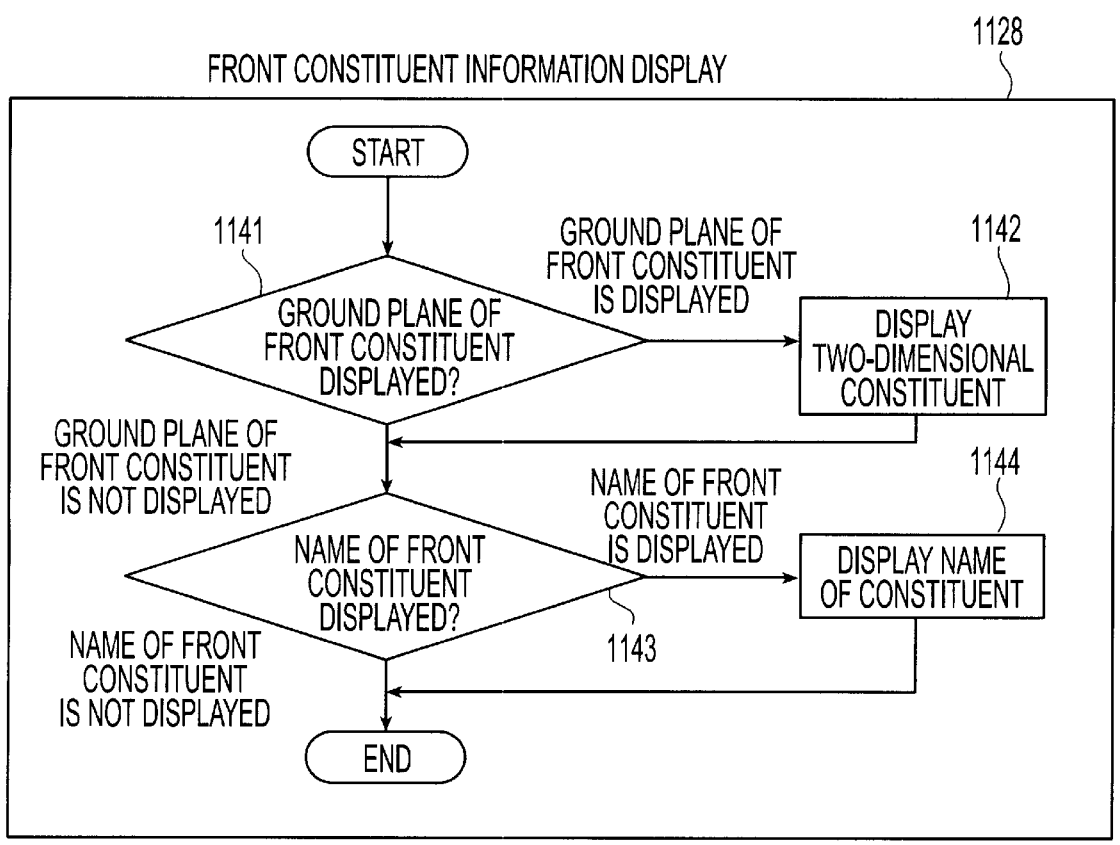
FIG. 15 is a flowchart showing front constituent information display processing of FIG. 14.

The front map constituent information display processing in step 1128 will be described in detail with reference to FIG. 15. FIG. 15 is a flowchart showing the front map constituent information display processing.

First, in step 1141, the display parameter which is set through the input device 4 by the user or is set as default is read out to judge whether the ground plane occupied by the map constituent removed in step 1127 of FIG. 14 is displayed on the display 2.

If the ground plane is judged to be displayed, the processing goes to step 1142. If not, the processing goes to step 1143.

In step 1142, the ground plane of the removed front map constituent is obtained, and the ground plane is displayed with a predetermined attribute (color, pattern, etc.) on the display 2.

First, the three-dimensional data of the front map constituent removed in step 1127 are read in from the map storage unit 3, and the data in the latitude (X) direction and the data in the longitude (Y) direction on the ground plane (Z=0) are extracted from the read-in three-dimensional data.

Subsequently, the data in the latitude (X) and longitude (Y) directions of the extracted front map constituent and the data in the height direction (Z=0) of the ground plane are subjected to the perspective transformation in the same manner as the processing of step 1122 to calculate the two-dimensional coordinate data which are obtained when the ground plane occupied by the front map constituent is projected onto the two-dimensional plane (projection plane) from the view point which is set in the view-point position setting unit 62.

Therefore, on the basis of the map drawing command generated in step 1129, the graphics processor 51 can display the ground plane occupied by the front map constituent on the display 2.

Figure 26A:
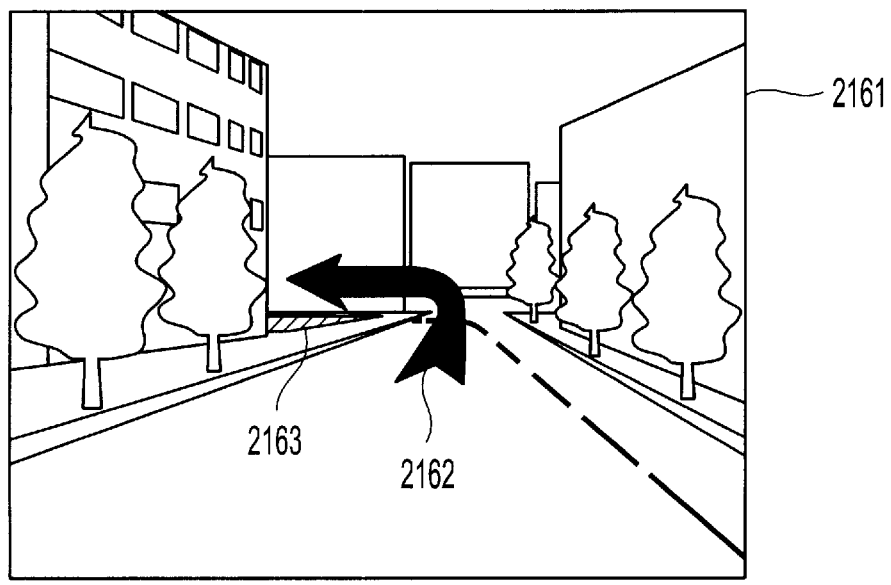
FIGS. 26A and 26B are diagrams each showing an example of a display frame when a guide mark is displayed.

A specific display example is shown in FIG. 26A. In this case, the building 2082 and the tree 2083 by which the display-requested guide mark is covered and hidden are deleted from the three-dimensional bird's-eye view map shown in FIG. 25A, and the ground plane 2163 representing the existence of the building is displayed in an area where the building exists.

Such a display enables the user to know whether the deleted map constituent exists and where it exists, and prevents the user from not recognizing something due to the map display with the front map constituent being deleted from the map.

Subsequently, in step 1143, the display parameter which is set through the input device 4 by the user or is set as default is read out to judge whether the name of the front map constituent removed in step 1127 of FIG. 14 is displayed on the display 2.

When the name of the removed front map constituent is judged to be displayed, the processing goes to step 1144. If not, the flow shown in FIG. 15 is ended.

In step 1144, the ground plane of the front map constituent which is removed in the same manner as the processing of step 1142 is determined, and the mark is set so that the name of the front map constituent is displayed in the neighborhood of the ground plane.

The name of the front map constituent is determined on the basis of the type of the front map constituent which is read in from the map storage unit 3 by the data reading unit 48.

By the above processing, on the basis of the map drawing command generated in step 1129, the graphics processor 51 can display the name of the front map constituent in the neighborhood of the position which is originally occupied by the front map constituent.

Figure 26B:
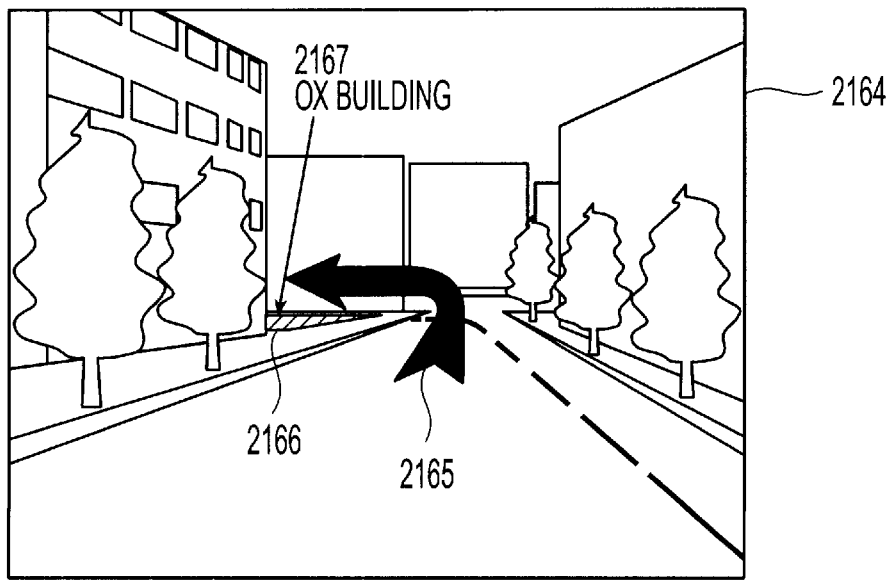

A specific display example is shown in FIG. 26B. This is a case where the building 2082 and the tree 2083 by which the display-requested guide mark is covered and hidden are deleted from the three-dimensional bird's-eye view map, and the ground plane 2166 representing the existence of the building and the name 2167 of the building are displayed in an area where the building stands.

With such a display, the user can readily know what the deleted map constituent is. Therefore, the user can be prevented from not recognizing something caused by the deletion of the map constituent from the map.

Next, the front map constituent specify/remove processing in step 1127 will be described in detail with reference to FIG. 16.

Figure 16:
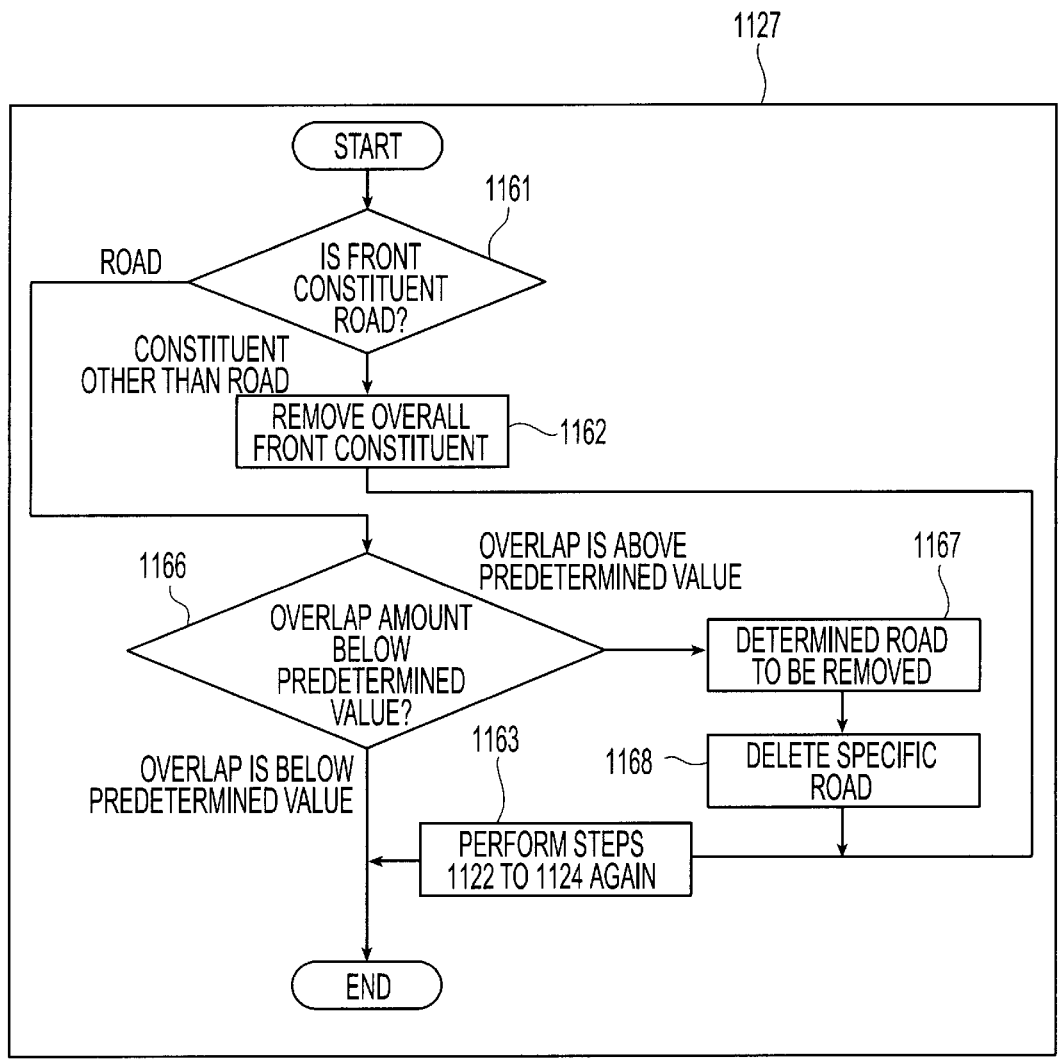
FIG. 16 is a flowchart showing front constituent specify/remove processing of FIG. 14.

FIG. 16 is a flowchart showing the front map constituent specify/remove processing.

First, in step 1161, the attribute of the front map constituent which is specified is identified. If the attribute represents a road, the processing goes to step 1166. If not, the processing goes to step 1163.

Here, the judgment of the attribute is performed on the basis of the data specifying the type of the front constituent which is read in from the map storage unit 3 by the data reading unit 48.

In step 1162, the three-dimensional data of the front map constituent are removed from the three-dimensional data of the map constituents which are read in from the map storage unit 3 by the data reading unit 48, and then the processing goes to step 1163.

In step 1166 the overlap amount between the map constituent or mark selected in step 1125 of FIG. 14, and a road which is located in front of (nearer to the view point than) the map constituent or mark and covers the map constituent or mark is determined.

The detection of the overlap amount is performed on the basis of the two-dimensional coordinate data on the projection plane of the map constituent or mark selected in step 1125 of FIG. 14 and the two-dimensional coordinate data on the projection plane of the road which is the front map constituent.

If the overlap amount is below a predetermined value, the map constituent or mark selected in step 1125 of FIG. 14 is estimated to be overlapped with the road corresponding to the front map constituent because it is at a multilevel crossing or the like. Accordingly, in such a case, it is unnecessary to remove the road corresponding to the front map constituent, and thus the flow of FIG. 16 is ended. On the other hand, if the overlap amount is above the predetermined value, the processing goes to step 1167.

In step 1167, a removing range is determined for the road which is the front map constituent of the map constituent or mark selected in step 1125 of FIG. 14. Here, the removing range may be limited to a place which is located within a predetermined distance from the current position which is determined by the map matching processor 47. Accordingly, a road which is overlapped with an area to be originally noted is removed, so that the user can obtain more information in the vicinity of the current position.

In step 1168, the three-dimensional data of a portion in an area which is a part of the road (i.e., the front map constitute) and located within a predetermined distance from the current position (an area which is specified on the basis of the latitude and longitude values) are removed from the three-dimensional data of the map constituents which are read in from the map storage unit 3 by the data reading unit 48. Thereafter, the processing goes to step 1163.

In step 1163, the processing of steps 1122 to 1124 of FIG. 14 is performed again on the basis of the three-dimensional data of the map constituents and the marks which are obtained through the processing of steps 1162 or 1168.

By the above processing, on the basis of the map drawing command generated in step 1129, the graphics processor 51 can display on the display 2 a three-dimensional bird's-eye view map from which the front map constituent is removed and in which the map constituents and the marks which are requested to be displayed by the user are drawn.

Figure 27B:
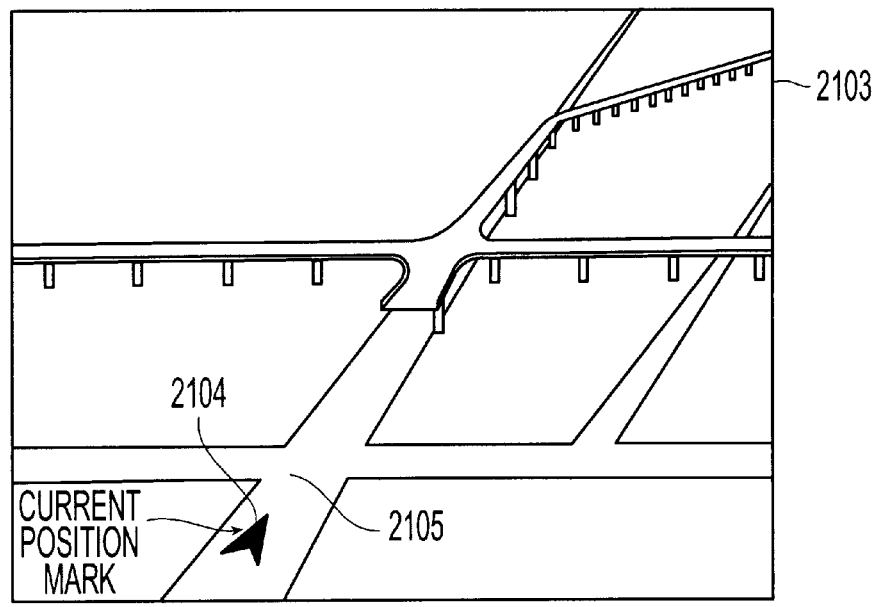

For example, when the processing of steps 1122 to 1124 is performed again on the basis of the three-dimensional data of the map constituents and the marks obtained through the processing of step 1168, the road corresponding to the front map constituent of the mark 2104 is displayed while a predetermined portion thereof is deleted as shown in FIG. 27B. Therefore, the user can obtain the three-dimensional bird's-eye view map having the detailed information on the peripheral portion of the current position.

Next, a second modification of the three-dimensional map bird's-eye view display unit 66 will be described in detail with reference to FIG. 17.

Figure 17:
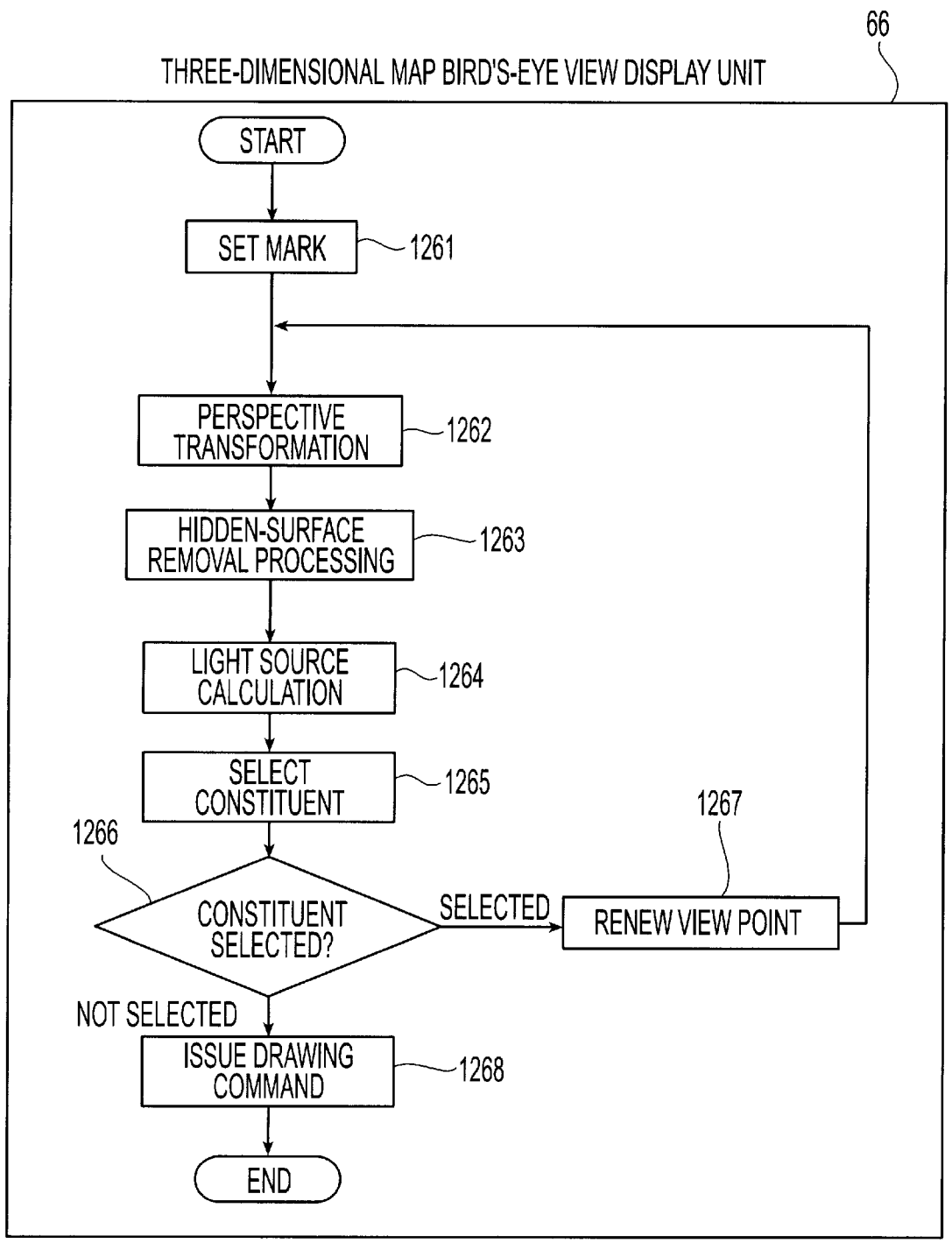
FIG. 17 is a flowchart showing the operation of a second modification of the three-dimensional map bird's-eye view display unit of FIG. 5.

FIG. 17 is a flowchart showing the operation of the second modification of the three-dimensional map bird's-eye view display unit 66.

In the flowchart of FIG. 17, the processing of steps 1261 to 1264 is similar to the processing of steps 1001 to 1004 shown in FIG. 6, the processing of step 1265 is similar to the processing of step 1006 of FIG. 6, and the processing of step 1268 is similar to the processing of step 1005 of FIG. 6. Accordingly, the detailed description of the processing of steps 1261 to 1265 and 1268 is omitted.

In step 1266, it is judged whether any map constituent or mark in the invisible area is selected in step 1265. If it is selected, the processing goes to step 1267. If not, the processing goes to step 1268.

In step 1267, an instruction is output to the view-point position setting unit 62 to reset the view-point position. Specifically, the resetting is performed so that the height position of the view point is increased, that is, the coordinate value in the height (Z) direction of the view point is increased. Alternatively, the resetting is performed so that the view point is made to approach the map constituent or mark selected in step 1265.

By using the view-point position information thus reset, the processing of steps 1262 to 1266 is performed again. The processing of steps 1262 to 1266 is repeated until no map constituent or mark in the invisible area is selected in step 1265.

By the above processing, on the basis of the map drawing command generated in step 1268, the graphics processor 51 can display on the display 2 a three-dimensional bird's-eye view map which is obtained by viewing the map from the view-point position at which the map constituent or mark which is requested to be displayed by the user can be viewed. Accordingly, more information which the user needs can be provided at all times.

Next, a third modification of the three-dimensional map bird's-eye view display unit 66 will be described in detail with reference to FIG. 18.

Figure 18:
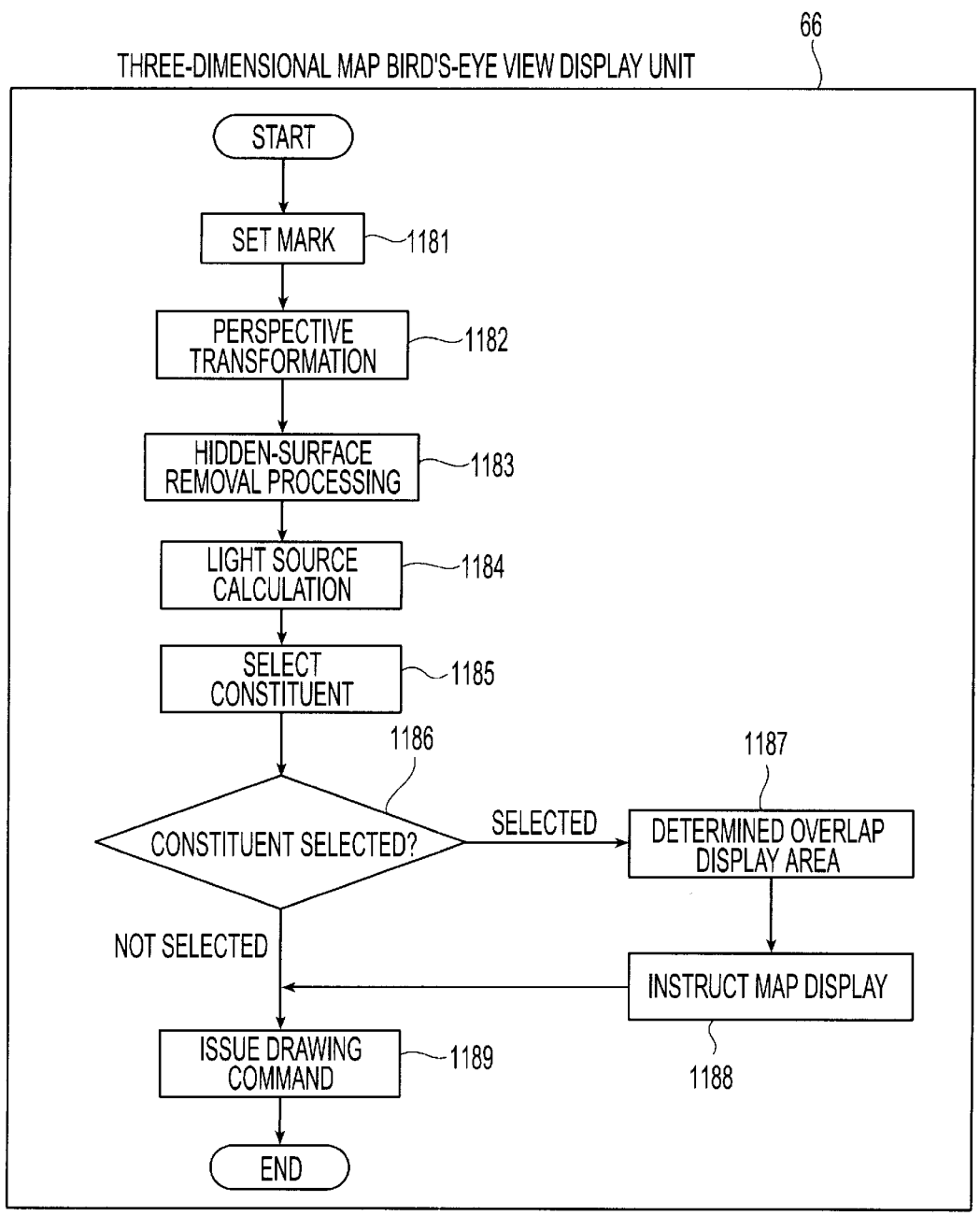
FIG. 18 is a flowchart showing the operation of a third modification of the three-dimensional map bird's-eye view display unit of FIG. 5.

FIG. 18 is a flowchart showing the operation of the third modification of the three-dimensional map bird's-eye view display unit 66.

In the flow shown in FIG. 18, the processing of steps 1181 to 1184 is similar to the processing of steps 1001 to 1004, the processing of steps 1185 is similar to the processing of step 1006 shown in FIG. 6, and the processing of step 1189 is similar to the processing of step 1005 shown in FIG. 6. Accordingly, the detailed description of the processing of steps 1181 to 1185 and step 1189 is omitted.

In step 1186, it is judged whether any map constituent or mark in an invisible area is selected in step 1185. If any map constituent or mark is selected, the processing goes to step 1187. If this is not the case, the processing goes to step 1189.

Figure 28A:
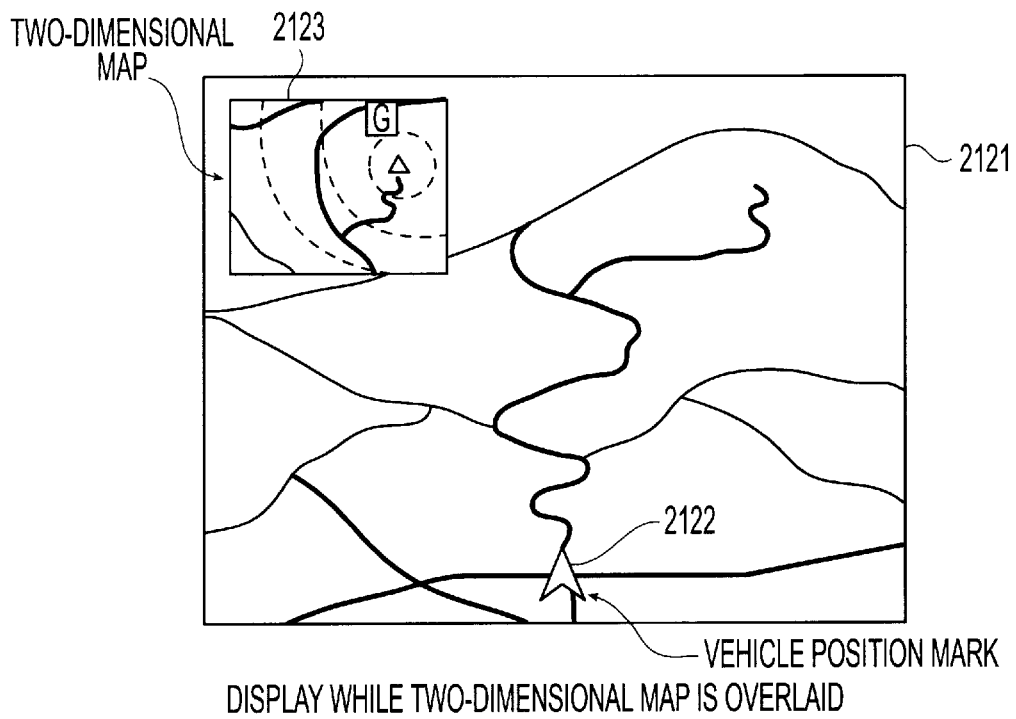
FIGS. 28A and 28B are diagrams each showing an example of a display frame when a map is displayed with being superposed on a window.
Figure 28B:
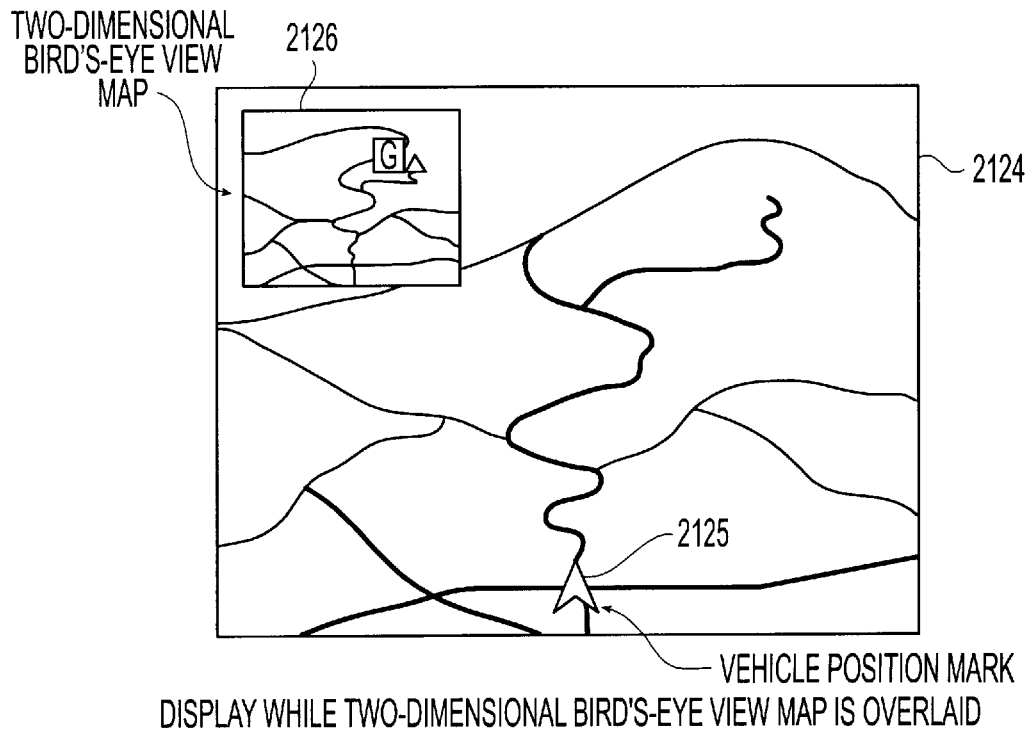

In step 1187, the position at which an overlap frame (window) is displayed on the display frame of the display 2 is determined. In the three-dimensional map bird's-eye view display mode, the current position is usually displayed at the lower side of the display center while the destination is displayed at the upper side of the display center, and thus the position of the window is preferably set to an area other than the display areas of the current position and the destination. Specifically, as shown in FIGS. 28A and 28B, the window area is preferably set to a place which corresponds to an upper right or upper left side of the display frame of the display 2 and has an area which is equal to a quarter or less of the whole area of the display frame of the display 2.

The following method may be used to set another preferable window display position. That is, a half of the display frame is set as a window, and the original display frame is shifted so that the center portion on the other half display frame is coincident with the center portion of the original three-dimensional map which has been displayed before the window is displayed.

In step 1188, the three-dimensional map bird's-eye view display unit 66, the two-dimensional map display unit 64 and the two-dimensional map bird's-eye view display unit 65 are instructed so that a map based on a predetermined map representation method is displayed in the window for which the display position is set.

The map display instruction processing as described above will be described in detail with reference to FIG. 19.

Figure 19:
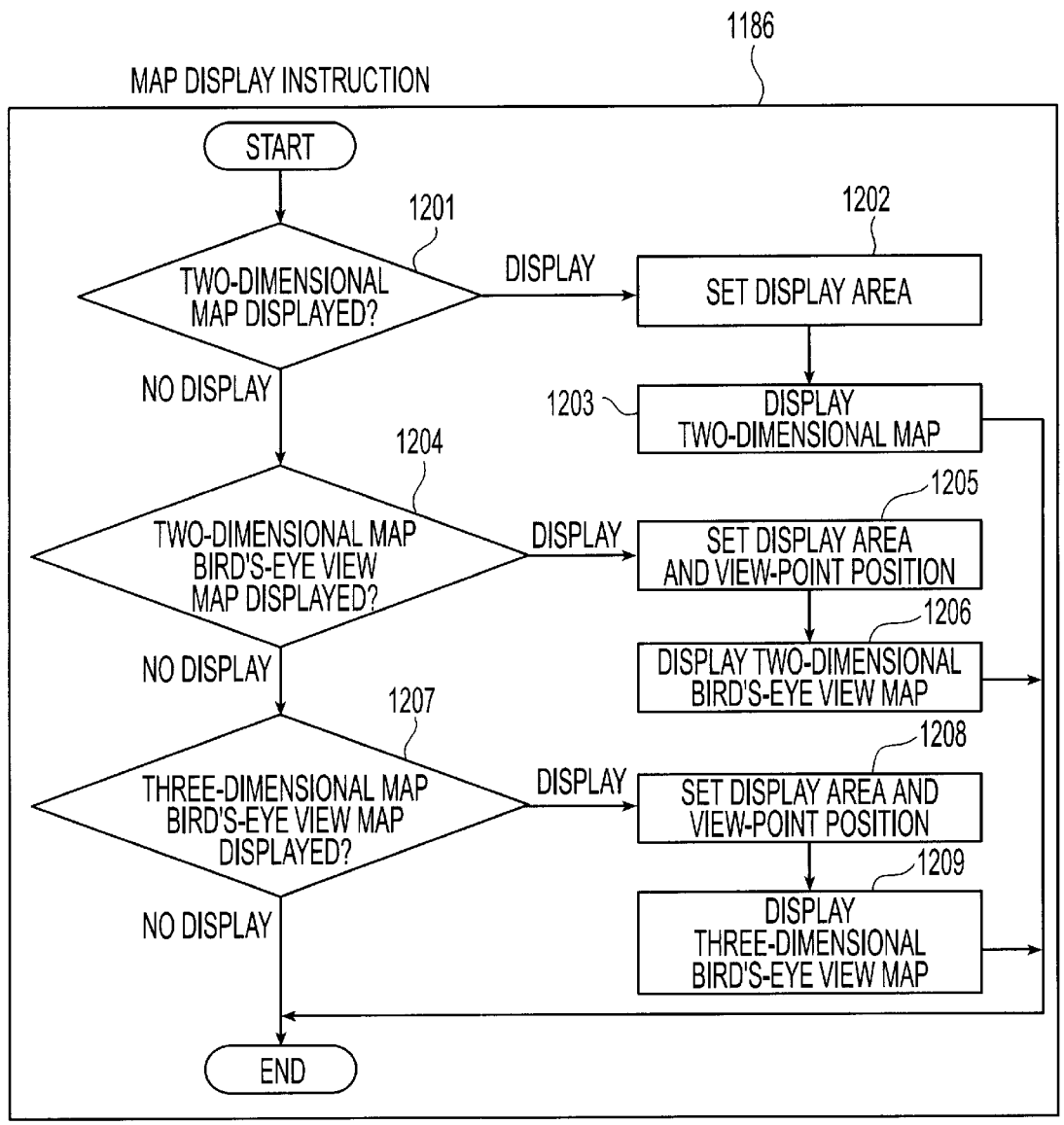
FIG. 19 is a flowchart showing map display instruction processing of FIG. 18.

FIG. 19 is a flowchart showing the operation of the map display instruction processing.

First, in step 1201, the display parameter which is set through the input device 4 by the user and is set as default is read out to judge whether a two-dimensional map is displayed in the window.

If the two-dimensional map is displayed, the processing goes to step 1202. If not so, the processing goes to step 1204.

In step 1202 an area for the two-dimensional map to be displayed in the window is set. Here, an area of the threedimensional map which is the base of the three-dimensional bird's-eye view map displayed on the display 2 may be selected as the area.

In step 1203, the two-dimensional map display unit 64 is activated to generate a map drawing command so that the two-dimensional map contained in the display area set in step 1202 is displayed in the window set in step 1189 of FIG. 18. On the other hand, the three-dimensional map bird's-eye view display unit 66 goes to step 1187 of FIG. 18 to generate a map drawing command of a three-dimensional bird's-eye view map.

By this operation, on the basis of the map drawing command generated in the three-dimensional map bird's-eye view display unit 66 and the map drawing command generated in the two-dimensional map display unit 64, the graphics processor 51 can display the two-dimensional in the window 2123, and display the three-dimensional bird's-eye view map on a display frame 2121 other than the window on the display 2 as shown in FIG. 28A.

Accordingly, the user can be provided with more desired information. Therefore, the user can obtain from the two-dimensional map the map information on the invisible area which is an obstacle in the three-dimensional map bird's-eye view display, so that visibility (easiness of recognition) and operability can be more enhanced.

Subsequently, in step 1204, the display parameter which is set through the input device 4 by the user or is set as default is read out to judge whether the two-dimensional bird's-eye view map is displayed in the window.

If the two-dimensional bird's-eye view map is displayed, the process goes to step 1205, If this is not the case, the processing goes to step 1207.

In step 1205 the area of the two-dimensional map serving as the base of the two-dimensional bird's-eye view map to be displayed on the window, and the view-point position from which the two-dimensional map is viewed are set .

Here, the area and the view-point position may be set so as to be coincident with the area of the three-dimensional map serving as the base of the three-dimensional bird's-eye view map to be displayed on the display 2 and the view-point position thereof, respectively.

With the above setting, the display areas of the three-dimensional bird's-eye view map and the two-dimensional bird's-eye view map on the display 2 are coincident with each other. The setting of the view-point position is performed by the view-point position setting unit 62.

In step 1206, the two-dimensional map bird's-eye view display unit 65 is activated to generate the drawing command so that the two-dimensional bird's-eye view map obtained by viewing the two-dimensional map contained in the display area set in step 1205 from the view-point position set in step 1205 is displayed on the window set in step 1189 of FIG. 18.

On the other hand, the three-dimensional map bird's-eye view display unit 66 goes to step 1187 of FIG. 18 to generate the map drawing command for the three-dimensional bird's-eye view map.

Accordingly, on the basis of the map drawing command generated in the three-dimensional map bird's-eye view display unit 66 and the map drawing command generated in the two-dimensional map bird's-eye view display unit 65, the graphics processor 51 can display the two-dimensional bird's-eye view map in the window 2126 as shown in FIG. 28B, and display the three-dimensional bird's-eye view map on a display area 2124 other than the window on the display 2. Therefore, the user can obtain the map information in the invisible area which is an obstacle in the three-dimensional display mode, from the two-dimensional bird's-eye view map in which no invisible area occurs, so that visibility (easiness of recognition) and operability can be more enhanced.

Subsequently, in step 1207, the display parameter which is set through the input device 4 by the user or is set as default is read out to judge whether the three-dimensional bird's-eye view map is displayed in the window. If the three-dimensional bird's-eye view map is displayed, the processing goes to step 1208, If this is not the case, the flow of FIG. 19 is ended.

In step 1208, the display area of the three-dimensional bird's-eye view map to be displayed in the window and the view-point position are set.

Here, the view-point position of the three-dimensional bird's-eye view map to be displayed in the window is preferably set to a position which is different from the view-point position of the three-dimensional bird's-eye view map which is displayed out of the window of the display 2. Specifically, the view point is preferably set to any position at which the map constituent or mark in the invisible area which is selected in step 1185 of FIG. 18 can be viewed. The setting of the view-point position is performed in the view-point position setting unit 62.

In step 1209, in the same manner as the processing of steps 1001 to 1005, the three-dimensional bird's-eye view map obtained by viewing the three-dimensional map contained in the display area set in step 1208 from the view-point position set in step 1208 is displayed in the window set in step 1187 of FIG. 18. Thereafter, the processing goes to step 1189 of FIG. 18 to generate a map drawing command for the three-dimensional bird's-eye view map to be displayed on a display frame other than the window on the display 2.

Accordingly, on the basis of the map drawing command generated in step 1189 of FIG. 18 and the map drawing command generated in step 1209 of FIG. 19, the graphics processor 51 displays the three-dimensional bird's-eye view map in the window on the display 2, and also displays the three-dimensional bird's-eye view map on the display frame other than the window of the display 2. Accordingly, in the three-dimensional bird's-eye view map, the user can obtain map information which is viewed from plural view-point positions, and thus the visibility (easiness of recognition) and the operability can be more enhanced.

Next, a fourth modification of the three-dimensional map bird's-eye view display unit 66 will be described in detail with reference to FIG. 20.

Figure 20:
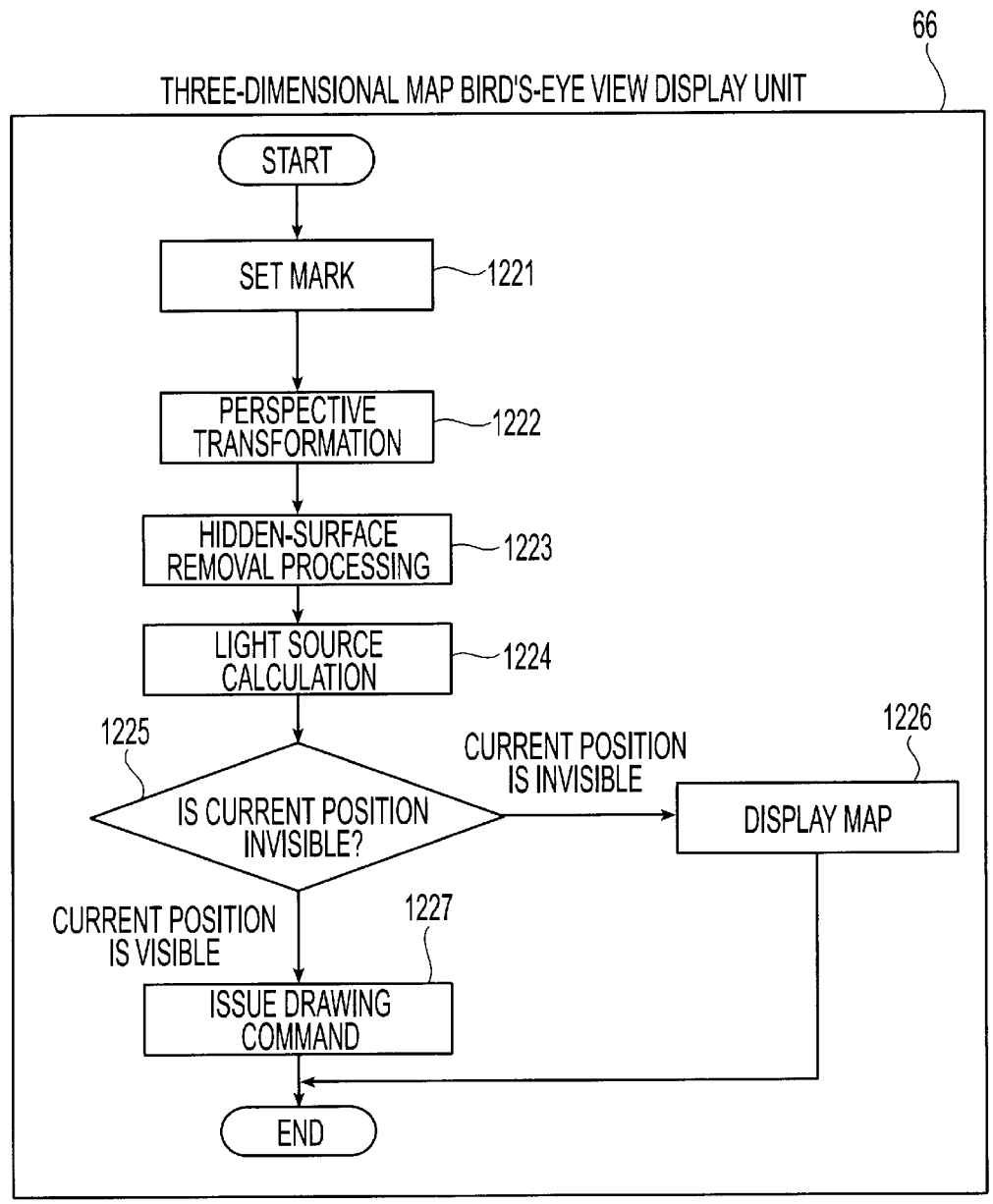
FIG. 20 is a flowchart showing the operation of a fourth modification of the three-dimensional map bird's-eye view display unit of FIG. 5.

FIG. 20 is a flowchart showing the operation of the fourth modification of the three-dimensional map bird's-eye view display unit 66.

In the flow shown in FIG. 20, the processing of steps 1221 to 1224 is basically similar to the processing of steps 1001 to 1004 of FIG. 6, and the processing of step 1227 is basically similar to the processing of step 1005 shown in FIG. 6. Accordingly, the detailed description of the processing of steps 1221 to 1224 and step 1227 is omitted from the following description.

In step 1225, it is judged whether the current position determined by the current position calculator 46 and the map matching processor 47 is not covered and hidden by a map constituent located in front of (nearer to the view point than) the current position.

If the current position is judged to be visible, the processing goes to step 1227. If this is not the case, the processing goes to step 1226.

In step 1226, the three-dimensional map bird's-eye view display unit 66, the two-dimensional map display unit 64 or the two-dimensional map bird's-eye view display unit 65 is instructed to display a map based on a predetermined map representation method on the display screen of the display 2.

Figure 29A:
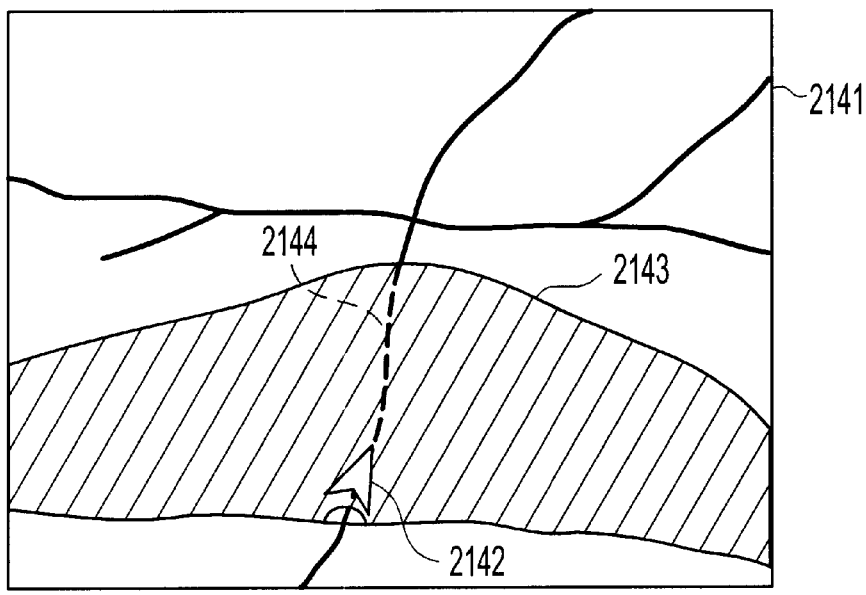
FIGS. 29A and 29B are diagrams each showing an example of a display frame when a map display method is switched.
Figure 29B:
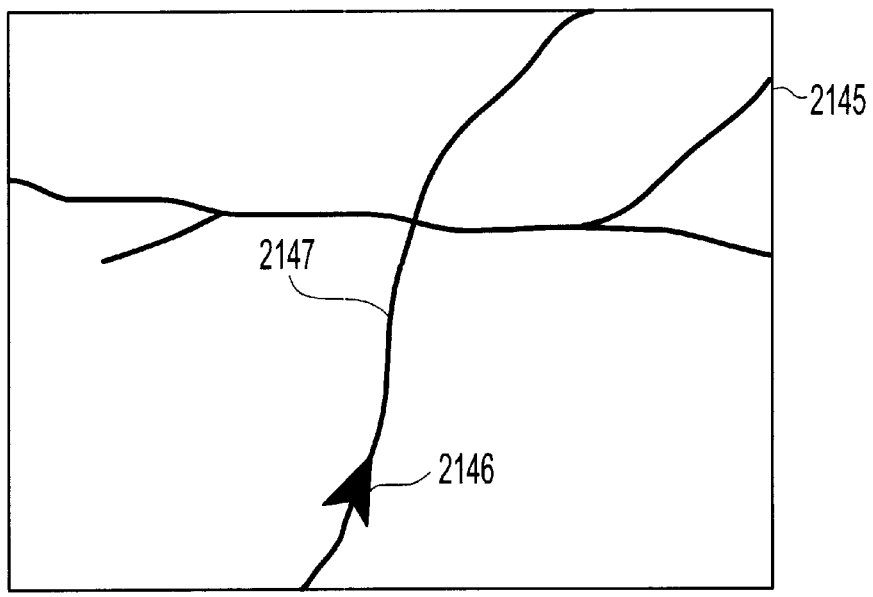

The processing of step 1226 is identical to that of step 1186 of FIG. 19 except that the map based on the predetermined map representation method is displayed over the overall display frame (screen) of the display 2 in place of the window. That is, even if the current position is hidden by a mountain 2143 located in front of (nearer to the view point than) a vehicle position mark 2142 as shown in FIG. 29A, by instructing the two-dimensional map bird's-eye view display unit 65 to display a two-dimensional bird's-eye view map on the screen of the display 2, the display is switched to display the two-dimensional bird's-eye view map as shown in FIG. 29B. Therefore, the visibility (recognition) and operability of the map can be more enhanced.

In the first embodiment as described above, the two-dimensional map display unit 64, the two-dimensional map bird's-eye view display unit 65, the three-dimensional map bird's-eye view display unit 66, and the map display method selection unit 63 for selecting any display unit from the display units are provided as the map display units 45. However, any type map display unit may be used insofar as it can display at least a three-dimensional bird's-eye view map on the screen of the display or the like.

Next, a second embodiment according to the present invention will be described with reference to the accompanying drawings.

First, a display frame of a navigation device to which the second embodiment of the present invention is applied.

Figure 30:
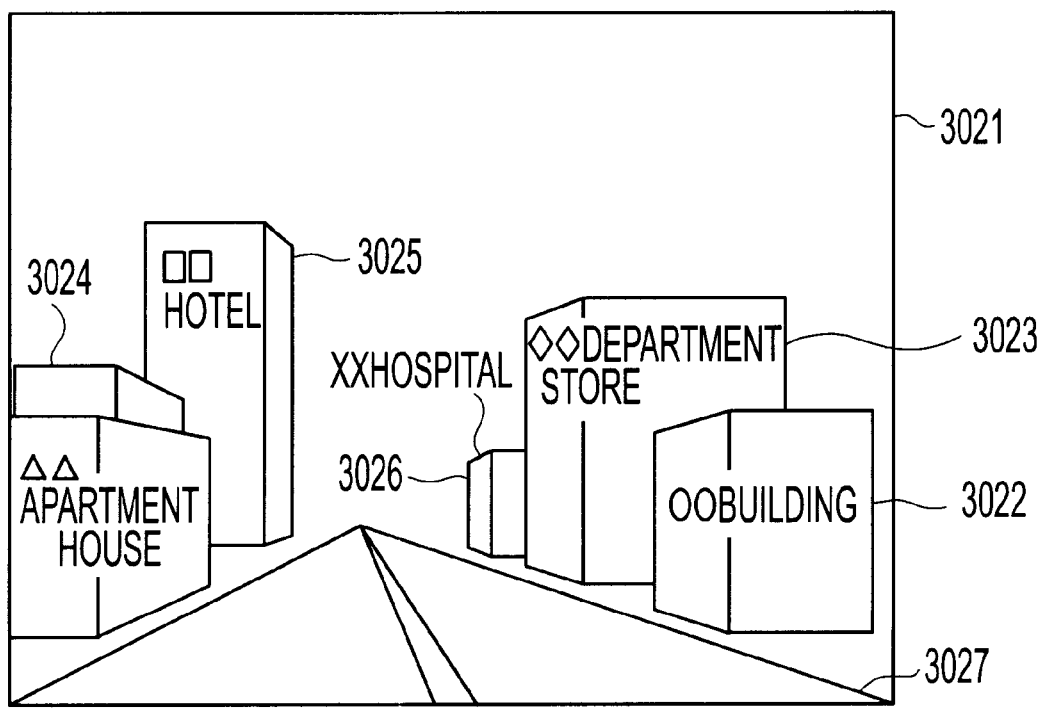
FIG. 30 is a diagram showing an image of a display frame of a navigation device which is subjected to the processing of a second embodiment of the present invention.

FIG. 30 shows an image of on the display frame of the navigation device which is subjected to the processing according to the second embodiment of the present invention.

In FIG. 30, reference numeral 3021 represents a display frame of a monitor or the like, reference numerals 3022 to 3026 represent buildings such as apartment houses, hotels, etc., and reference numeral 3027 represents a road.

In this embodiment, the map contains geographical features such as mountains, rivers, etc. as well as the buildings and roads as described above, and these map constituents are collectively referred to as "object".

In this embodiment, in principle, character information is displayed in an object display area (an area where an object is actually displayed on the display frame) corresponding to the character information.

In the case shown in FIG. 30, character information such as ○○-building", "ΔΔ-apartment house", etc. are displayed in the corresponding object display areas for the objects 3022 to 3025. Further, in this embodiment, if it is judged that any character information cannot be displayed in an object display area, the character information is displayed in the neighborhood of the corresponding object.

In the case of FIG. 30, for the object 3026, the character information "X X-hospital" is displayed with a leader line in the neighborhood of the object 3026.

By performing the information display processing of this embodiment as described above, any character information can be displayed at the position at which the relation with the object corresponding to the character information can be kept as shown in FIG. 30.

Next, the procedure of the second embodiment according to the present invention will be described.

First, the processing for generating a three-dimensional map (actually, a projection map of the three-dimensional map) to be displayed on the display frame of a monitor or the like will be described.

Objects are arranged on the world coordinate system on the basis of map data base in which three-dimensional information of the objects are stored. Subsequently, the objects on the world coordinate system are subjected to affine transformation processing to arrange the objects on a view-point coordinate system in which the view-point position is set as the origin and the view-point direction is set on the Z axis.

Here, the view-point position is set on the basis of an instruction of the user or of the current position (vehicle position) of a mobile in which the navigation device of this embodiment is mounted.

Subsequently, the objects on the view-point coordinate system are subjected to the perspective transformation processing to arrange the objects on a screen coordinate system. Thereafter, the hidden-surface removal processing such as the Z buffer method or the like is performed to form a projection map which would be obtained by viewing the objects arranged on the world coordinate system from the set view-point position. The projection map thus formed is stored into a memory or the like as two-dimensional image data comprising plural pixel data which are arranged in a matrix form. Each of the pixel data is added with identification information of an object which is represented by the pixel data concerned.

A series of processing as described above is performed by using various three-dimensional processing techniques of computer graphics.

Next, the processing of adding character information to the projection map generated by the above processing to display the result on the display frame will be described.

Figure 31:
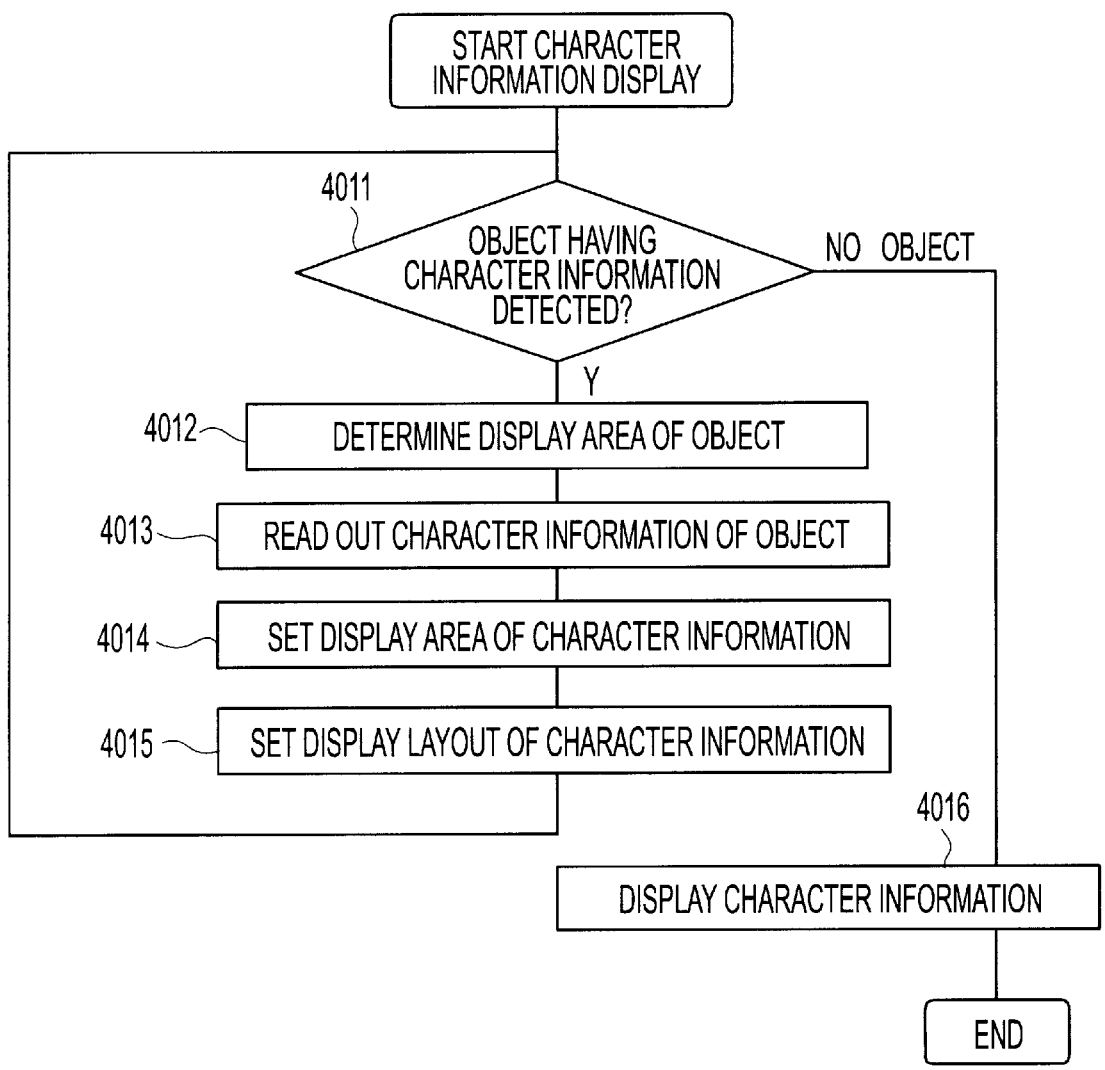
FIG. 31 is a flowchart showing character display processing of the second embodiment of the present invention.
Figure 32A:
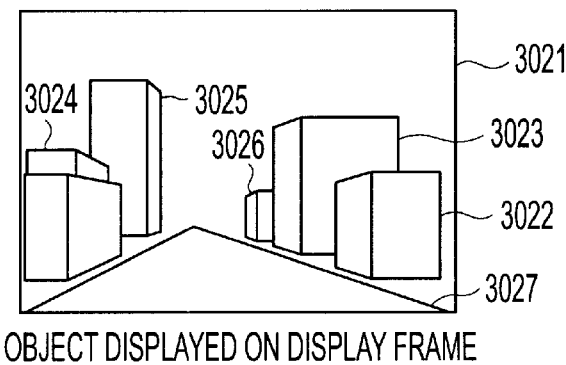
Figure 32B:
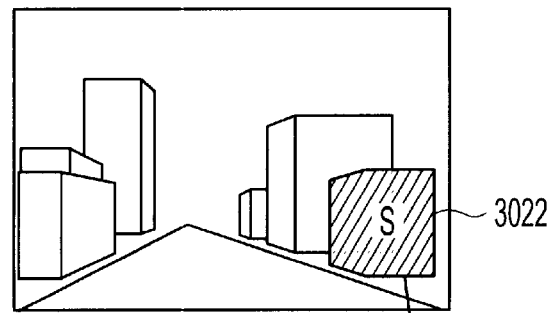

FIG. 31 is a flowchart showing character display processing of the second embodiment according to the present invention, and FIGS. 32A and 32B are diagrams supplementing the flow shown in FIG. 31.

As shown in FIG. 32A, an object which is displayed in the display frame 3021 and has character information is detected (step 4011).

A judgment as to whether an object is displayed in the display frame 3021 is made by identifying the identification information of the object of the pixel data stored in a memory or the like.

Further, a judgment as to whether the object has character information is made as follows. That is, the three-dimensional information of each object is added with information on the presence or absence of character information, and then stored in the map data base. In this case, the above judgment can be performed by reading out the three-dimensional information of the object from the map data base and checking the information on the presence or absence of the character information which is added to the three-dimensional information.

Subsequently, a display area on the display frame of the object detected in step 4011 is determined (step 4012).

The pixel data of the object detected in step 4011 is detected from the two-dimensional image data stored in the memory or the like, and the display area of the object is determined on the basis of the position of the pixel data on the two-dimensional image data.

In FIG. 32B, the display area S of an object 3022 detected in step 4011 is determined. For the determination of the display area S, it does not need to detect all the pixel positions occupied by the object 3022. For example, the display area S may be specified by detecting the maximum position and minimum position in the horizontal direction (X) and the maximum position and minimum position in the vertical direction (Y) of the pixel positions occupied by the object 3022.

Subsequently, the character information corresponding to the object detected in step 4011 is read out from the storage unit in which the character information is stored (step 4013).

Figure 32C:
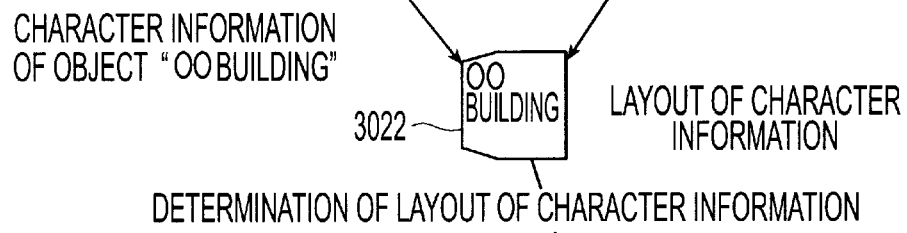

In addition to the three-dimensional information of the object, the character information of the object is stored in the map data base, and as shown in FIG. 32C, the character information "○○-building" of the object 3022 is read out from the map data base.

Subsequently, the display area of the character information is set within the display area of the object (step 4014). The setting of the display area of the character information will be described later.

Subsequently, the display layout of the character information is determined so that the character information is accommodated within the display area of the character information set in step 4014 (step 4015).

In FIG. 32C, the character size, character interval, number of lines, etc. of the character information "○○-building" are set on the basis of the number of characters of the character information "○○-building" of the object 3022 read out from the map data base and the display area of the character information.

Figure 32D:
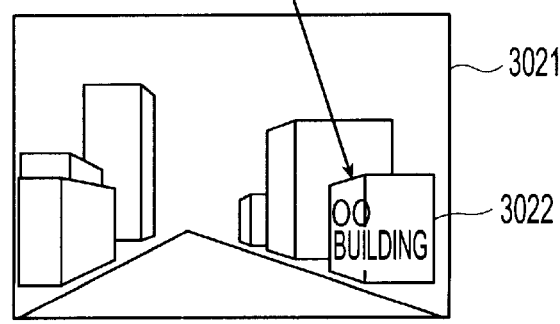

An image in which the character information "○○-building" of the object 3022 is displayed on the display frame 3021 is shown in FIG. 32D. The character information "○○-building" is displayed on the display area of the object 3022.

After the processing of steps 4012 to 4015 is performed on all the objects having character information within the display frame, the character information is added onto the projection map, and then the projection map is developed and displayed on the display frame (step 4016). With this processing, the flow of FIG. 31 is ended.

Next, the processing of step 4014 shown in FIG. 31 (the setting of the character display area) will be described.

Figure 33:
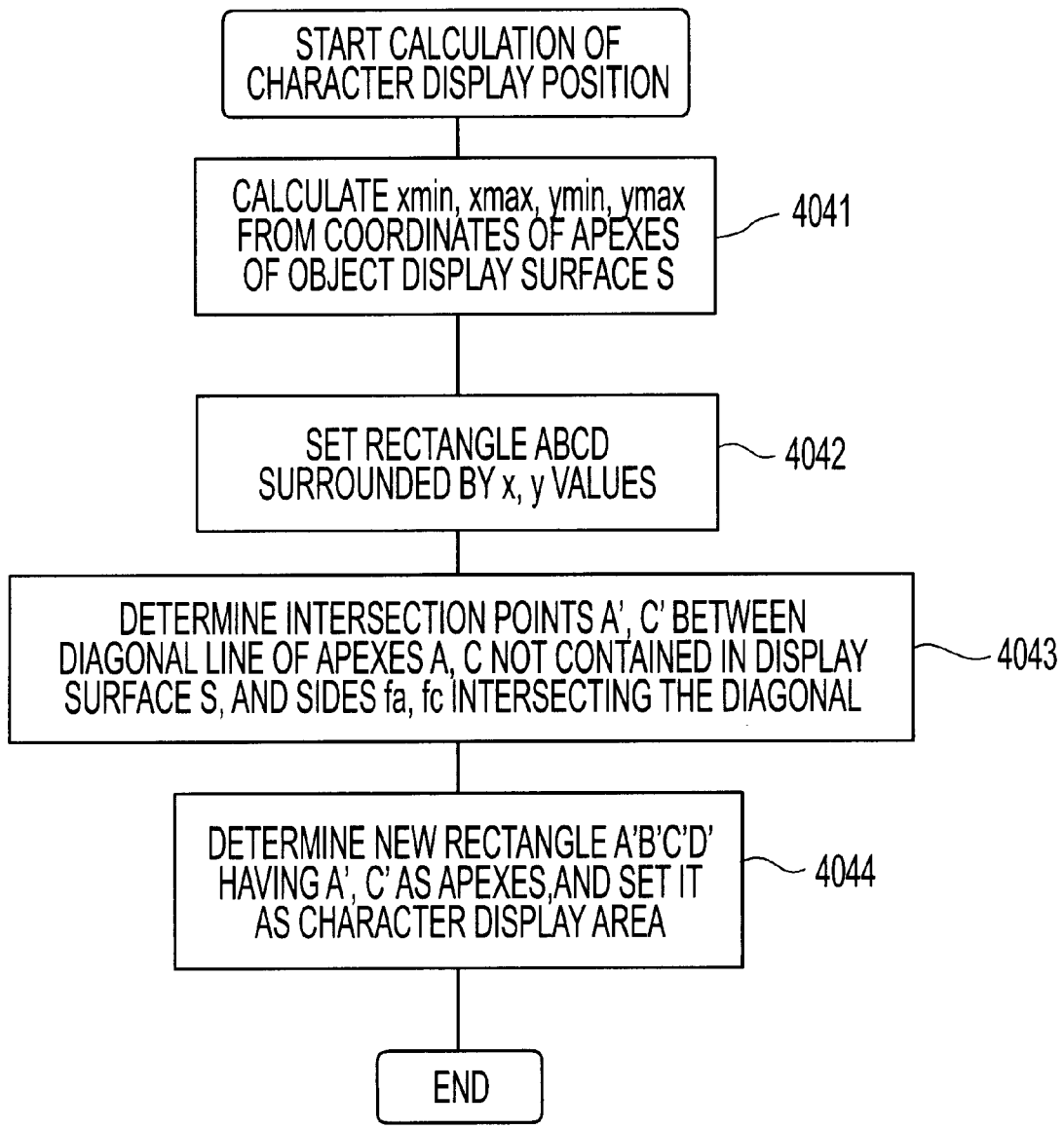
FIG. 33 is a flowchart showing an example of the processing for setting a character information display area.
Figure 34A:
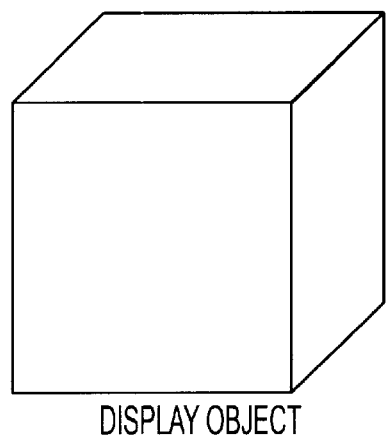
FIGS. 34A, 34B and 34C are diagrams supplementing the flow of FIG. 33.
Figure 34B:
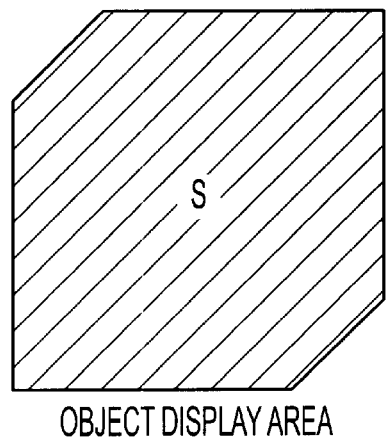
Figure 34C:
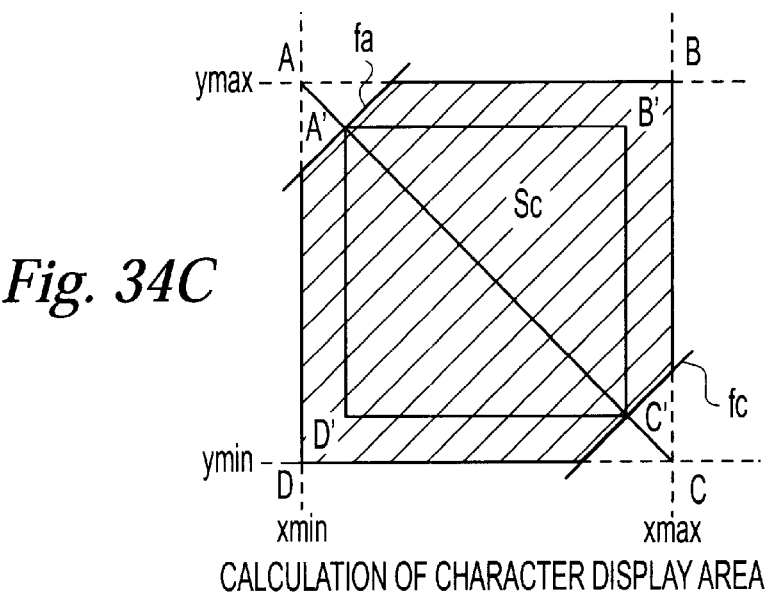

FIG. 33 is a flowchart showing an example of the processing for the setting of the character information display area, and FIGS. 34A, 34B and 34C are diagrams supplementing the flow shown in FIG. 33.

The maximum position, xmax, and minimum position, xmin, in the horizontal direction (X) and the maximum position, ymax, and minimum position, ymin, in the vertical direction (Y) of the pixel positions on the display frame which are occupied by the object, are first detected by referring to the coordinate of each apex of the display area S of the object, which is determined in step 4012 of FIG. 31 (step 4041).

When an object as shown in FIG. 34A is detected from the display rame in step 4011 of FIG. 31, the display area S of the object as shown in FIG. 34B is obtained. In step 4041, xmax, xmin, ymax, ymin of the display area S is calculated.

Subsequently, as shown in FIG. 34C, a rectangle ABCD surrounded by xmax, xmin, ymax, ymin which are calculated in step 4041 is introduced (step 4042) to obtain intersection points A' and C' between a diagonal line connecting the apexes A and C which are not contained in the display area S, and sides fa and fc which constitute a par of the frame of the display area S and are intersected to the diagonal line (step 4043).

Thereafter, a new rectangle A'B'C'D' containing the points A' and C' as apexes located diagonally to each other is determined, and an area surrounded by the rectangle A'B'C'D' is set as a display area Sc of the character information (step 4044). With this processing, the flow of FIG. 33 is ended.

The flow of FIG. 33 is merely an example of the setting processing for the character information display area. Any processing may be used insofar as it can set the display area of the character information within the display area of the object like the processing of step 4014 shown in FIG. 31.

Next, the processing of step 4015 of FIG. 31 (the setting of a display layout of character information) will be described.

Figure 35:
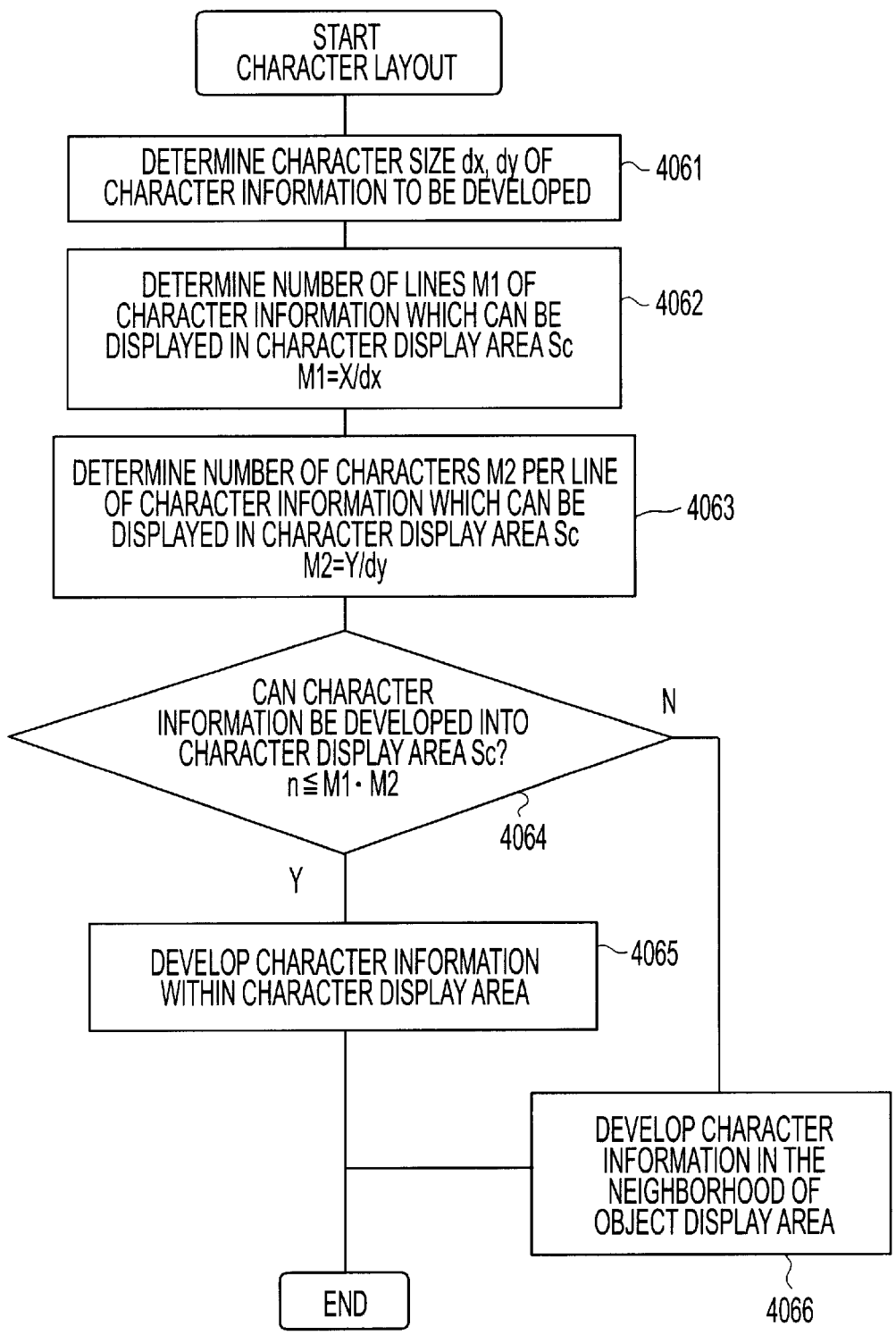
FIG. 35 is a flowchart showing a layout setting method of character information.
Figure 36A:
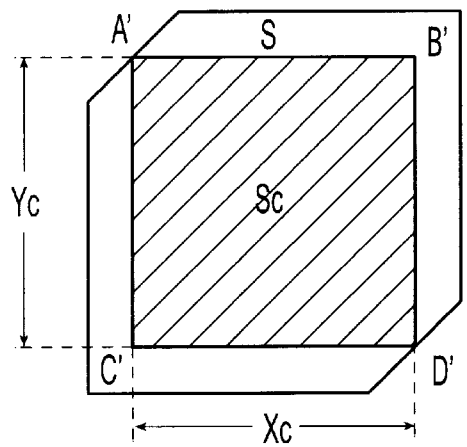
FIGS. 36A, 36B and 36C are diagrams supplementing the flow of FIG. 35.
Figure 36B:
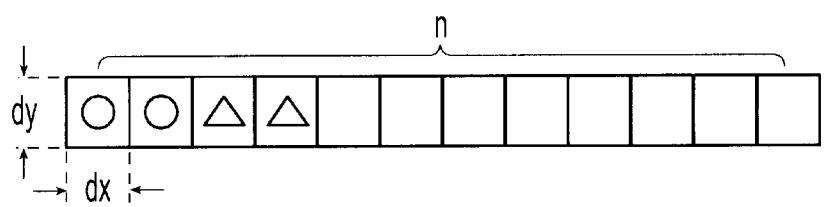
Figure 36C:
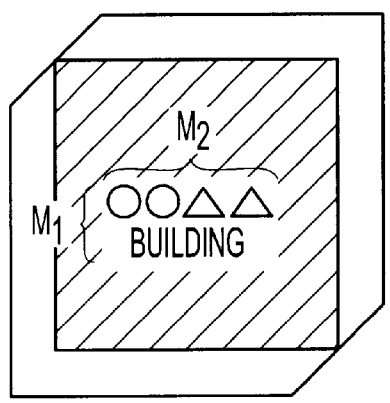

FIG. 35 is a flowchart showing an embodiment of the layout setting method of character information, and FIGS. 36A–36C are diagrams supplementing the flow shown in FIG. 35.

The display area Sc of the character information which is determined in the flow of FIG. 33 is shown in FIG. 36A. Here, the lateral size and longitudinal size of the display area Sc are represented by Xc and Yc respectively.

The character information "○○△△-building" read out from the map data base or the like in step 4013 of FIG. 31 is shown in FIG. 36B.

According to the layout processing of the character information shown in FIG. 35, the character size (dx, dy) of the character information is set as show in FIG. 36B (step 4061). The character size is set to be large to the extent that the user can recognize characters sufficiently.

Subsequently, on the basis of the number of characters (n) and the character size (dx, dy) of the character information and the display area Sc of the character information, the number of lines M1 (=x/dx) of the character information is calculated (step 4062). Further, the number of characters M2 (=Y/dy) per line is calculated (step 4063).

Subsequently, it is judged whether the character information can be displayed in the character display area Sc (n≦M1·M2) (step 4064).

If it is judged that the character information can be displayed, the character information is set to be developed in the character display area Sc in the display layout of the character information which is set in steps 4061 to 4063 (step 4065).

On the other hand, if it is judged that the character information cannot be displayed, the display area of the character information is reset so that the character information is developed in the neighborhood of the display area of the object in the display layout of the character information which is set in steps 4061 to 4063 (step 4066).

A display example in which the character information is developed in the character display area Sc is shown in FIG. 36C. In this case, the character information is developed at M2 (the number of characters) per line and over M1 lines in the character display area Sc of X in longitudinal size and Y in lateral size.

According to the second embodiment of the present invention, there is used the method of setting the display area Sc of the character information within the display area S of the object and developing the character information in the display area Sc. In order to further limit the display position, a method for calculating the center of gravity of the display area S of the object and developing the character information so that the display area of the character information is overlapped with the center of gravity, or other methods may be used.

Figure 37:
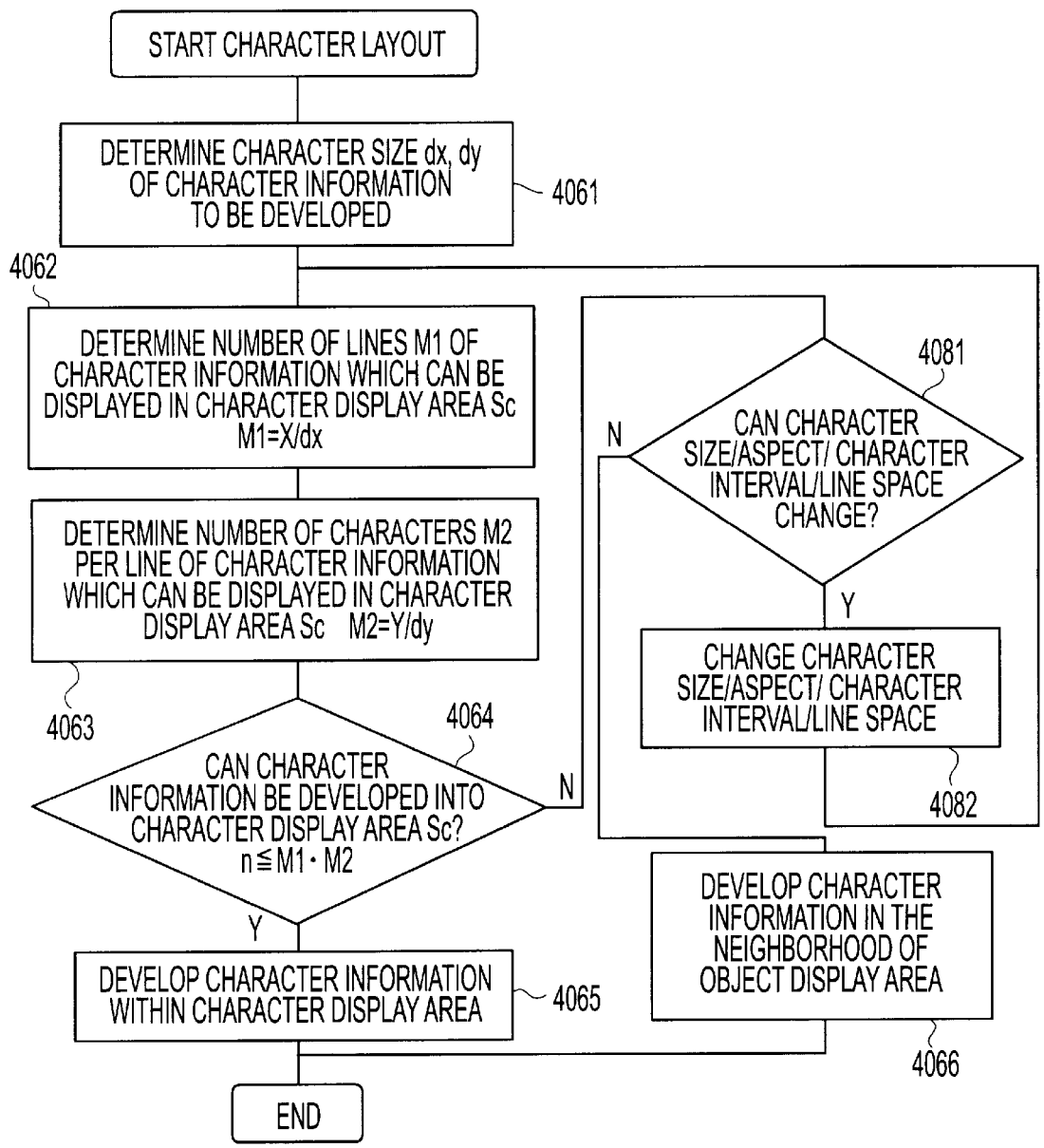
FIG. 37 is a flowchart showing a modification of the layout setting method of the character information shown in FIG. 35.

FIG. 37 is a flowchart showing a modification of the layout setting method of the character information shown in FIG. 35.

In the flowchart of FIG. 37, the processing of step 4015 shown in FIG. 31 (the setting of the display layout of the character information) is expanded to develop and display the character information within the display area of the object as much as possible.

In the flowchart of FIG. 37, step at which the same processing as the flowchart of FIG. 35 is performed is represented by the same reference numeral, and the detailed description thereof is omitted.

In the flowchart of FIG. 37, if it is judged in step 4064 that the character information cannot be displayed within the character display area Sc, it is judged whether the display attribute of characters such as character size/aspect/character interval/line space, etc. can be changed (step 4081).

The change of the display attribute of characters suffer some restrictions because the characters are much small and thus illegible, for example. Therefore, in consideration of a human artificial problem, a prescribed restriction value is beforehand set to the change of the display attribute of characters.

If it is judged in step 4081 that the display attribute can be changed, the display attribute of characters is changed (step 4082). On the other hand, If this is not the case, it is given up that the character information is attempted to be developed within the display area of the object, and the processing goes to step 4066.

Next, the processing of step 4066 shown in FIGS. 35 and 37 (the display area of the character information is set again in the neighborhood of the display area of the object) will be described.

Figure 38:
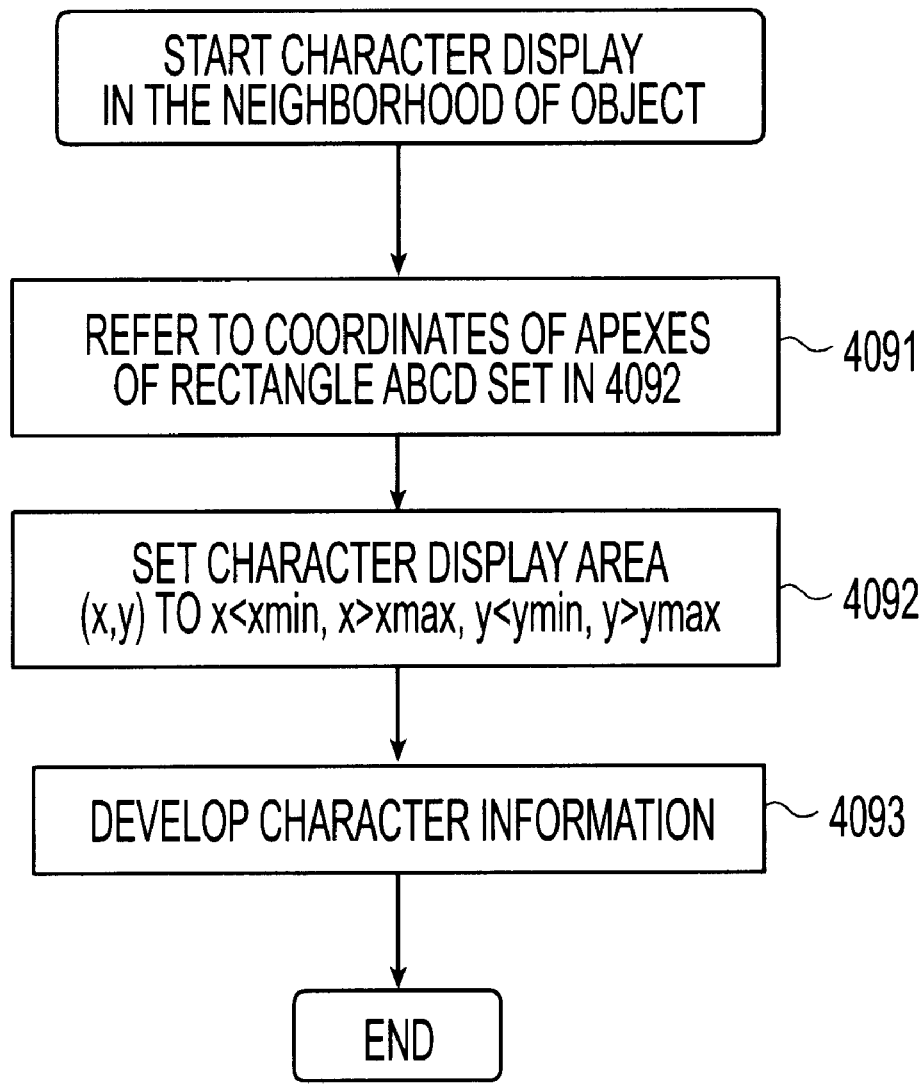
FIG. 38 is a flowchart showing an example of the processing of developing character information in the neighborhood of an object display area.
Figure 39:
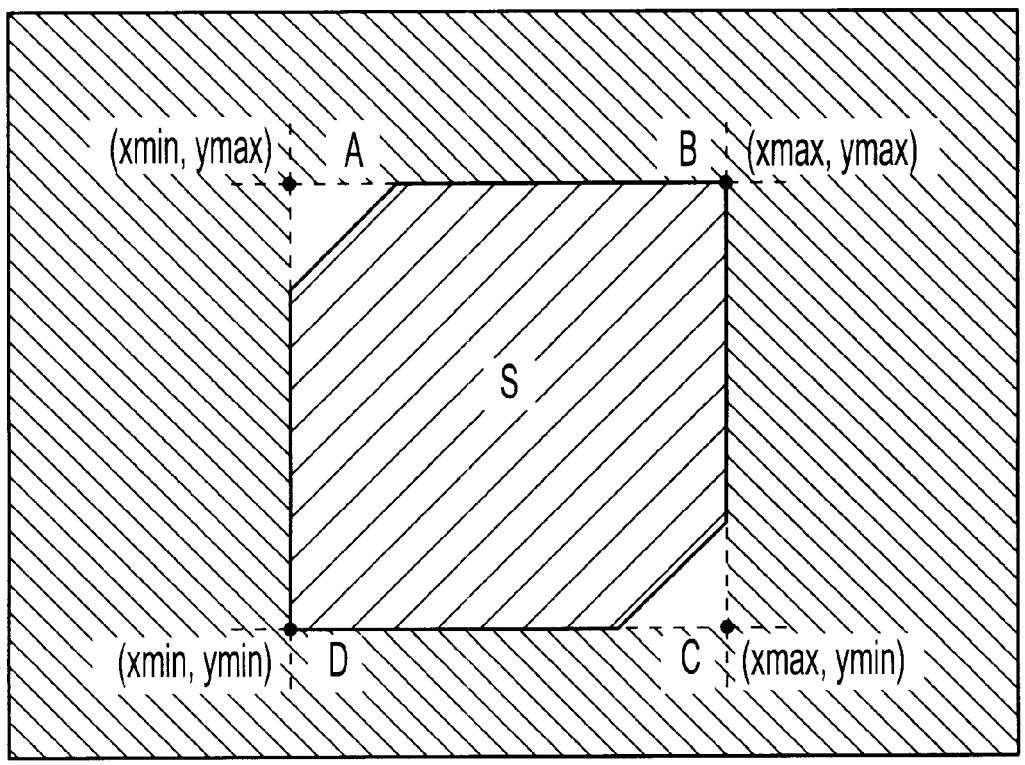
FIG. 39 is a diagram supplementing the flow shown in FIG. 38.

FIG. 38 is a flowchart showing an embodiment of the processing of developing the character information in the neighborhood of the display area of the object, and FIG. 39 is a diagram supplementing the flow shown in FIG. 38.

First, the respective apex coordinates of the rectangle ABCD which are calculated in step 4042 of FIG. 33, that is, the coordinate of the A point (xmin, ymax), the coordinate of the B point (xmax, ymax), the coordinate of the C point (xmax, ymin) and the coordinate of the D point (xmin, ymin) are referred to (step 4091).

Subsequently, a display area (x, y) in which character information can be displayed in the display layout set in steps 4061 to 4063 of FIG. 35 or 37 is set to an area which satisfies the following inequalities: x<xmin, x>xmax, y<ymin, y>ymax (an area indicated by oblique lines in FIG. 39) (step 4092).

The display area (x, y) of character information may be basically set to any position insofar as it is out of the display area of the corresponding object.

Subsequently, the character information is set so that it is developed within the character display area (x, y) in the above display layout (step 4093). With this processing, the flow shown in FIG. 38 is ended.

When the display area of the character information is set out of the display area of the corresponding object, the character information is preferably displayed with a leader line or a leader line having a frame surrounding the character information (like a balloon of a cartoon) in order to show the connection between the character information and the corresponding object.

According to the second embodiment of the present invention, the display area for the character information of an object is set on the basis of the display area for the object concerned on the display frame 3021.

Accordingly, even when the display scale of the map is altered, the view point of the projection map of the three-dimensional map displayed on the display frame is moved, and the current position (vehicle position) is changed so that the display position and shape of the object on the display frame are changed in a device (for example, a navigation device) to which this embodiment is applied, the character information can be displayed at the position where it can be easily seen in accordance with the variation of the object.

Therefore, reduction in visibility can be prevented, and excellent map information in the three-dimensional map display can be provided.

Next, a third embodiment according to the present invention will be described hereunder.

Figure 40:
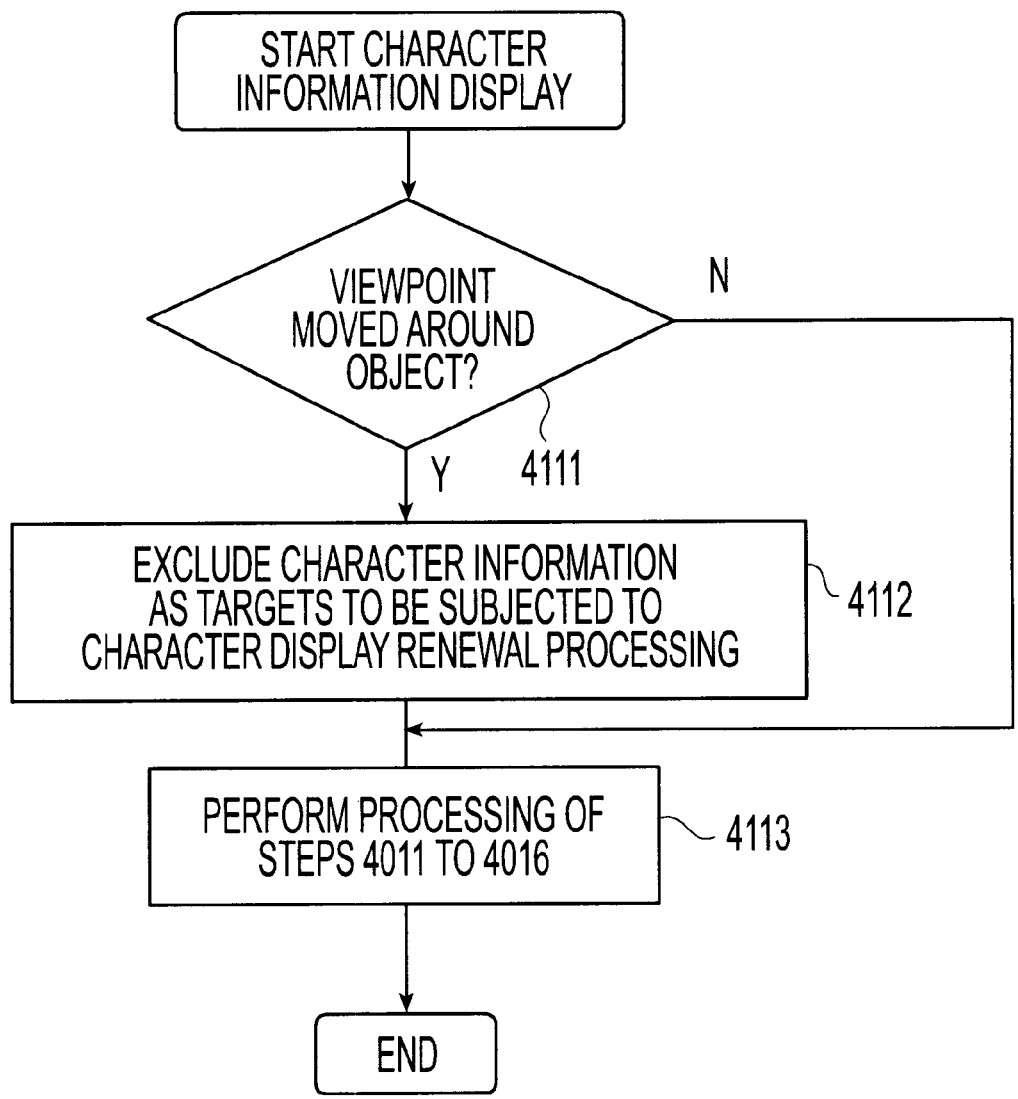
FIG. 40 is a flowchart showing character display processing according to a third embodiment of the present invention.
Figure 41A:
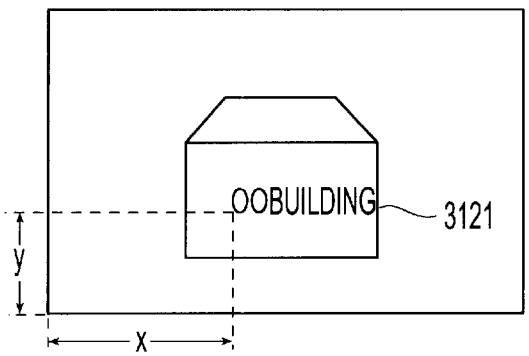
FIGS. 41A, 41B, 41C and 41D are diagrams supplementing the flow of FIG. 40.
Figure 41B:
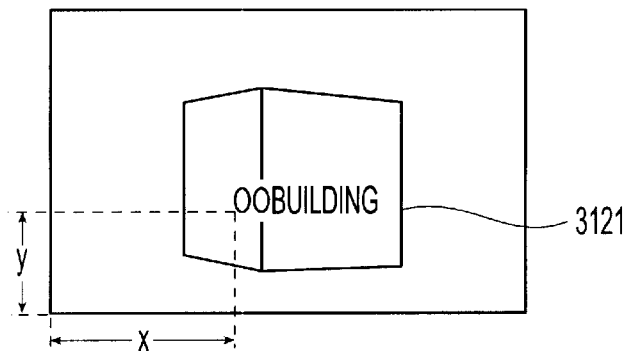
Figure 41C:
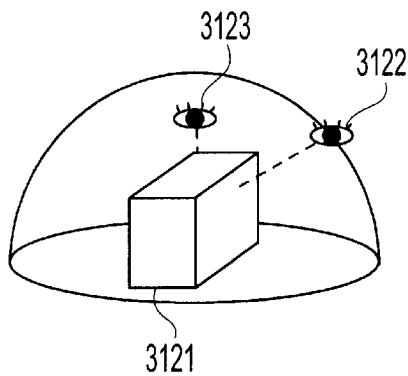

FIG. 40 is a flowchart showing the character display processing of a third embodiment according to the present invention. FIGS. 41A–41D are diagrams supplementing the flow of FIG. 40. FIG. 41A is an outlook diagram when an object 3121 is viewed from a view-point position 3122 of FIG. 41C, and FIG. 41B is an outlook diagram when the object 3121 is viewed from a view-point position 3123.

The view-point position 3123 is located at a position which is obtained by moving the view point at the view-point position 3122 so that the distance between the view point and the center of the object 3121 is set to a substantially fixed value.

In the above-described second embodiment, as shown in FIG. 41C, when the view point is moved from the view-point position 3123 to the view-point position 3122, the display area of the object 3121 is varied from FIG. 41A to FIG. 41B in accordance with the movement of the view point. Therefore, the display area of the character information of the object is minutely varied.

However, the object 3121 is regarded as an object to be noted by the user because the view point is moved around the object 3121. In this case, when the display position of the character information of the object 3121 is varied, the operator may feel confused.

Therefore, according to the third embodiment of the present invention, as shown in FIGS. 41A and 41B, the display area of the character information "○○-building" of the object 3121 is kept at the coordinate position at the initial time when the movement of the view point is started.

According to the character display processing of this embodiment shown in FIG. 40, before the processing of steps 4011 to 4016 shown in FIG. 31 is performed, it is judged whether the view point is moved with an object located in the display frame at the center while keeping the distance between the object and the view point to a substantially fixed value (step 4111).

A judgment as to whether the distance between the view point and the object is substantially fixed can be performed, for example, by storing the distance from the view point in the view-point coordinate system to each object and comparing the thus-stored distance with the previously-stored distance when the three-dimensional map is renewed due to the movement of the view point.

If it is judged that the view point is judged to be moved in step 4111, the character information of the object is excluded from targets which will be renewed in the character display processing (the processing of steps 4011 to 4016 shown in FIG. 31) performed later (step 4112).

Further, even in the other cases than the case where the view point is moved with an object at the center while keeping constant the distance from the object constant, if the display area of the object is gradually moved due to the movement of the view point, it is considered that the display area of the character information is kept at the coordinate position at the initial time when the movement of the view point is started.

Figure 41D:
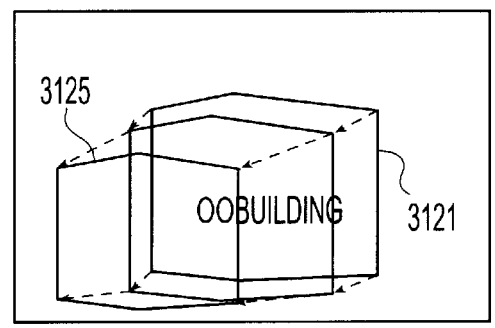

For example, as shown in FIG. 41D, the processing of steps 4011 to 4016 shown in FIG. 31 is not performed to renew the character display processing unless the character information "○○-building" which is set when the object is displayed at the position 3121 gets out of the display area 3125 of the object due to the movement of the view point (step 4113).

According to the third embodiment of the present invention, when the view point is moved with an object at the center, the display area of the character information of the object is set again so that it keeps the initial display position at the time when the movement of the view point is started when the renewal is performed. Therefore, the display position of the character information of the object which is noted by the user can be prevented from varying minutely.

Next, a fourth embodiment according to the present invention will be described hereunder.

Figure 42:
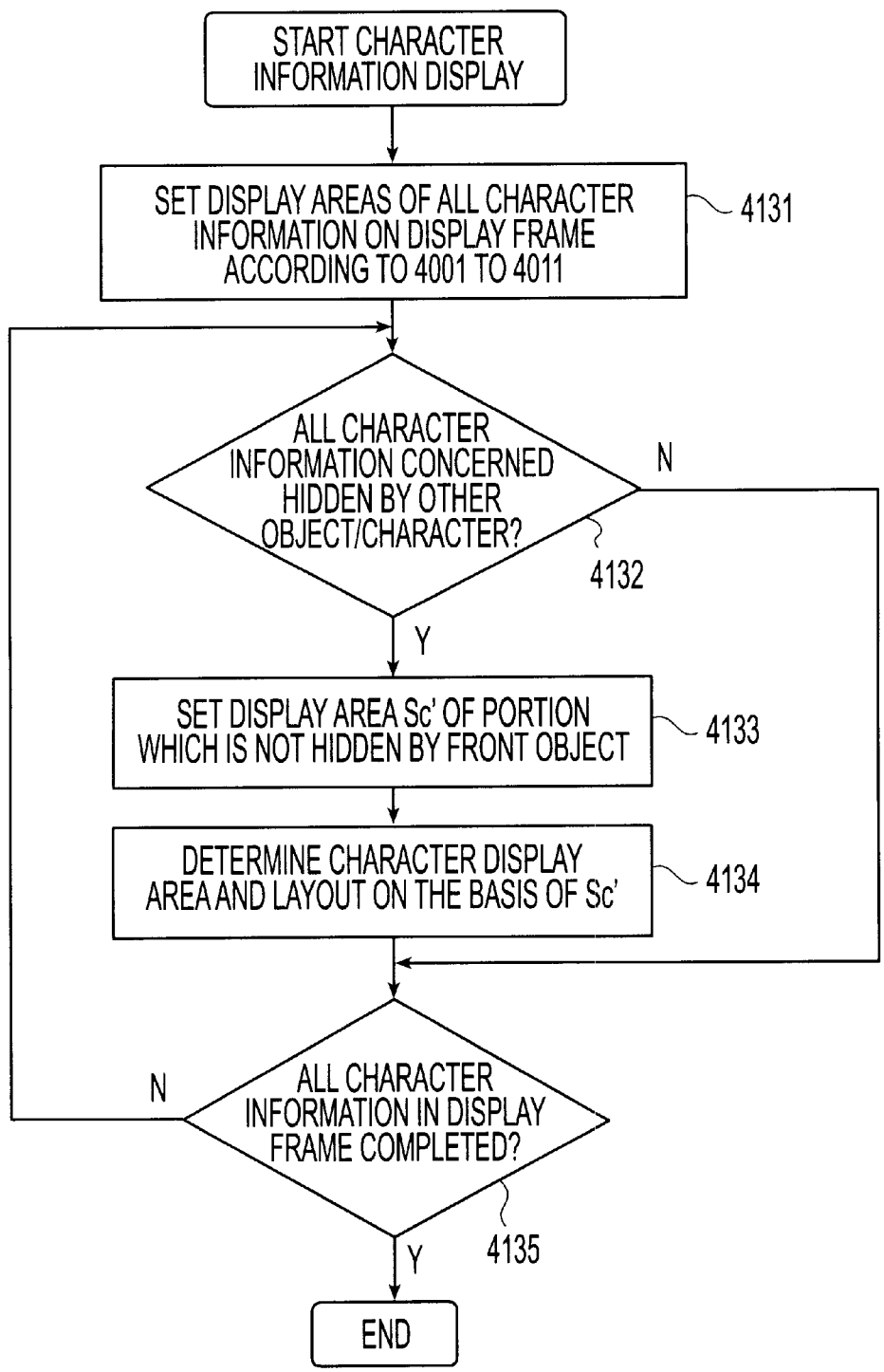
FIG. 42 is a flowchart showing the processing according to a fourth embodiment of the present invention.
Figure 43A:
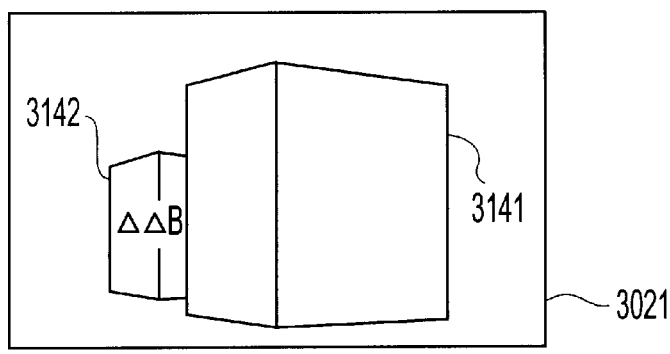
FIGS. 43A, 43B and 43C are diagrams supplementing the flow shown in FIG. 42.
Figure 43B:
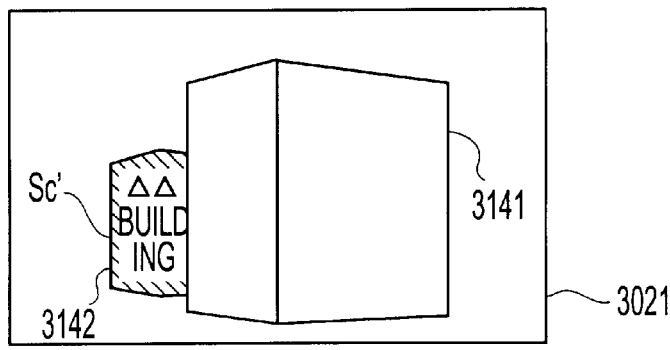
Figure 43C:
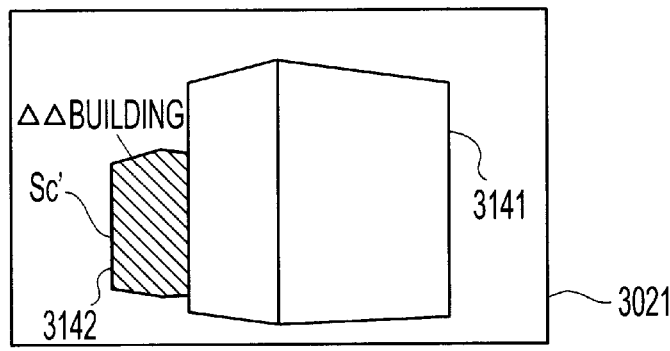

FIG. 42 is a flowchart showing the processing of the fourth embodiment according to the present invention, and FIGS. 43A, 43B and 43C are diagrams supplementing the flow shown in FIG. 42.

In the second and third embodiments, the display area of the character information is set on the basis of the display area of the object to be actually displayed on the frame, that is, the projection map which has been subjected to the hidden-surface removal processing. However, the display area of the character information may be also set on the basis of the occupation area on the XY plane of an object on the screen coordinate system before the hidden-surface removal processing is performed (a state where no consideration is taken on the overlap between objects).

In this case, however, there may occur such a problem that the character information added to the object 3142 is overlapped with another object 3141 and thus the overlapped portion is lacked as shown in FIG. 43A, or the character information is displayed on the other object 3141.

Therefore, according to the fourth embodiment of the present invention, when the display area of character information is set on the basis of the occupation area of the XY plane of an object on the screen coordinate system before the hidden-surface removal processing is performed, with respect to the display area of character information having the above problem, the display area of the character information is set again on the basis of the display area of the object to be actually displayed on the frame.

In this embodiment, first, the display area of the character information within the display frame is basically set according to the same manner as the processing of steps 4011 to 4016 shown in FIG. 31 as shown in FIG. 42 (step 4131).

However, in step 4012, the occupation area of the XY plane of the object on the screen coordinate system is detected, and in step 4013 the display area of the character information is set on the basis of the occupation area of the object.

Subsequently, it is judged whether the object for which the display area of the character information is disposed at the position where it is hidden by another object located in front of the former object on the display frame 3021 (step 4132).

This judgment can be performed by referring to the Z coordinate value of the object on the screen coordinate system.

Here, if the object is judged to be hidden, an occupation area of the object which is not hidden by the front object, that is, a display area Sc' of the object which is actually displayed on the frame is detected (step 4133).

Subsequently, on the basis of the display area Sc' of the object, the display area of the character information and the display layout are set in the same manner as the processing of steps 4014 to 4015 shown in FIG. 31 (step 4134). By this processing, the overlap between the character information of an object and the other objects can be avoided as shown in FIG. 43B. Subsequently, the above processing of steps 4131 to 4134 is repetitively performed on all the character information within the display frame 3021 (step 4135).

When the character information cannot be displayed within the display area of the character information set in step 4134 in the display layout set in step 4134, the flow shown in FIG. 35 or 37 is executed to move the display position of the character information to a position in the neighborhood of the object 3142 as shown in FIG. 43C.

Next, a calculation method for calculating the display area Sc' of the object in step 4133 of FIG. 42 will be described.

Figure 44:
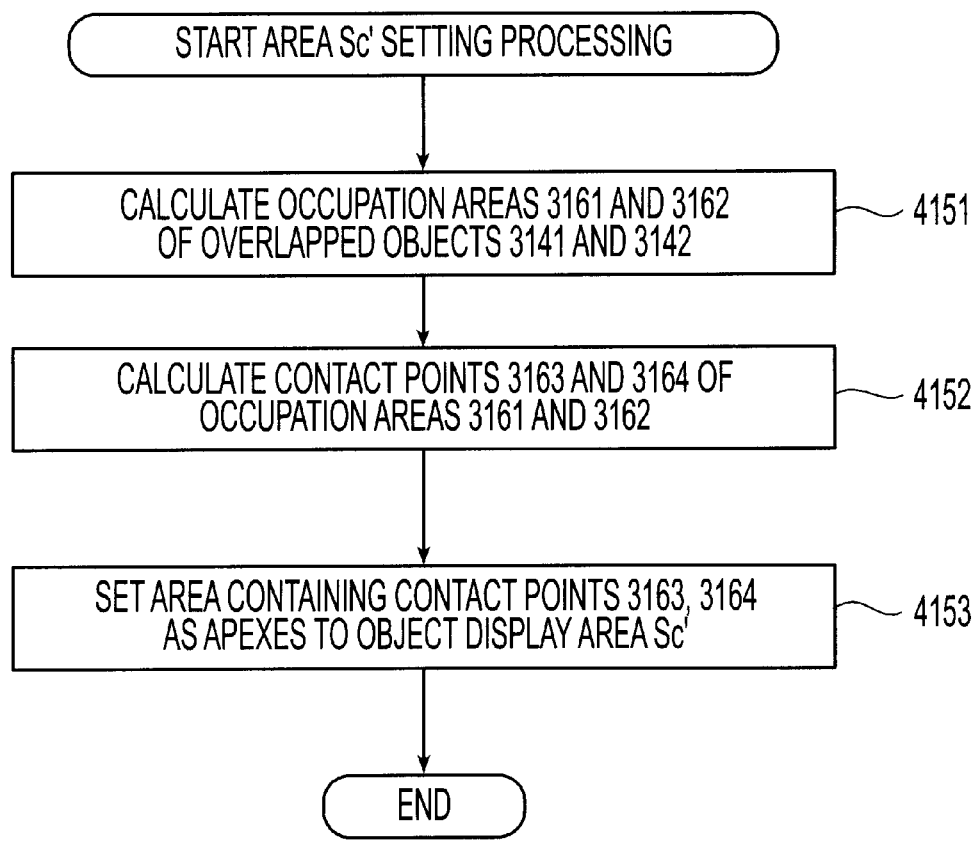
FIG. 44 is a flowchart showing an example of the processing of step 4133 shown in FIG. 42.
Figure 45:
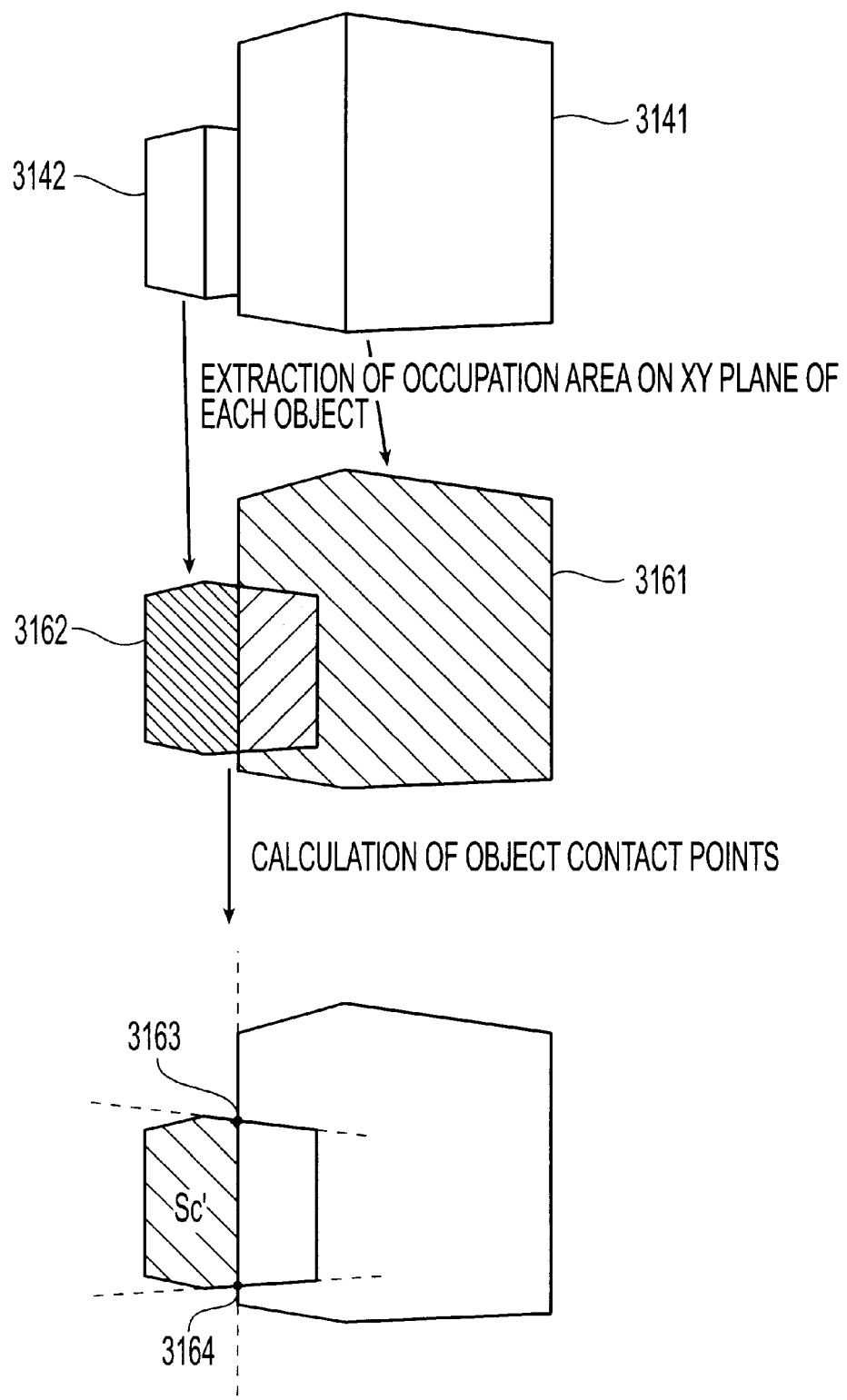
FIG. 45 is a diagram supplementing the flow of FIG. 44.

FIG. 44 is a flowchart showing an example of the processing of step 4133 shown in FIG. 42, and FIG. 45 is a diagram supplementing the flow of FIG. 44.

In the processing shown in FIG. 44, the occupation areas 3161 and 3162 on the XY plane of the objects 3141 and 3142 on the screen coordinate system are first calculated as shown in FIG. 45 (step 4151).

Subsequently, the contact points 3163 and 3164 of the occupation areas 3161 and 3162 are determined (step 4152), and an area containing the contact points 3163 and 3164 as the apexes thereof is set as the display area Sc' of the object 3142 (step 4153).

Next, a fifth embodiment according to the present invention will be described hereunder.

Figure 46:
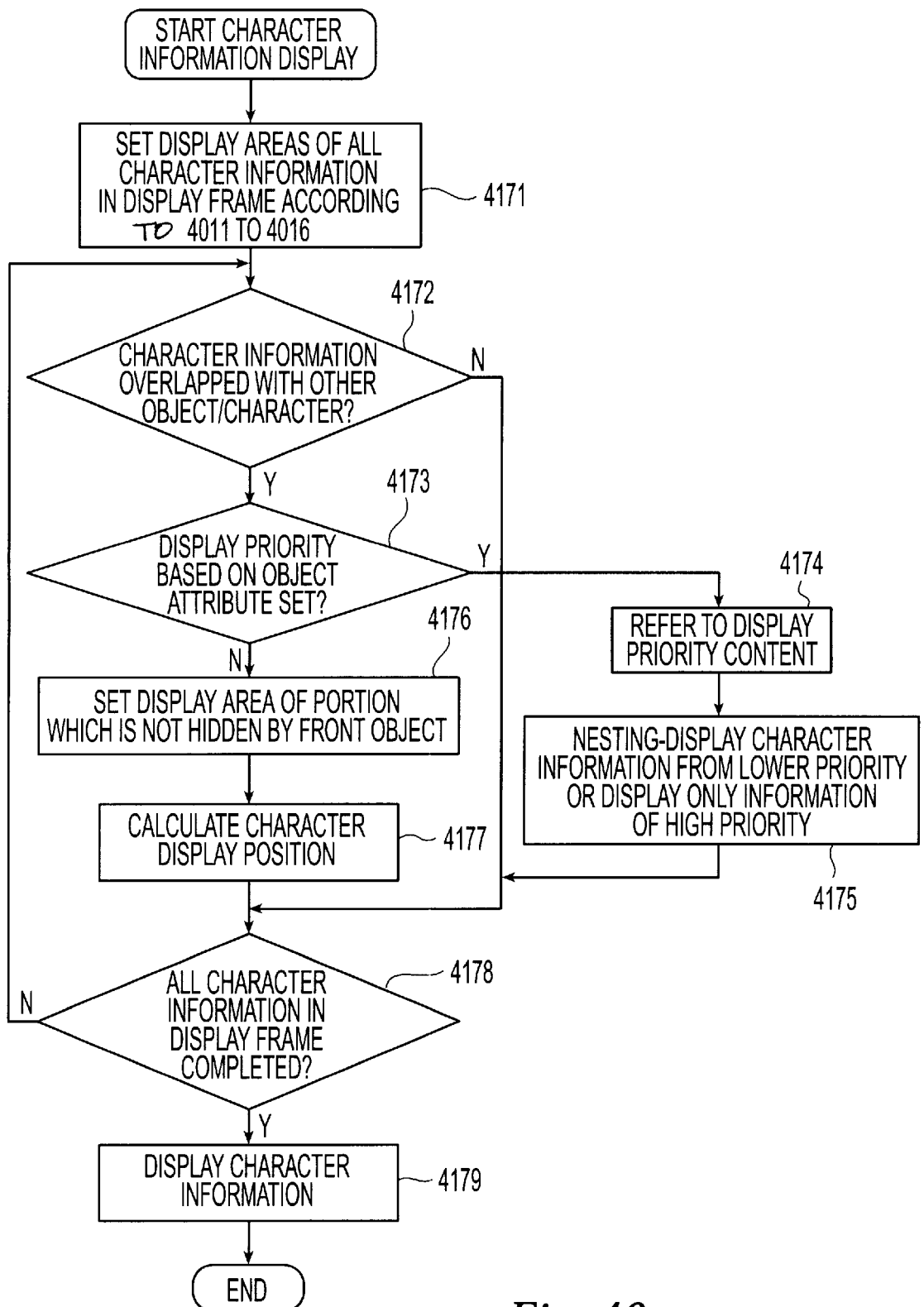
FIG. 46 is a flowchart showing the processing according to a fifth embodiment of the present invention.

FIG. 46 is a flowchart showing the processing according to the fifth embodiment according to the present invention.

According to the fifth embodiment, if the character information of an object is overlapped with another object or character information when the character information is disposed in the neighborhood of the corresponding object in the second and third embodiments, or if the overlap between objects is detected in the fourth embodiment, it is judged which character information (or object) is preferentially displayed to delete the display of one of the character information concerned and the other character information (object) or display them while overlaid on each other in accordance with the priority order.

First, the display area and display layout of the character information are set in accordance with steps 4011 to 4016 shown in FIG. 31, or step 4131 shown in FIG. 42 (step 4171).

Next, it is judged whether the character display area of the character information concerned is located at such a position that it is overlapped with another object located in front of the object corresponding to the character information or overlapped with the display area of the character information of another object (step 4172).

If the overlap is detected, it is judged whether there is any preferential display instruction/non-preferential display instruction in the overlapped character information or object which is overlapped with the character display area concerned (step 4173).

This instruction may be directly set by the user, or in consideration of safety under running, it may be automatically set by the system side to which this embodiment is applied.

If there is any preferential display instruction in step 4173, the attribute (for example, the type of the building, the type of the road, etc.) of the object is referred to (step 4174). The attribute of the object can be identified by referring to the character information added to the object, for example.

Subsequently, the priority is set on the basis of steps 4171 and 4172, and a nesting management is performed from appendant (character) information or object having a lower priority, so that the appendant (character) information or object having the highest priority is displayed on the display frame. The user may select the appendant information or object on the display frame by using a pointing device such as a mouse, a pen or the like to switch the appendant information or object to be displayed on the display frame in a toggle mode (step 4175).

On the other hand, if there is no preferential-display instruction in step 4173, the display area of the character information concerned is set at such a position that it is not overlapped with another object located in front of the object corresponding to the character information concerned on the display frame or the display area of the character information of the other object (step 4176).

Thereafter, the display layout of the character information is set on the basis of the display area of the character information thus set (step 4177).

After the processing of steps 4172 to 4177 is performed on all the character information within the display frame, the character information is developed and displayed on the display frame (step 4179). With this processing, the flow of FIG. 46 is ended.

FIGS. 47A and 47B to 54A and 54B show images on the display frame when the preferential display processing shown in the flowchart of FIG. 46 is performed. In all the cases, it is assumed that streets having many buildings standing in a row are displayed in a bird's-eye view display mode.

In FIGS. 47A and 47B to 54A and 54B, a display frame when the preferential processing is not performed is shown in FIGS. 47A to 54A, and a display frame when the preferential processing is performed is shown in FIGS. 47B to 54B. In each figure, reference numeral 3181 represents the vehicle position (current position) of a vehicle in which the navigation device of this embodiment is mounted, reference numeral 3182 represents a road, and reference numeral 3183 represents a structure such as a building or the like.

Figure 47A:
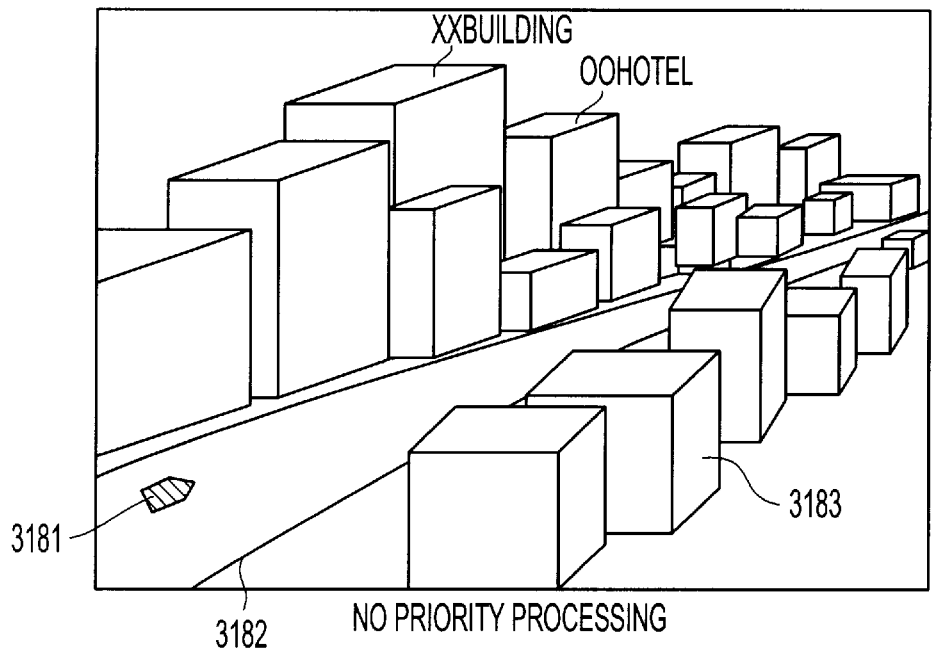
FIGS. 47A and 47B are diagrams each showing an image on a display frame when the preferential display processing shown in the flow of FIG. 46 is not performed and is performed on the basis of an object attribute, respectively.
Figure 47B:
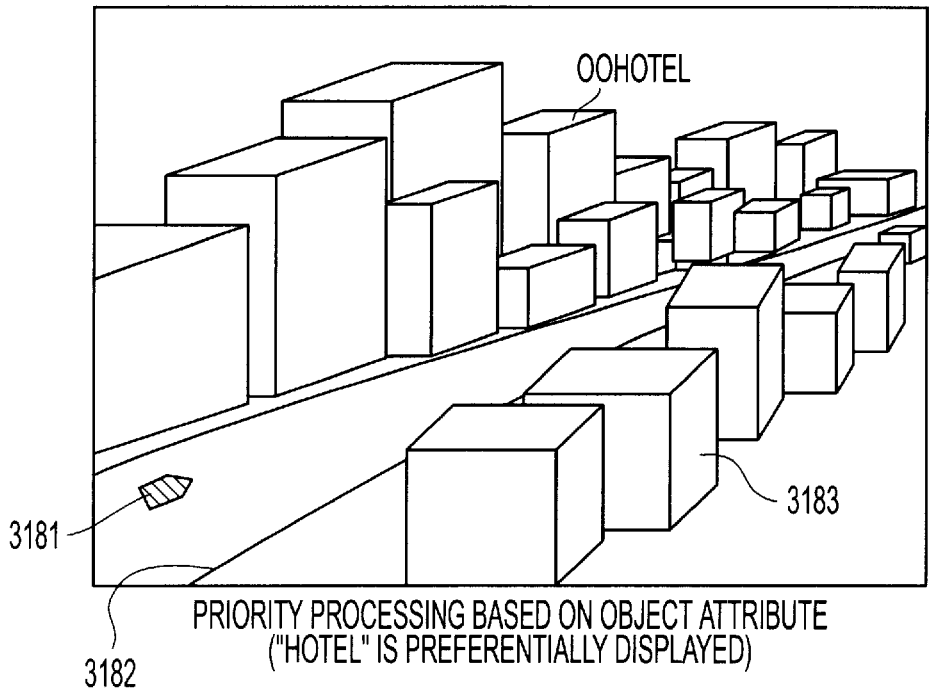

FIGS. 47A and 47B show a case when the display preferential processing is performed on the basis of the object attribute. In FIG. 47A showing the case where no preferential processing is performed, the character information "◯◯-hotel" of an object is displayed while overlapped with the character information "X X-building" of an object located in front of the object concerned on to display frame. In this case, such a display situation is undesirable for a user when the user wants to know hotel information around his (or her) vehicle.

In this case, if the user beforehand sets to preferentially display a building having an attribute "hotel" and the preferential processing is performed in accordance with the above setting, the character information "X X-building" is deleted as shown in FIG. 47B, so that the user can know the hotel information which he (she) needs.

Figure 48A:
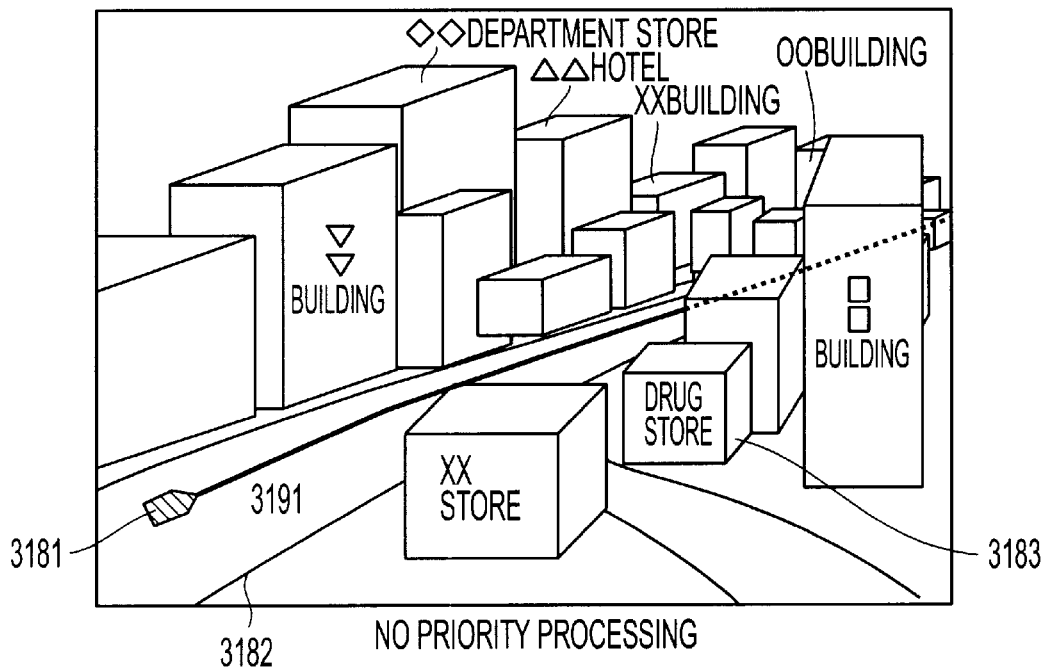
FIGS. 48A and 48B are diagrams each showing display frames when the preferential display processing shown in the flow of FIG. 46 is not performed and is performed in preference to information along a guide road, respectively.
Figure 48B:
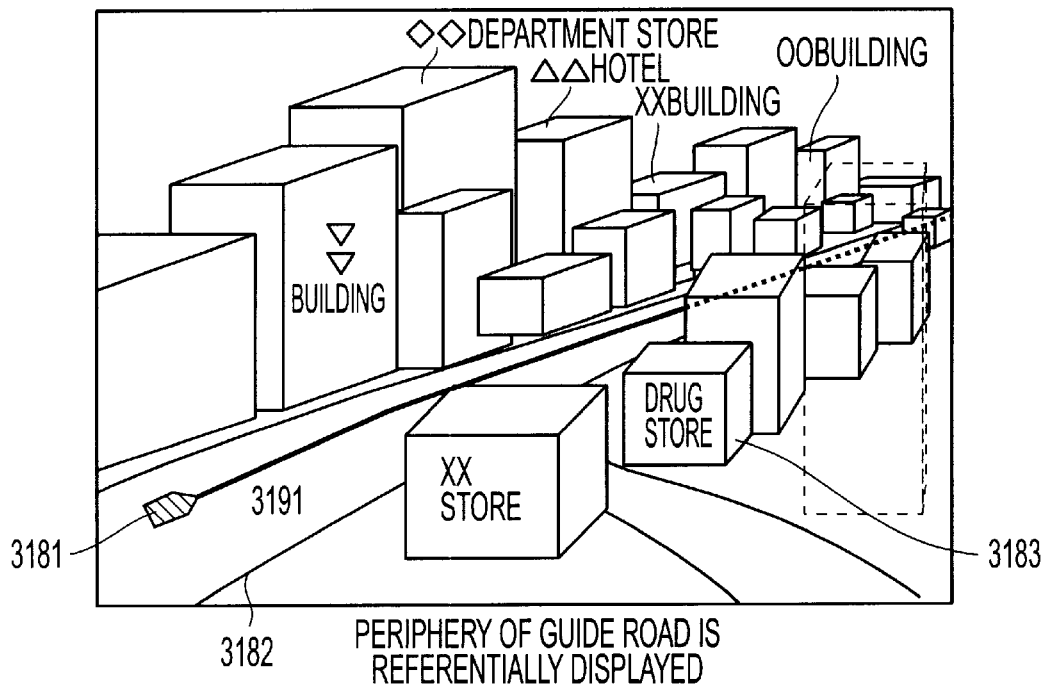

FIGS. 48A and 48B show a case where the guide of objects such as buildings, etc. along a guide route (road) is preferential. Here, the guide road is defined as a road which is one of various roads each connecting the current position and the destination and recommended in consideration of time, distance, fee or the like by the navigation device.

In FIGS. 48A and 48B, the guide route is represented by reference numeral 3191. In FIG. 48A in which no preferential processing is performed, the character information "◯◯-building" on the guide road is overlapped with the object added with the character information "▢▢-building".

On the other hand, in FIG. 48B in which the preferential processing is performed on the character information of the object along the guide road, the object appended with the character information "▢▢-building" is deleted, so that the character information "◯◯-building" can be seen.

In order for the user to easily see the guide road, the objects which are displayed while overlapped with the guide road may be displayed in the through-vision display mode as shown in FIG. 48.

Figure 49A:
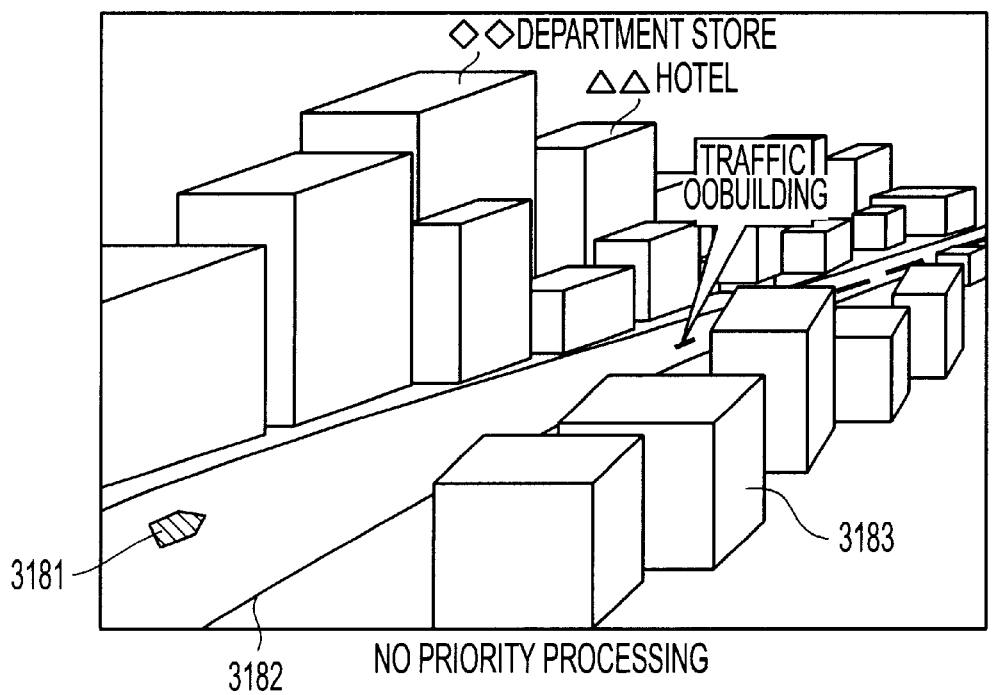
FIGS. 49A and 49B are diagrams each showing display frames when the preferential display processing shown in the flow of FIG. 46 is not performed and is performed in preference to traffic information, respectively.
Figure 49B:
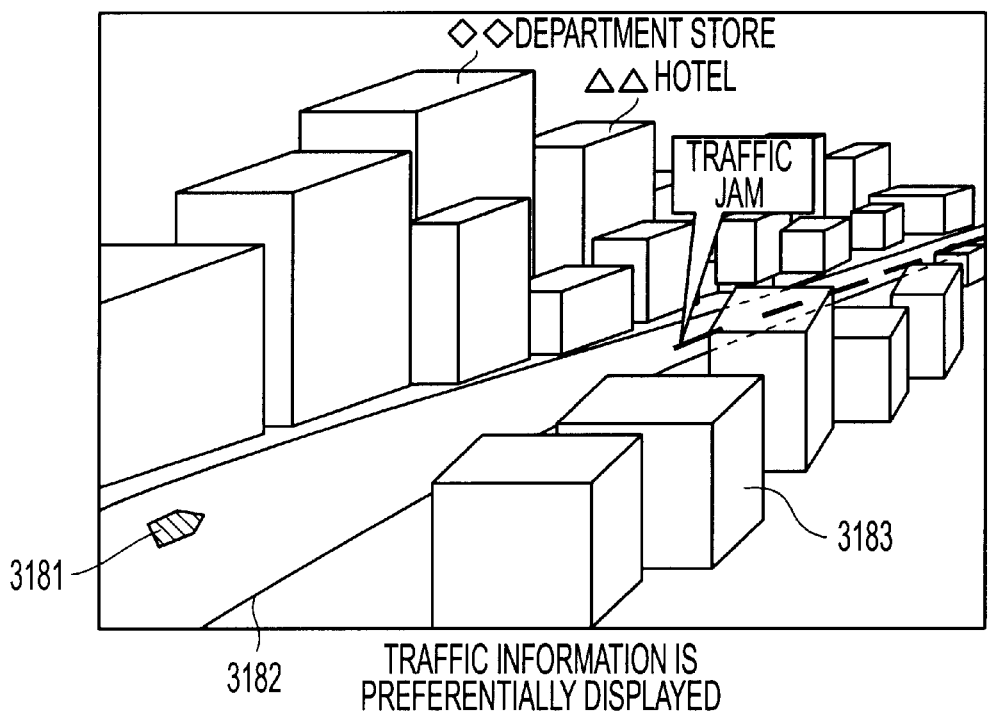

FIGS. 49A and 49B show a case of preferentially displaying traffic information such as closed roads, traffic jam, etc. obtained by various services such as VICS (Vehicle Information & Communication System), UTMS (Universal Traffic Management System) or the like.

In FIG. 49A in which no preferential processing is performed, the guidance of the traffic jam starting point is displayed while overlapped with the character information "◯◯-building".

On the other hand, in FIG. 49B in which the preferential processing is performed, the character information "◯◯-building" is deleted, and the guidance of the traffic jam starting point can be seen.

In order to clearly see the traffic jam status, the objects which are displayed while overlapped with the traffic jam road may be displayed in the through-vision display mode as shown in FIGS. 49A and 49B.

Figure 50A:
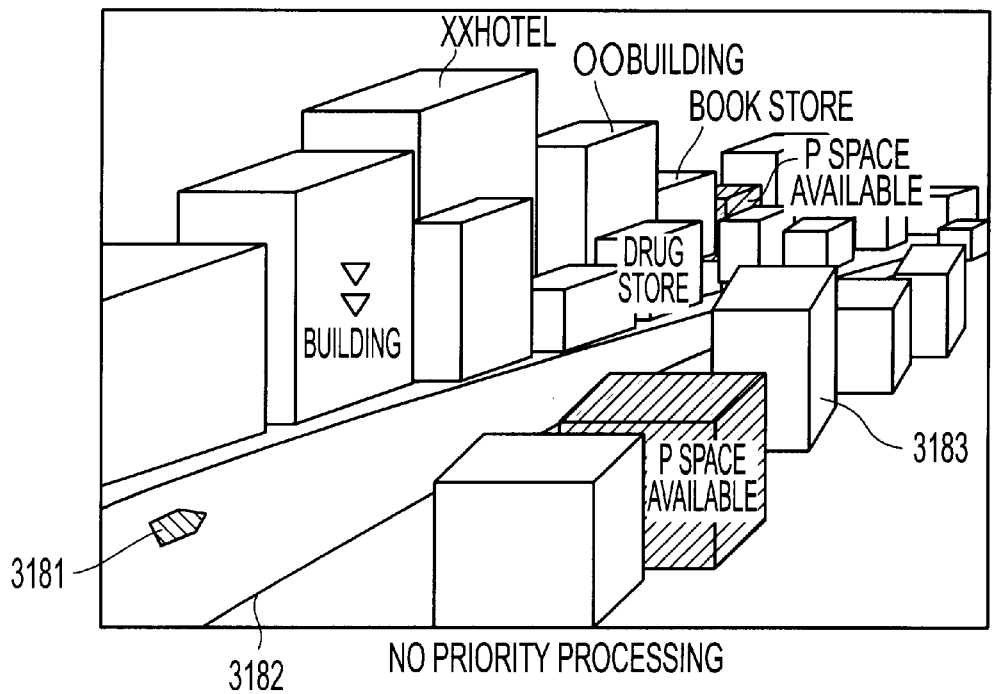
FIGS. 50A and 50B are diagrams each showing the display frames when the preferential display processing shown in the flow of FIG. 46 is not performed and is performed in preference to guide information transmitted from a service center, respectively.
Figure 50B:
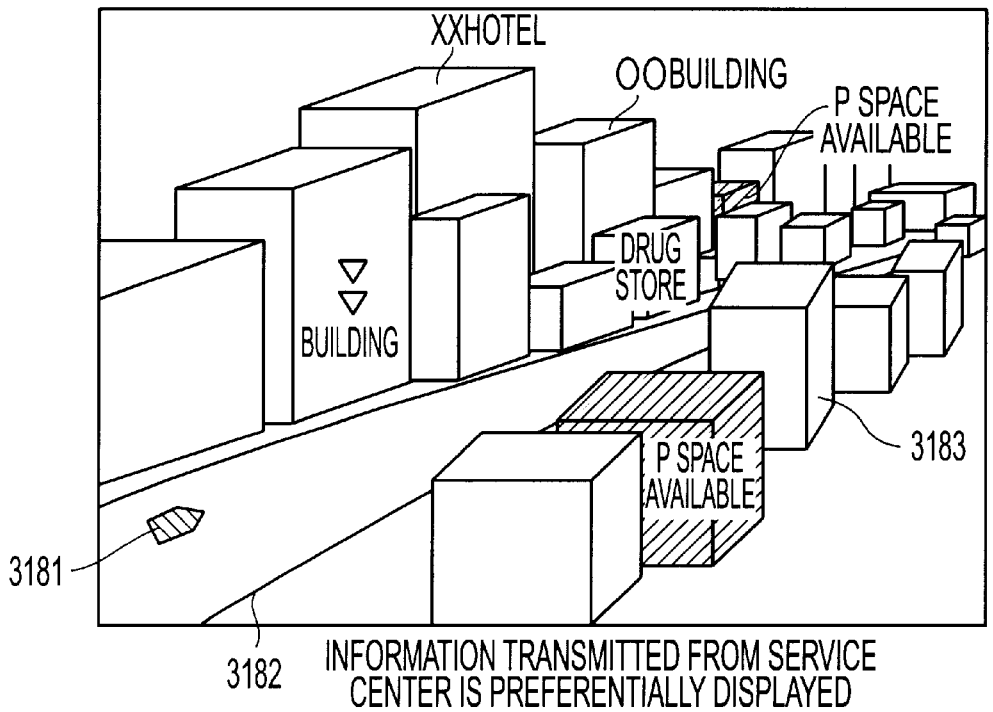

FIGS. 50A and 50B show a case of preferentially displaying character information such as the guidance of park places, etc. which are obtained by a service such as VICS, UTMS or the like.

In FIG. 50A in which no preferential processing is performed, the character information "P space available" is displayed while overlapped with character information "book store".

On the other hand, in FIG. 50B in which the preferential processing is performed, the character information "book store" is deleted, and the character information "P space available" can be seen easily.

Figure 51A:
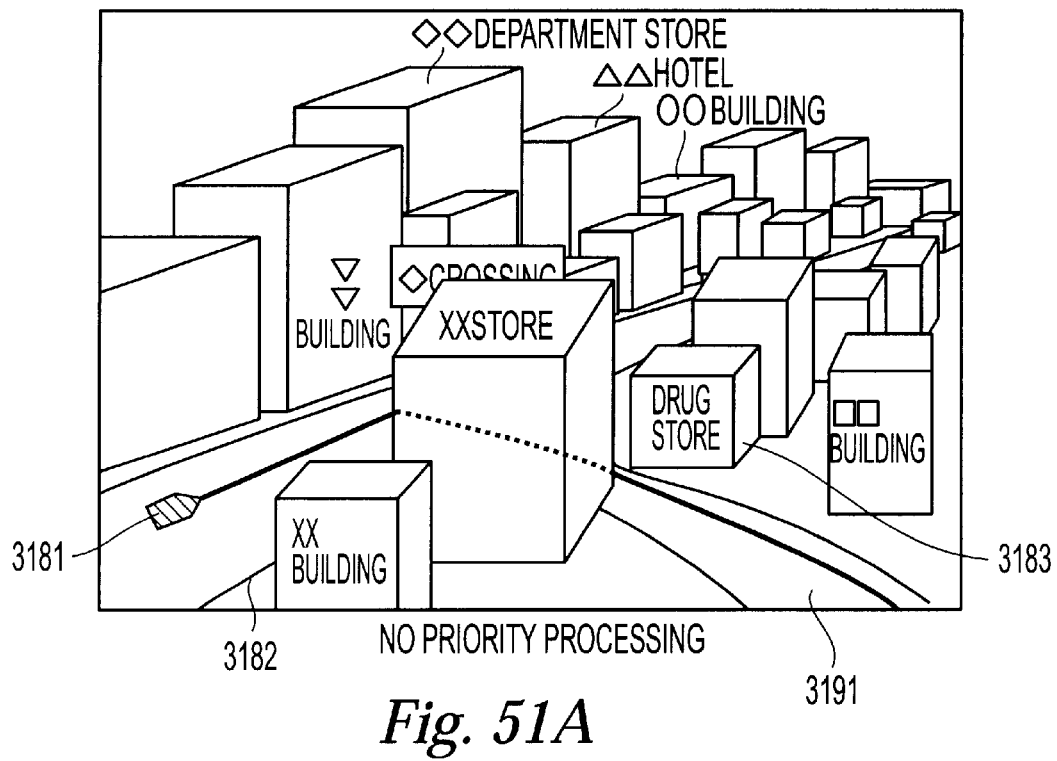
FIGS. 51A and 51B are diagrams each showing the display frames when the preferential display processing shown in the flow of FIG. 46 is not performed and is performed in preference to information on the periphery of a crossing, respectively.
Figure 51B:
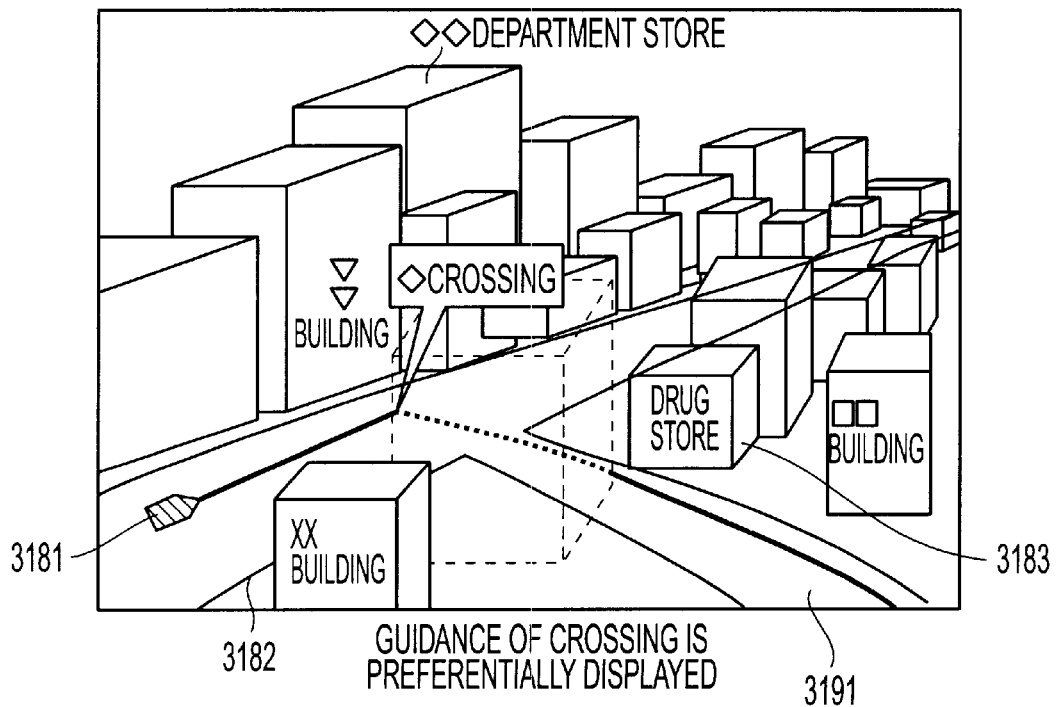

FIGS. 51A and 51B show a case where the guidance of a crossing is preferentially performed.

In FIG. 51A in which no preferential processing is performed, character information "◇-crossing" at a crossing at which the vehicle will be turned to the right is displayed while overlapped with an object which is added with character information "XX-store".

On the other hand, in FIG. 51B in which the display around the crossing is preferentially displayed, the character information "◇-crossing" can be seen.

In order for the user to easily see the periphery of the crossing, the objects which are displayed while overlapped with the crossing may be displayed in the through-vision display mode as shown in FIG. 51B.

FIGS. 52A, 52B, 53A and 53B show cases where the display preferential processing is performed on the basis of the vehicle position.

Figure 52A:
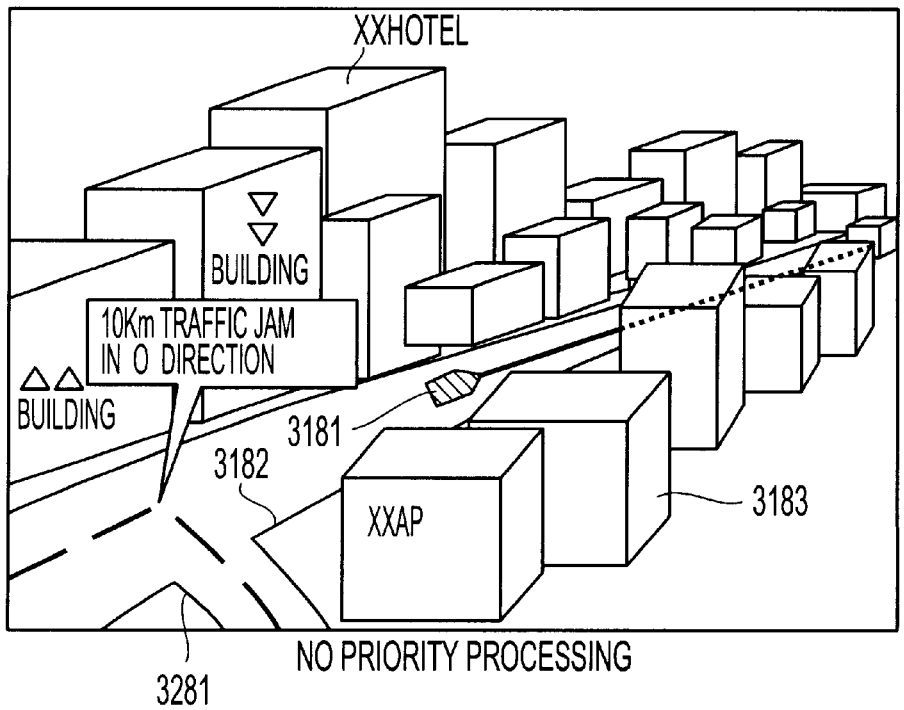
FIGS. 52A and 52B are diagrams each showing the display frames when the preferential display processing shown in the flow of FIG. 46 is not performed and is performed in preference to information on a road on which a car is running, respectively.
Figure 52B:
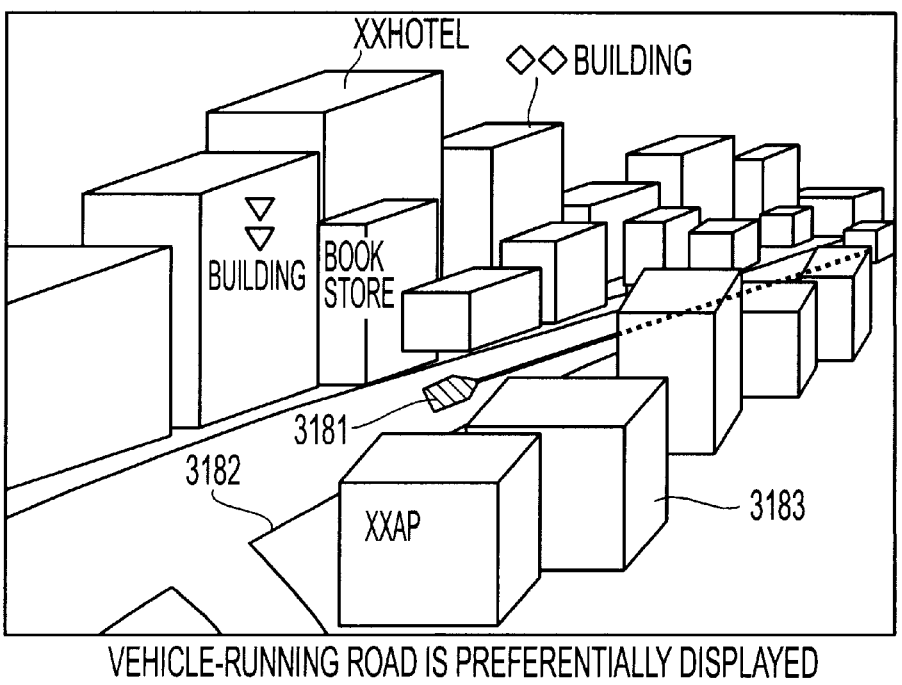

FIGS. 52A and 52B show the case where information on a running road is preferentially displayed.

In FIG. 52A in which no preferential processing is performed, the character information "▽▽-building" of an object on the running road is displayed while overlapped with the character information "10K traffic jam in the direction of ◯" of a road 3231 which is not connected with the vehicle running.

On the other hand, in FIG. 52B in which the information on the running road is preferentially displayed, the character information "10K traffic jam in the direction of ◯" is omitted, so that the user can easily see the character information "▽▽-building" of the object on the running road.

Figure 53A:
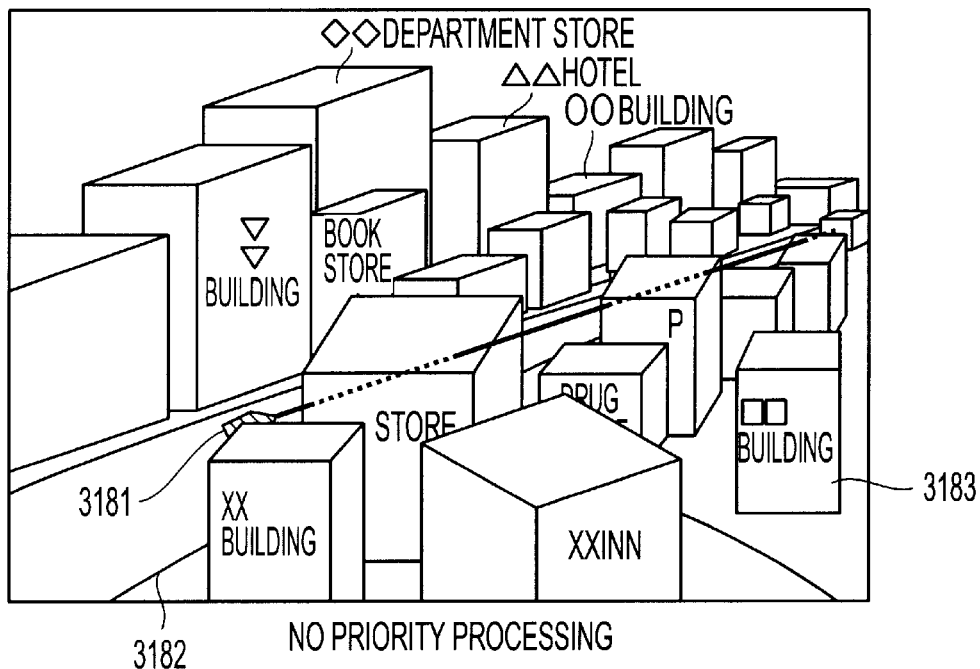
FIGS. 53A and 53B are diagrams each showing the display frames when the preferential display processing shown in the flow of FIG. 46 is not performed and is performed in preference to information on a road over which a car is going to pass, respectively.
Figure 53B:
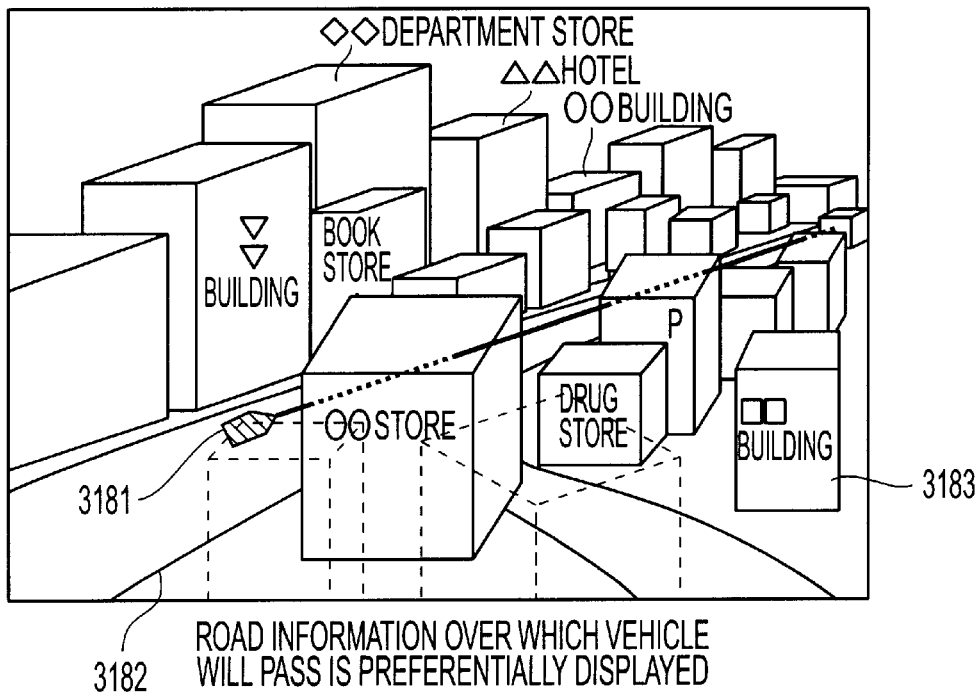

FIGS. 53A and 53B show a case where the character information of an object along a road over which the vehicle will pass is preferentially displayed.

In FIG. 53A in which no preferential processing is performed, character information "drugstore" and "◯◯- store" of objects along a road over which the vehicle will pass are displayed while overlapped with character information "X X-building" and "X X-inn" which are not located along the road over which the vehicle will pass. Therefore, it is difficult for the user to see the desired character information. This is a critical problem particularly when the "drugstore" or "○○-store" is used as a landmark during vehicle running.

In FIG. 53B in which the character information of objects standing along a road over which the vehicle passes is preferentially displayed, the character information "X X-building" and "X X-inn" which are not located along the road over which the vehicle will pass is deleted, and by displaying the objects of the character information "X X-building" and X X-inn" so that these objects are not conspicuous, the character information "drugstore" or "○○-store" can be made easier to see.

Figure 54A:
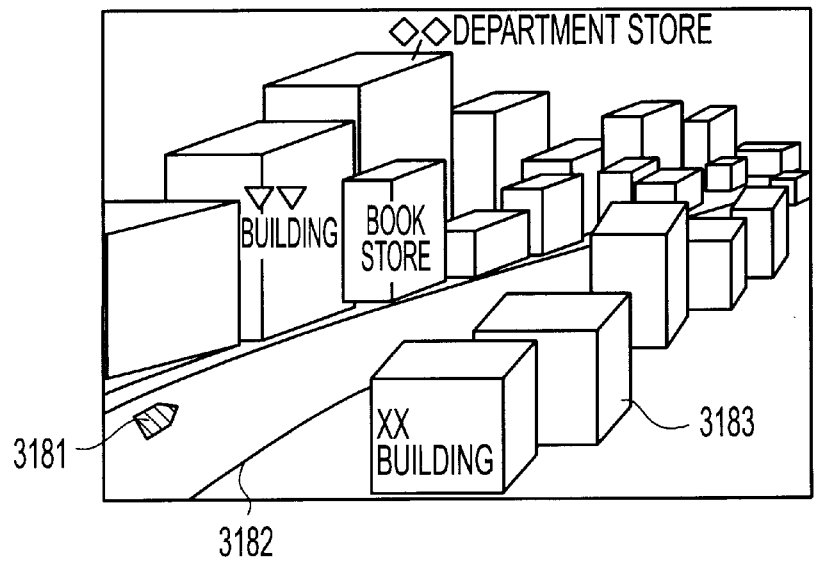
FIG. 54A is a diagram showing a case where a user is not notified of the fact that omitted character information (overlapped character information) exists due to the preferential display.
Figure 54B:
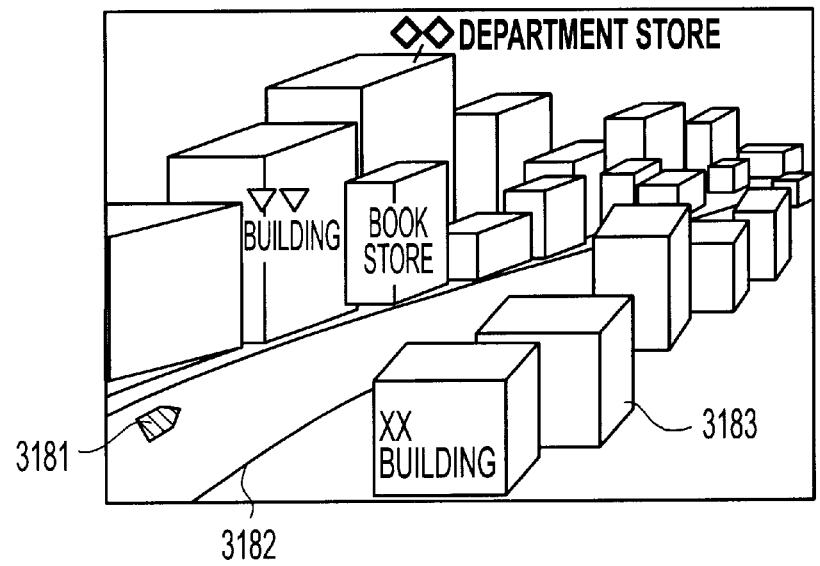
FIG. 54B is a diagram showing a case where a user is notified of the fact that omitted character information (overlapped character information) exists due to the preferential display.

FIGS. 54A and 54B show cases where it is not notified and is notified to the user that there is some character information omitted due to the preferential display (i.e., some overlapped character information), respectively.

In FIG. 54A in which the user is given no notification, it is needless to say that the user does not know that there is any character information which is deleted to display the character information "◇ ◇-department store".

In FIG. 54B in which the character information "◇ ◇-department store" is displayed with a character decoration such as a bald to notify the user that there is some information which is not displayed on the display frame.

The information which is not displayed on the display frame may be subjected to the nesting management, and the character information "◇ ◇-department store" displayed in a bald mode may be selected and displayed by an input unit such as a mouse, a pen, a finger or the like. In this case, it may be considered that the character information in a toggle mode is switched and displayed in a toggle mode at a timing selected by the input unit.

Further, in addition to the character decoration such as the bald display, the character information "◇ ◇-department store" may be displayed while a display color or a display pattern is changed to notify the presence or absence of the deleted characters to the user.

Still further, in FIGS. 47A and 47B to 54A and 54B, when the user selects any object, the priority order may be altered to renew the display of the character information.

Next, the construction of the navigation device to which the second to fifth embodiments of the present invention are applied will be described.

Figure 55:
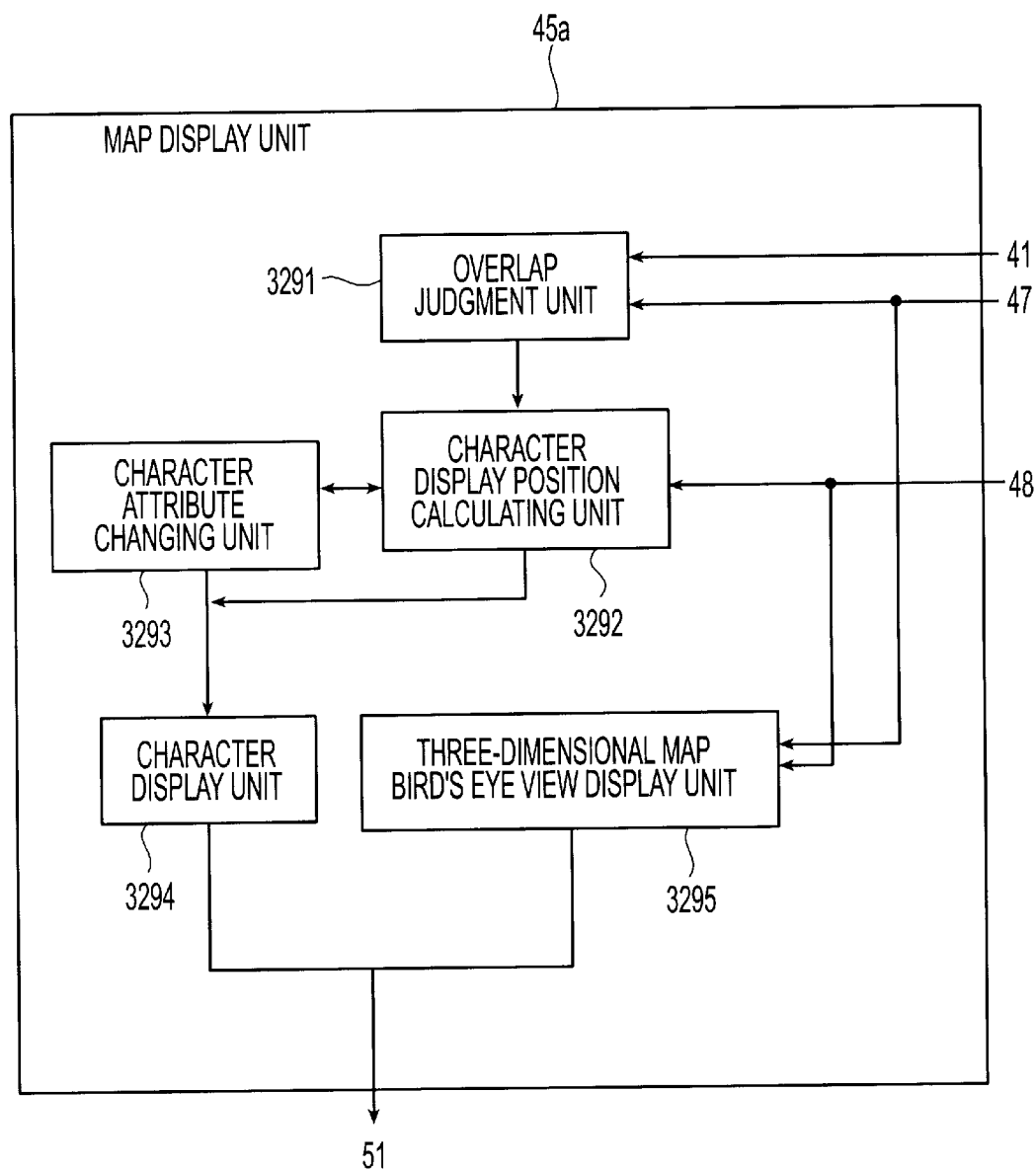
FIG. 55 is a diagram showing the functional construction of a map display unit of the calculation processor which is one of the constituent elements of the navigation device to which the second to fifth embodiments of the present invention are applied.

FIG. 55 shows the functional construction of the map display unit of the calculation processor which is one of constituent elements of the navigation device to which the second to fifth embodiments of the present invention are applied.

The difference of the navigation device of the second to fifth embodiments of the present invention from the navigation device of the first embodiment resides in that the former navigation device uses a map display unit 45*a* shown in FIG. 55 in place of the map display unit 45 shown in FIG. 5.

The other construction is the same as the car-mounted type navigation device to which the first embodiment of the present invention shown in FIGS. 2 to 4 is applied. Therefore, the elements having the same functions as the first embodiment are represented by the same reference numerals, and the detailed description thereof is omitted.

The map display unit 45*a* of FIG. 55 receives from the data reading unit 48 the map data of the periphery of a point which is requested to be displayed, and performs the above-described character display processing of the second to fifth embodiments.

In FIG. 55, in accordance with a command (change of display scale/change of view-point/change of current position, etc.) output from the user's operation analyzer 41 or the map matching processor 47, an overlap judgment unit 3291 judges whether character information to be displayed on the frame is overlapped with another object or the character information of another object.

Upon receiving a command output from the overlap judgment unit 3291, a character display position calculator 3292 receives map data from the data reading unit 48 to layout character information on the display frame.

In accordance with a command output from the character position calculator 3292, a character attribute altering unit 3293 alters the display attribute (character size, character interval, etc.) of characters.

Here, there may be a case where the processing of the character position calculator 3292 is performed again in accordance with the output of the character attribute altering unit 3293.

A character display unit 3294 generates a character display command in accordance with the character attribute and the character display position which are indicated from the character attribute altering unit 3293 and the character position calculator 3292.

A three-dimensional map bird's-eye view display unit 3295 receives map data from the data reading unit 48 in accordance with the output of the map matching processor 47 to generate a three-dimensional map drawing command.

The three-dimensional map drawing command generated in the three-dimensional map bird's-eye view display unit 3295 and the drawing command such as the name/guide information, etc. generated in the character display unit 3294 are transmitted to the graphics processor 51.

In the second to fifth embodiments, character information comprising a character array is used as appendant information which is connected with an object. However, the appendant information of the present invention is not limited to the above character information. For example, characters, symbols, figures or any combination thereof may be used as the appendant information of the object.

Further, each embodiment relates to a navigation device to which the present invention is applied. However, the present invention is applicable to any equipment which displays a three-dimensional bird'seye view map.

As described above, according to the present invention, the information of map constituents, etc. located on the hidden surface which occurs when the three-dimensional map bird's-eye view display is performed can be also displayed. Therefore, any information which is needed by the user can be displayed. Accordingly, the three-dimensional map bird's-eye view display with high visibility can be performed.

Further, the display area of the appendant information of a map constituent is set on the basis of the display area of the map constituent concerned, so that the appendant information can be displayed at such a position that it can be easily seen in accordance with the variation of the map constituent. Therefore, the visibility can be prevented from being lowered, and thus excellent map information can be provided in the three-dimensional map display.

Still further, the overlap between the appendant information of a map constituent and another map constituent (or the appendant information of the other map constituent) is detected, and the display area of the overlap-detected appendant information is reset or the priority order is set to display the appendant information having higher priority, so that the overlap between appendant information pieces can be prevented.

What is claimed is:

1. A navigation device for displaying a three-dimensional map on a display frame, comprising:

a map storage unit for storing three-dimensional data of plural map constituents which constitute the three-dimensional map;

a vehicle position detecting unit for detecting a position of a vehicle in which the navigation device is installed;

a view point determining unit for determining a view point on the basis of the position of the vehicle detected by the vehicle position detecting unit; and a map display unit for projecting a mark showing the position of the vehicle detected by the vehicle position detecting unit and each map constituent specified by the three-dimensional data stored in said map storage unit onto a plane from the view point determined by the view point determining unit, to form a three-dimensional bird's-eye view map, and displaying the three-dimensional bird's-eye view map on the display frame, wherein said map display unit includes:

a hiding determining means for determining whether, in three dimensional space, the mark is hidden by a map constituent located nearer the viewpoint than the mark so that there is no direct line of sight between the view point and the mark and the mark is not normally displayed on the three-dimensional bird's-eye view map; and a projection mode changing means for automatically changing a projection mode of the mark or the map constituent so that the mark is displayed on the display frame even though the mark is not in a direct line of sight from the view point, wherein the projection mode is automatically changed only if the hiding determining means determines that the mark is hidden by the map constituent.

2. The navigation device as claimed in claim 1, further comprising a navigation information setting unit for setting, on a first map constituent, navigation information such as a landmark, a destination point, or a route to the destination point, wherein said hiding determining means determines whether or not the first map constituent is hidden by a second map constituent located nearer the view point than the first map constituent so that the first map constituent is not displayed on the three-dimensional bird's-eye view map, and said projection mode changing means changes a projection mode of the first map constituent or the second map constituent so that the first map constituent is displayed on the display frame when the hiding determining means determines that the first map constituent is hidden by the second map constituent and thus the first map constituent is not displayed on the three-dimensional bird's-eye view map.

3. The navigation device as claimed in claim 2, wherein said projection mode changing means performs a-blending processing between the first map constituent and the second map constituent to display the first map constituent while the second map constituent is seen through, when the hiding determining means determines that the first map constituent is hidden by the second map constituent and thus the first map constituent is not displayed on the three-dimensional bird's-eye view map.

4. The navigation device as claimed in claim 3, wherein said projection mode changing means changes the projection mode of the first map constituent so that the first map constituent is displayed in front of the second map constituents when the hiding determining means determines that the first map constituent is hidden by the second map constituent and thus the first map constituent is not displayed on the three-dimensional bird's-eye view map.

5. The navigation device as claimed in claim 4, wherein said projection mode changing means changes a display attribute of a part of the first map constituent so that the part of the first map constituent is displayed with a predetermined pattern, color or line type, when the hiding determining means determines that the first map constituent is hidden by the second map constituent and thus the first map constituent is not displayed on the three-dimensional bird's-eye view map.

6. The navigation device as claimed in claim 2, wherein said projection mode changing means changes the projection mode of the second map constituent so that the second map constituent is not projected onto the plane, when the hiding determining means determines that the first map constituent is hidden by the second map constituent and thus the first map constituent is not displayed on the three-dimensional bird's-eye view map.

7. The navigation device as claimed in claim 6, wherein said projection mode changing means projects onto the plane an area occupied by the second map constituent on the ground plane in place of the projection of the second map constituent, when the hiding determining means determines that the first map constituent is hidden by the second map constituent and thus the first map constituent is not displayed on the three-dimensional bird's-eye view map.

8. The navigation device as claimed in claim 6, wherein said projection mode changing means displays a name of the second map constituent on the three-dimensional bird's-eye view map in place of the second map constituent, when the hiding determining means determines that the first map constituent is hidden by the second map constituent and thus the first map constituent is not displayed on the three-dimensional bird's-eye view map.

9. The navigation device as claimed in claim 2, wherein said projection mode changing means changes the projection mode of the first map constituent or the second map constituent so that the first map constituent is displayed on the display frame, when the hiding determining means determines that the first map constituent is hidden by the second map constituent and a ratio of an area of a part of the first map constituent hidden by the second map constituent to a whole area of the first map constituent is lager than a predetermined value.

10. A navigation device for displaying a three-dimensional map on a display frame, comprising:

a map storage unit for storing three-dimensional data of plural map constituents which constitute the thee-dimensional map;

a vehicle position detecting unit for detecting a position of a vehicle in which the navigation device is installed;

a view point determining unit for determining a first view point on the basis of the position of the vehicle detected by the vehicle position detecting unit; and a map display unit for projecting a mark showing the position of the vehicle detected by the vehicle position detecting unit and each map constituent specified by the three-dimensional data stored in said map storage unit onto a plane from the first view point determined by the view point determining unit, to form a three-dimensional bird's-eye view map, and displaying the three-dimensional bird's-eye view map on the display frame, wherein said map display unit includes;

a hiding determining means for determining whether, in three dimensional space, the mark is hidden by a map constituent located nearer the first view point than the mark so that there is no direct line of sight between the view point and the mark and the mark is not displayed on the three-dimensional bird's-eye view map; and a view point changing means for automatically switching from the first view point to a second view point which has a direct line of sight to the mark so that the mark is displayed on the three-dimensional bird's-eye view map, wherein the automatic switching takes place only if the hiding determining means determines that the mark is hidden by the map constituent.

11. The navigation device as claimed in claim 10, further comprising a navigation information setting unit for setting, on a first map constitutent, navigation information such as a landmark, a destination point, or a route to the destination point, wherein said hiding determining means determines whether or not the first map constituent is hidden by a second map constituent located nearer the view point than the first map constituent so that the first map constituent is not displayed on the three-dimensional bird's-eye view map, and said view point changing means changes a position of the view-point to a position where the first map constituent is displayed on the three-dimensional bird's-eye view map when the hiding determining means determines that the first map constituent is hidden by the second map constituent and thus the first map constituent is not displayed on the three-dimensional bird's-eye view map.

12. A navigation device for displaying a three-dimensional map on a display frame, comprising:

a map storage unit for storing three-dimensional data of plural map constituents which constitute the three-dimensional map;

a vehicle position detecting unit for detecting a position of a vehicle in which the navigation device is installed;

a view point determining unit for determining a view point on the basis of the position of the vehicle detected by the vehicle position detecting unit; and a map display unit for projecting a mark showing the position of the vehicle detected by the vehicle position detecting unit and each map constituent specified by the three-dimensional data stored in said map storage unit onto a plane from the view point determined by the view point determining unit, to form a three-dimensional bird's-eye view map, and displaying the three-dimensional bird's-eye view map on the display frame, wherein said map display unit includes;

a hiding determining means for determining whether, in three dimensional space, the mark is hidden by a map constituent located nearer the view point than the mark so that there is no direct line of sight between the view point and the mark and the mark is not displayed on the three-dimensional bird's-eye view map; and a two-dimensional map display means for automatically forming a two-dimensional map on the basis of the two-dimensional data of each map constituent and automatically displaying the two-dimensional map with the mark on the display frame in place of the three-dimensional bird's-eye view map, wherein the two-dimensional map is automatically formed and displayed only if the hiding determining means determines that the mark is hidden by the map constituent.

13. The navigation device as claimed in claim 12, further comprising a navigation information setting unit for setting navigation information with regard to a first map constituent, such as a landmark, a destination point, or a route to the destination point, wherein said hiding determining means determines whether or not the first map constituent is hidden by a second map constituent located nearer the view point than the first map constituent so that the first map constituent is not displayed on the three-dimensional bird's-eye view map, and said two-dimensional map display means forms a two-dimensional map on the basis of the two-dimensional data of each map constituent to display the two-dimensional map on the display frame in place of the three-dimensional bird's-eye view map when the hiding determining means determines that the first map constituent is hidden by the second map constituent and thus the first map constituent is not displayed on the three-dimensional bird's-eye view map.

14. A navigation device for displaying a three-dimensional map on a display frame, comprising:

a map storage unit for storing three-dimensional data of plural map constituents which constitute the three-dimensional map;

a vehicle position detecting unit for detecting a position of a vehicle in which the navigation device is installed;

a view point determining unit for determining a view point on the basis of the position of the vehicle detected by the vehicle position detecting unit; and a map display unit for projecting a mark showing the position of the vehicle detected by the vehicle position detecting unit and each map constituent specified by the three-dimensional data stored in said map storage unit onto a plane from the view point determined by the view point determining unit, to form a three-dimensional bird's-eye view map, and displaying the three-dimensional bird's-eye view map on the display frame, wherein said map display unit includes;

a hiding determining means for determining whether, in three dimensional space, the mark is hidden by a map constituent located nearer the view point than the mark so that there is no direct line of sight between the view point and the mark and the mark is not displayed on the three-dimensional bird's-eye view map; and a two-dimensional bird's-eye view map display means for automatically forming on the basis of the two-dimensional data of each map constituent, a two-dimensional bird's-eye view map obtained by viewing a two-dimensional map from the view point, and automatically displaying the two-dimensional bird's-eye view map with the mark on the display frame in place of the three-dimensional bird's-eye view map, wherein the two-dimensional bird's eye view map is automatically formed and displayed only if the hiding determining means determines that the mark is hidden by the map constituent.

15. The navigation device as claimed in claim 14, further comprising a navigation information setting unit for setting, on a first map constituent, navigation information such as a landmark, a destination point, or a road to the destination point, wherein said hiding determining means determines whether or not the first map constituent is hidden by a second map constituent located nearer the view point than the first map constituent so that the first map constituent is not displayed on the three-dimensional bird's-eye view map, and said two-dimensional bird's-eye view map display means forms on the basis of the two-dimensional data of each map constituent, a two-dimensional bird's-eye view map obtained by viewing a two-dimensional map from the view point, to display the two-dimensional bird's-eye view map on the display frame in place of the three-dimensional bird's-eye view map when the hiding determining means determines that the first map constituent is hidden by the second map constituent and thus the first map constituent is not displayed on the three-dimensional bird's-eye view map.

16. A navigation device for displaying a three-dimensional map on a display frame, comprising:

a map storage unit for storing three-dimensional data of plural map constituents which constitute the three-dimensional map;

a vehicle position detecting unit for detecting a position of a vehicle in which the navigation device is installed; and a map display unit for projecting a mark showing the position of the vehicle detected by the vehicle position detecting unit and each map constituent specified by the three-dimensional data stored in said map storage unit onto a plane from a view point, which is determined on the basis of the position of the vehicle detected by the vehicle position detecting unit, to form a three-dimensional bird's-eye view map, and displaying the three-dimensional bird's-eye view map on the display frame, wherein said map display unit includes a duplicative display means for deciding whether or not the mark is hidden by a map constituent located nearer the view point than the mark so that the mark is not displayed on the three-dimensional bird's-eye view map, and for forming a two-dimensional map on the basis of the two-dimensional data of each map constituent to display the two-dimensional map with the mark on the display frame together with the three-dimensional bird's-eye view map when it is determined that the mark is hidden by the map constituent and thus the mark is not displayed on the three-dimensional bird's-eye view map.

17. The navigation device as claimed in claim 16, further comprising a navigation information setting unit for setting navigation information indicating a first map constituent such as a landmark, a destination point, or a road to the destination point, wherein said duplicative display means determines whether or not the first map constituent is hidden by a second map constituent located nearer the view point than the first map constituent so that the first map constituent is not displayed on the three-dimensional bird's-eye view map, and forms a two-dimensional map on the basis of the two-dimensional data of each map constituent to display the two-dimensional map on the display frame together with the three-dimensional bird's-eye view map when it is determined that the first map constituent is hidden by the second map constituent and thus the first map constituent is not displayed on the three-dimensional bird's-eye view map.

18. A navigation device for displaying a three-dimensional map on a display frame, comprising:

a map storage unit for storing three-dimensional data of plural map constituents which constitute the three-dimensional map;

a vehicle position detecting unit for detecting a position of a vehicle in which the navigation device is installed; and a map display unit for projecting a mark showing the position of the vehicle detected by the vehicle position detecting unit and each map constituent specified by the three-dimensional data stored in said map storage unit onto a plane from a view point, which is determined on the basis of the position of the vehicle detected by the vehicle position detecting unit, to form a three-dimensional bird's-eye view map, and displaying the three-dimensional bird's-eye view map on the display frame, wherein said map display unit includes a duplicative display means for determining whether or not the mark is hidden by a map constituent located nearer the view point than the mark so that the mark is not displayed on the three-dimensional bird's-eye view map, and for forming on the basis of the two-dimensional data of each map constituent, a two-dimensional bird's-eye view map obtained by viewing a two-dimensional map from the view point, to display the two-dimensional bird's-eye view map with the mark on the display frame together with the three-dimensional bird's-eye view map when it is determined that the mark is hidden by the map constituent and thus the mark is not displayed on the three-dimensional bird's-eye view map.

19. The navigation device as claimed in claim 18, further comprising a navigation information setting unit for setting navigation information indicating a first map constituent such as a landmark, a destination point, or a road to the destination point, wherein said duplicative display means determines whether or not the first map constituent is hidden by a second map constituent located nearer the view point than the first map constituent so that the first map constituent is not displayed on the three-dimensional bird's-eye view map, and forms on the basis of the two-dimensional data of each map constituent, a two-dimensional bird's-eye view map obtained by viewing a two-dimensional map from the view point, to display the two-dimensional bird's-eye view map on the display frame together with the three-dimensional bird's-eye view map when it is determined that the first map constituent is hidden by the second map constituent and thus the first map constituent is not displayed on the three-dimensional bird's-eye view map.

20. A navigation device for displaying a three-dimensional map on a display frame, comprising:

a map storage unit for storing three-dimensional data of plural map constituents which constitute the three-dimensional map;

a vehicle position detecting unit for detecting a position of a vehicle in which the navigation device is installed; and a map display unit for projecting a mark showing the position of the vehicle detected by the vehicle position detecting unit and each map constituent specified by the three-dimensional data stored in said map storage unit onto a plane from a view point, which is determined on the basis of the position of the vehicle detected by the vehicle position detecting unit, to form a first three-dimensional bird's-eye view map, and displaying the first three-dimensional bird's-eye view map on the display frame, wherein said map display unit includes duplicative display means for determining whether or not the mark is hidden by a map constituent located nearer the view point than the mark so that the mark is not displayed on the three-dimensional bird's-eye view map, and for forming a second three-dimensional bird's-eye view map obtained by projecting the mark showing the position of the vehicle and each of the map constituents onto a plane from a view point where the mark showing the position of the vehicle can be viewed, to display the second three-dimensional bird's-eye view map on the display frame together with the first three-dimensional bird's-eye view map when it is determined that the mark is hidden by the map constituent and thus the mark is not displayed on the three-dimensional bird's-eye view map.

21. The navigation device as claimed in claim 20, further comprising a navigation information setting unit for setting navigation information indicating a first map constituent such as a landmark, a destination point, or a road to the destination point, wherein said duplicative display means determines whether or not the first map constituent is hidden by a second map constituent located nearer the view point than the first map constituent so that the first map constituent is not displayed on the three-dimensional bird's-eye view map, and forms the second three-dimensional bird's-eye view map obtained by projecting the mark showing the position of the vehicle and each of the map constituents onto a plane from a view point where the first map constituent can be viewed, to display the second three-dimensional bird's-eye view map on the display frame together with the first three-dimensional bird's-eye view map when it is determined that the first map constituent is hidden by the second map constituent and thus the first map constituent is not displayed on the three-dimensional bird's-eye view map.

22. A map display method for displaying a three dimensional map on a display frame, comprising steps of:

detecting a position of a vehicle;

determining a view point on the basis of the detected position of the vehicle;

forming a three-dimensional map in which a mark showing the detected position of the vehicle and map constituents are arranged on a three-dimensional coordinate system, on the basis of the detected position of the vehicle and three-dimensional data of plural map constituents stored in storing unit;

projecting the mark and the map constituent arranged on the three-dimensional coordinate system onto a plane from the determined view point to form a three-dimensional bird's-eye view map;

displaying the three-dimensional bird's-eye view map on the display frame, determining whether, in three dimensional space, the mark is hidden by a map constituent located nearer the view point than the mark such that there is no direct line of sight between the view point and the mark, and automatically changing a projection mode of the mark or of the map constituent behind which the mark is hidden so that the mark is displayed on the display frame even though there is no direct line of sight from the view point to the mark, wherein the projection mode is automatically changed only if the hiding determining means determines that the mark is hidden by the map constituent.

23. A navigation device for displaying a three dimensional map on a display frame, comprising:

a map storing unit for storing three-dimensional data of plural map constituents which constitute the three dimensional map;

an appendant information storing unit for storing appendant information of the map constituents stored in said map storing unit;

a vehicle position detecting unit for detecting a position of a vehicle in which the navigation device is installed;

a three-dimensional map forming unit for forming a three-dimensional map, in which the map constituents are arranged on a three-dimensional coordinate system, on the basis of the three-dimensional data stored in said map storing unit;

a projection map forming unit for forming a projection map which is obtained by viewing the three-dimensional map formed by said three-dimensional map forming unit from a view point which is determined on the basis of the position of the vehicle detected by the vehicle position detecting unit;

a read-out unit for reading out the appendant information corresponding to the map constituent which is arranged on the three-dimensional coordinate system by said three-dimensional map forming unit;

a visible area detection unit for detecting a visible area on the projection map of the map constituent corresponding to the appendant information read out by said read-out unit;

a display area setting unit for setting a display area on the projection map of the appendant information read out by said read-out unit, on the basis of the visible area of the map constituent corresponding to the appendant information read out by said read-out unit;

an adding unit for adding the appendant information read out by said read-out unit onto the display area thereof which is set by said display area setting unit; and a display unit for displaying on the display frame the projection map which is added with the appendant information by said adding unit.

24. The navigation device as claimed in claim 23, wherein said display area setting means sets the display area of the appendant information read out by said read-out unit, within the visible area of the map constituent corresponding to the appendant information read out by said read-out unit.

25. The navigation device as claimed in claim 24, wherein said adding unit has layout setting means for setting a layout of the appendant information read out by said read-out unit so that the appendant information is accommodated within the display area of the appendant information which is set by said display area setting unit.

26. The navigation device as claimed in claim 24, wherein said display area setting unit keeps the display area of the appendant information read out by said read-out unit as it is, even in such a case that the visible area of the map constituent corresponding to the appendant information read out by said read-out unit enlarges according to the view point changed by the position of the vehicle detected by the vehicle position detecting unit.

27. The navigation device as claimed in claim 24, wherein, in a case that the visible area of the map constituent corresponding to the appendant information read out by said read-out unit is changed according to the view point changed by the position of the vehicle detected by the vehicle position detecting unit, if the display area of the appendant information set before the visible area of the map constituent corresponding to the appendant information is changed, is accommodated within the changed visible area of the map constituent corresponding to the appendant information, said display area setting unit keeps the display area of the appendant information as it is, and if the display area of the appendant information set before the visible area of the map constituent corresponding to the appendant information is changed, is not accommodated within the changed visible area of the map constituent corresponding to the appendant information, said display area setting means updates the display area of the appendant information so that the display area of the appendant information is accommodated within the changed visible area of the map constituent corresponding to the appendant information.

28. The navigation device as claimed in claim 24, further comprising a judgment unit for judging whether the appendant information added onto the display area thereof which is set by said display area setting unit can be displayed in a predetermined or larger size, wherein if said judgment unit judges that the appendant information cannot be displayed in the predetermined or larger size, said display area setting unit resets the display area of the appendant information in the neighborhood of the visible area of the map constituent corresponding to the appendant information.

29. The navigation device as claimed in claim 28, further comprising an overlap detection unit for detecting the overlap between the appendant information concerned and appendant information other than the appendant information concerned or map constituents other than the map constituent corresponding to the appendant information concerned on the projection map which is added with the appendant information by said adding means, wherein when said overlap detection unit detects the overlap, said display area setting unit resets the display area of the appendant information so that the appendant information is not overlapped with appendant information other than the appendant information concerned or map constituents other than the map constituent corresponding to the appendant information concerned.

30. The navigation device as claimed in claim 28, further comprising an overlap detection unit for detecting the overlap between the appendant information concerned and appendant information other than the appendant information concerned or map constituents other than the map constituent corresponding to the appendant information concerned on the projection map which is added with the appendant information by said adding unit, and a priority order determining unit for determining priority order for the display of the overlap-detected appendant information or map constituents on the display frame when the overlap is detected by said overlap detection means, wherein said display unit displays on the display frame the appendant information or map constituent having the highest priority determined by said priority order determining unit among the overlap-detected appendant information and map constituents.

31. The navigation device as claimed in claim 30, wherein said priority order determining unit determines the priority order on the display frame on the basis of the map constituent corresponding to the appendant information for which the overlap is detected by said overlap detection unit or the arrangement position on the three-dimensional map of the map constituent for which the overlap is detected by said overlap detection unit.

32. The navigation device as claimed in claim 30, wherein said priority order determining unit determines the priority order on the display frame on the basis of the map constituent corresponding to the appendant information for which the overlap is detected by said overlap detection unit or the type of map constituent for which the overlap is detected by said overlap detection unit.

33. The navigation device as claimed in claim 23, wherein said display area setting unit sets the display area of the appendant information corresponding to a map constituent in the neighborhood of the visible area of the map constituent detected by said visible area detection unit.

34. The navigation device as claimed in claim 33, further comprising an overlap detection unit for detecting an overlap between the appendant information concerned and appendant information other than the appendant information concerned or map constituents other than the map constituent corresponding to the appendant information concerned on the projection map which is added with the appendant information by said adding unit, wherein when the overlap is detected by said overlap detection unit, said display area setting unit resets the display area of the appendant information so that the appendant information is not overlapped with appendant information other than the appendant information concerned or map constituents other than the map constituent corresponding to the appendant information concerned.

35. The navigation device as claimed in claim 33, further comprising: an overlap detection unit for detecting an overlap between the appendant information concerned and appendant information other than the appendant information concerned or map constituents other than the map constituent corresponding to the appendant information concerned on the projection map which is added with the appendant information by said adding unit, and an priority order determining unit for determining the priority order for the overlap-detected appendant information or map constituent on the display frame when the overlap is detected by said overlap detection unit, wherein said display unit displays on the display frame the appendant information or map constituent having the highest priority determined by said priority order determining unit among the overlap-detected appendant information and map constituents.

36. The navigation device as claimed in claim 35, wherein said priority order determining unit determines the priority order on the display frame on the basis of the map constituent corresponding to the appendant information for which the overlap is detected by said overlap detection unit or the arrangement position on the three-dimensional map of the map constituent for which the overlap is detected by said overlap detection unit.

37. The navigation device as claimed in claim 35, wherein said priority order determining unit determines the priority order on the display frame on the basis of the map constituent corresponding to the appendant information for which the overlap is detected by said overlap detection unit or the type of map constituent for which the overlap is detected by said overlap detection unit.

38. A map display method for displaying a three dimensional map on a display frame, comprising steps of:
   on the basis of three-dimensional data of plural map constituents stored in storing unit, forming a three-dimensional map in which the map constituents are arranged on a three-dimensional coordinate system;

forming a projection map which is obtained by viewing the three-dimensional map from a view-point;

reading out, from an appendant information storing unit for storing appendant information of the map constituents stored in said map storing unit, the appendant information corresponding to the map constituent which is arranged on the three-dimensional coordinate system;

detecting a visible area on the projection map of the map constituent displayed on the projection map;

on the basis of the detected visible area, setting a display area on the projection map of the appendant information corresponding to the map constituent concerned;

adding the appendant information onto the display area of the appendant information concerned; and displaying the projection map added with the appendant information concerned on the display frame.

* * * * *